US009246768B2

(12) United States Patent
White et al.

(10) Patent No.: US 9,246,768 B2
(45) Date of Patent: Jan. 26, 2016

(54) SYSTEMS AND METHODS FOR A SIMULATED NETWORK ATTACK GENERATOR

(75) Inventors: Christopher Dyson White, O'Fallon, IL (US); Chester Randolph Ratcliffe, III, Belleville, IL (US); John Christian Espinosa, Fairview Heights, IL (US); Joel Alan Vickery, Collinsville, IL (US); Aaron Randal Moate, St. Louis, MO (US); Ronald David Parker, Jr., St. Louis, MO (US); Marc Anthony Crawford, Collinsville, IL (US)

(73) Assignee: Camber Corporation, Huntsville, AL (US)

( * ) Notice: Subject to any disclaimer, the term of this patent is extended or adjusted under 35 U.S.C. 154(b) by 1122 days.

(21) Appl. No.: 12/487,633

(22) Filed: Jun. 18, 2009

(65) Prior Publication Data

US 2009/0320137 A1 Dec. 24, 2009

Related U.S. Application Data

(60) Provisional application No. 61/073,721, filed on Jun. 18, 2008, provisional application No. 61/175,054, filed on May 4, 2009.

(51) Int. Cl.
*H04L 12/24* (2006.01)
*H04L 12/26* (2006.01)
(Continued)

(52) U.S. Cl.
CPC ............ *H04L 41/145* (2013.01); *G06F 17/509* (2013.01); *G06F 17/5009* (2013.01); *G06F 21/577* (2013.01); *G09B 19/0053* (2013.01); *H04L 63/1433* (2013.01);
(Continued)

(58) Field of Classification Search
CPC ............ H04L 63/1408; H04L 63/1416; H04L 63/1433; H04L 2463/144–2463/146; H04L 41/145; H04L 41/14; H04L 67/36; G06F 21/55; G06F 21/554; G06F 21/57; G06F 21/577; G06F 9/455; G06F 9/45533; G06F 2009/45587; G06F 2009/45591; G06F 17/5009; G06F 17/509
USPC ................ 726/25, 23, 22; 703/17, 20–22, 13; 709/224; 718/1
See application file for complete search history.

(56) References Cited

U.S. PATENT DOCUMENTS 5,702,038 A 12/1997 Miller et al.
5,907,696 A 5/1999 Stilwell et al.
(Continued)

OTHER PUBLICATIONS

International Search Report, Date of Mailing Jan. 29, 2010.

*Primary Examiner* — Zachary A Davis
(74) *Attorney, Agent, or Firm* — Lanier Ford Shaver & Payne, P.C.; Ann I. Dennen

(57) ABSTRACT

A system is disclosed that generates a network attack within a simulated network environment. The system includes a module that creates one or more attack events against network devices within the simulated network environment wherein the attack events include exploitations of published and unpublished vulnerabilities and failures of hardware and software network systems, devices, or applications within the simulated network environment. Additionally, the module executes the created attack event on the simulated network environment. In addition, the system has an interface configured for receiving metadata regarding each attack event and adding the received attack event metadata to each associated attack event.

25 Claims, 34 Drawing Sheets

(51) Int. Cl.
  H04L 29/06 (2006.01)
  G06F 21/57 (2013.01)
  G09B 19/00 (2006.01)
  G06F 17/50 (2006.01)
  G06F 9/455 (2006.01)
  H04L 29/08 (2006.01)

(52) U.S. Cl.
  CPC .............. *G06F 9/455* (2013.01); *H04L 43/50* (2013.01); *H04L 67/36* (2013.01)

(56) References Cited

U.S. PATENT DOCUMENTS

| | | | |
|---|---|---|---|
| 6,023,563 A | 2/2000 | Shani | |
| 6,272,450 B1 | 8/2001 | Hill et al. | |
| 6,622,856 B2 | 9/2003 | Gallo et al. | |
| 6,892,241 B2 * | 5/2005 | Kouznetsov et al. | 709/229 |
| 6,901,357 B1 | 5/2005 | Patiejunas | |
| 6,952,779 B1 * | 10/2005 | Cohen et al. | 726/22 |
| 7,047,176 B2 | 5/2006 | Klevans et al. | |
| 7,089,172 B2 | 8/2006 | Lines et al. | |
| 7,155,376 B2 | 12/2006 | Yang et al. | |
| 7,167,820 B2 | 1/2007 | Sarfati et al. | |
| 7,210,087 B2 | 4/2007 | Mukai et al. | |
| 7,257,082 B2 | 8/2007 | Dugatkin | |
| 7,263,471 B2 | 8/2007 | Barbaresi et al. | |
| 7,296,080 B2 | 11/2007 | Rowley et al. | |
| 7,315,801 B1 * | 1/2008 | Dowd et al. | 703/13 |
| 7,318,015 B2 | 1/2008 | Carlson et al. | |
| 7,325,252 B2 * | 1/2008 | Bunker et al. | 726/25 |
| 7,327,686 B2 | 2/2008 | Standridge | |
| 7,330,806 B2 | 2/2008 | Reohr, III | |
| 7,376,550 B1 | 5/2008 | Bokaemper et al. | |
| 7,770,223 B2 * | 8/2010 | Shevenell et al. | 726/23 |
| 7,996,201 B2 * | 8/2011 | Dowd et al. | 703/13 |
| 8,413,237 B2 * | 4/2013 | O'Rourke et al. | 726/23 |
| 2003/0061017 A1 | 3/2003 | Dotaro et al. | |
| 2003/0233404 A1 | 12/2003 | Hopkins | |
| 2004/0122645 A1 | 6/2004 | Shevenell et al. | |
| 2004/0236866 A1 | 11/2004 | Dugatkin et al. | |
| 2004/0257604 A1 | 12/2004 | Morooka et al. | |
| 2005/0099959 A1 | 5/2005 | Standridge | |
| 2005/0229255 A1 | 10/2005 | Gula et al. | |
| 2006/0109793 A1 * | 5/2006 | Kim et al. | 370/250 |
| 2006/0256720 A1 | 11/2006 | Curran-Gray et al. | |
| 2007/0078950 A1 | 4/2007 | Hopkins et al. | |
| 2007/0130208 A1 | 6/2007 | Bornhoevd et al. | |
| 2007/0277237 A1 | 11/2007 | Adelman et al. | |
| 2008/0043627 A1 | 2/2008 | Singh et al. | |
| 2009/0007270 A1 * | 1/2009 | Futoransky et al. | 726/25 |
| 2009/0157371 A1 | 6/2009 | Conway | |

* cited by examiner

SYSTEMS AND METHODS FOR A SIMULATED NETWORK ATTACK GENERATOR

CROSS-REFERENCE TO RELATED APPLICATIONS

This application claims priority to U.S. Provisional Application No. 61/073,721 filed Jun. 18, 2008, and U.S. Provisional Application No. 61/175,054, filed on May 4, 2009, each of which are herein incorporated by reference.

FIELD

The present disclosure relates to a simulated environment for a computer network and, more specifically, to an operations system and method for generating network attacks and exploiting network systems in a simulated network environment.

BACKGROUND

The statements in this section merely provide background information related to the present disclosure and may not constitute prior art.

Computer networks face a constantly evolving menace from cyber attacks, viruses, unauthorized probes, scans, and intrusions. Terrorists, criminals, and network hackers are more determined than ever to steal information, cause disorder and destroy networks. Additionally, these individuals have the knowledge, technical skills and determination to carry out their actions with, on many occasions, ease.

To counter these threats and provide the strongest defenses of vital computer networks, system operators must be highly trained and all security procedures must be validated in the most realistic conditions possible in order to be effective.

Additionally, changes to networks are also often desired and it would be beneficial to have a system in which a network operator can implement network upgrades to determine potential impacts on the network and its operations including user applications and use of the network.

SUMMARY

The inventor hereof has succeeded at designing off-line network simulator systems and methods. In one embodiment, a system in accordance with an embodiment of the present disclosure is referred to as a Simulated Network System such as, by way of example, a Cyberoperations Enhanced Network and Training Simulator (CENTS™), a trademark of EADS North America. Such Simulated Network Systems can be configured for virtual network and operations emulation and training products for the commercial, federal, and military environments. The Simulated Network System can be configured as a simulator to provide users with the capability to conduct a wide array of Computer Network Operations (CNO) in a simulated environment for network planning, upgrade simulation, as well as any other required network simulation applications or requirements.

In one aspect, a system for generating a network attack within a simulated network environment includes a computer network platform having hardware and software configured as a standalone configuration and includes a system control module and a memory. A module is configured for creating one or more attack events against network devices within the simulated network environment. The attack events include exploitations of published and unpublished vulnerabilities and failures of hardware and software network systems, devices, or applications within the simulated network environment. The module is also configured for executing the created attack event on the simulated network environment. An interface is configured for receiving metadata regarding each attack event and adding the received attack event metadata to each associated attack event.

In another aspect, a system for generating a network attack within a simulated network environment includes a module configured for creating one or more attack events against network devices within the simulated network environment. The attack events include exploitations of published and unpublished vulnerabilities and failures of hardware and software network systems, devices, or applications within the simulated network environment. The module is also configured for executing the created attack event on the simulated network environment as an execution along a predefined operational timeline. An interface is configured for receiving metadata regarding each attack event and adding the received attack event metadata to each associated attack event.

In another aspect, a system for generating a network attack within a simulated network environment includes a module configured for creating one or more attack events against network devices within the simulated network environment. The attacks events include exploitations of published and unpublished vulnerabilities and failures of hardware and software network systems, devices, or applications within the simulated network environment. The module is also configured for executing the created attack event on the simulated network environment and for defining a set of expected user actions within the attack event metadata that would mitigate the attack event or prevent the attack event from being successful. An interface configured for receiving metadata regarding each attack event and adding the received attack event metadata to each associated attack event.

In yet another aspect, a system for generating a network attack within a simulated network environment includes a module configured for creating one or more attack events against network devices within the simulated network environment. The attack events include exploitations of published and unpublished vulnerabilities and failures of hardware and software network systems, devices, or applications within the simulated network environment. The module is also configured for executing the created attack event on the simulated network environment and for creating a listing of network devices within the simulated network environment that need to be restored based upon a successful execution of an attack scenario. An interface is configured for receiving metadata regarding each attack event and adding the received attack event metadata to each associated attack event.

One or more aspects of the present disclosure will be in part apparent and in part pointed out below. It can be understood that various aspects of the disclosure may be implemented individually or in combination with one another. It can also be understood that the detailed description and drawings, while indicating certain exemplary embodiments, are intended for purposes of illustration only and cannot be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

Figure 1:
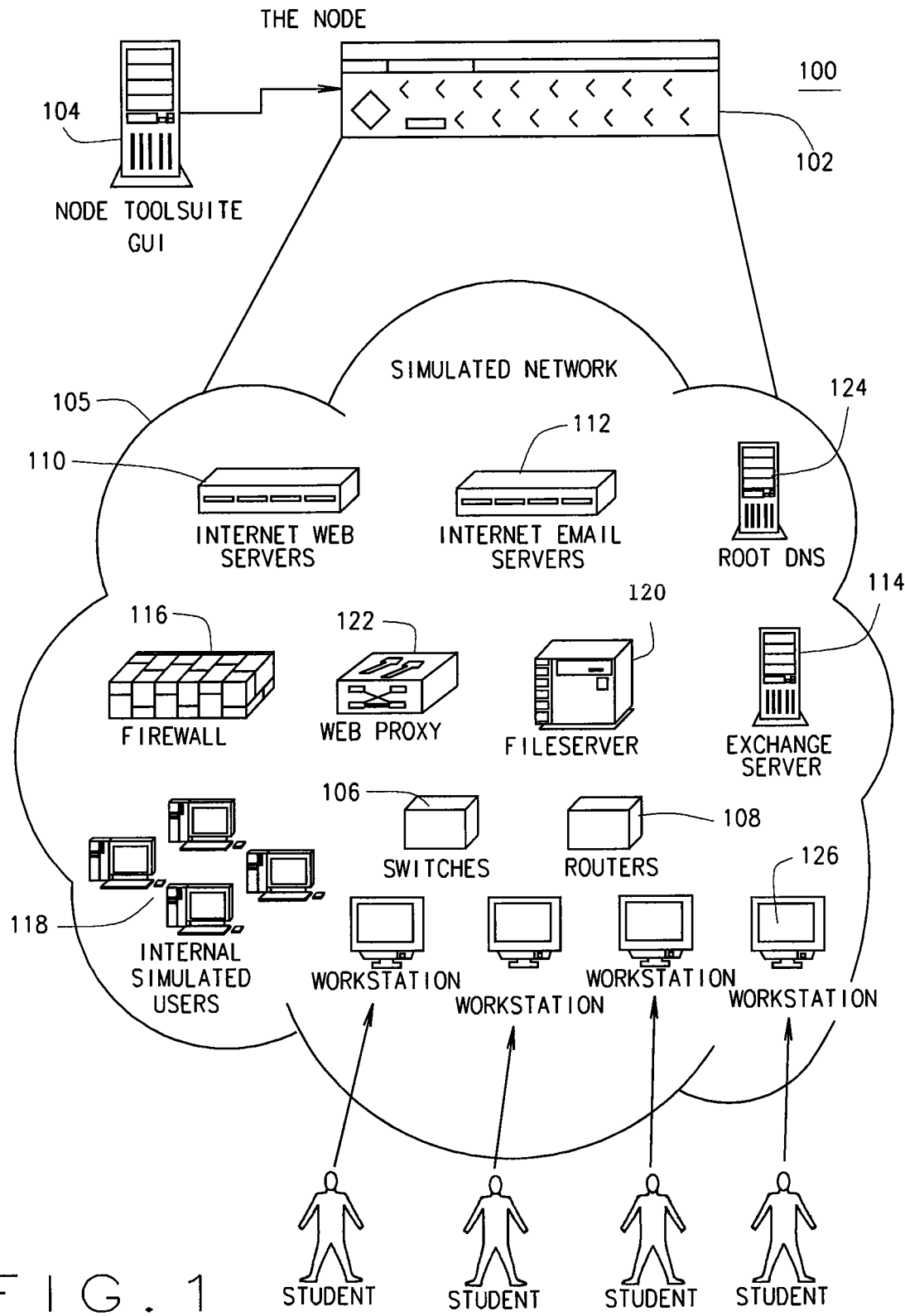
FIG. 1 is a diagram of one exemplary Simulated Network System according to one embodiment.

The following description is exemplary in nature and is not intended to limit the present disclosure or the disclosure's applications or uses. Before turning to the figures and the various exemplary embodiments illustrated therein, a detailed overview of various embodiments and aspects can be provided for purposes of breadth of scope, context, clarity, and completeness.

As will be described herein, this disclosure addresses various methods and systems for simulating a network environment including simulating network components and network architecture of a user network, simulating real-world network traffic on the simulated user network, simulating network events within the simulated real-world traffic on the simulated user network, monitoring the simulated network, the simulated traffic including the simulated network events, and receiving input from a user, such inputs manually controlling/managing the simulated network components of the simulated user network responsive to the monitoring.

In some embodiment of the methods, simulating network components and network architecture includes one or more of the following: simulating all network components within the network architecture, simulating user and/or network applications operating on the user network, simulating network components that include network components selected from the group consisting of web servers, email servers, DNS, firewalls, web proxies, file servers, exchange servers, users, and user workstations, and simulating network interfaces to external networks and wherein the simulating network traffic is configured for simulating network traffic originating from such external networks.

In some embodiment, the simulated events include one or more of email threats, network attacks, and network failures, or events originating from the simulated external and/or internal networks.

In one embodiment, simulating network events is responsive to a training program, and the method further includes evaluating the user's input against a set of predetermined criteria. This can also include simulating network components of the user network includes simulating one or more planned modifications to the user network, further comprising evaluating the operation of the simulated network against a set of baseline criteria. For example, one planned modification would be a planned upgrade from IPv4 to IPv6.

In yet another embodiment, the method can include testing and evaluating the simulated network components against a set of testing and evaluating criteria.

For example, in one exemplary embodiment, systems according to this disclosure are provided for simulating a network environment including a computer network platform, a network traffic module, a network event module, and a user interface. The computer network platform having hardware and software configured as a standalone configuration and including a combination of actual network components and simulated network components that are configured to simulate an operating network for a defined set of users. The network traffic module communicatively connected to the computer network platform and configured for generating application traffic within the simulated operating network of the computer network platform, the generated application traffic including network traffic simulating specific network traffic of the defined set of users. The network event module communicatively connected to the computer network platform and configured for generating network events within the simulated network traffic generated by the network traffic module. The user interface communicatively connected to the computer network platform and configured as an operating network administrator for monitoring the simulated operating network and the simulated network traffic including the event and for controlling one or more actual or simulated network components.

In some embodiments, a training module can be configured for operating the system as an off-line training platform and monitors inputs received from the user interface and provide feedback and reports indicative of the received inputs associated with the various events generated by the network event module.

In some embodiments, there are a plurality of user interfaces, one that is configured as a system operator interface for controlling the computer network platform, the network traffic module, the network event module; and the other user interfaces. This can include one or more of the other user interfaces that are configured for training of network administrators.

In other embodiments, this can include configuring one or more of the components of the computer network platform with a new or different network application, a different version of an existing network application, adding or deleting one or more of the components, and wherein user interface is configured for monitoring, testing and evaluating the computer network platform as compared to a previous arrangement of the computer network platform. This can include non-intrusively testing a proposed change in the network configuration.

The simulated network systems and methods (often herein referred to as a simulator or training simulator) as described by the various embodiments herein include network simulator environments that can be customized to a particular users' specification for providing students, operators, and testers with a simulated environment that closely mirrors the actual networking environment that the users have implemented, e.g., corporate networks, private networks, and public networks, by way of example. The various network simulator embodiments or systems can have unique capabilities and options for local and remote training and continuing education. Such can be used for training as well as networks operations modeling of the network for network management, administration and planning efforts.

As one example of a training scenario using such systems and methods, a simulated network system and method can be tailored to user organizational needs and can be automated to provide repeatable network events, such as threats, attacks, and network failures, by way of example. Scenarios can be based on past, current and evolving threats and events that a user's personnel face everyday in the protection of the user's network and other corporate assets. After a training scenario ends, each person that has used the simulated network training system can be assisted by the system and helped by attending operators in evaluating their performance in preparation for the next training session. In this manner, various systems and methods herein can enhance an IT user's professional abilities to better manage daily operations and protect the user's enterprise network.

In one embodiment of a simulated network system, (also referred to in one embodiment as a Cybersecurity Network Training Simulator or CENTS™ system), a network simulator, referred to as a cybersecurity network training simulator or CYNTRS,™ a trademark of EADS North America can be a system and method for providing computer network defense (CND) training to a network operations team (sometimes referred to as a crew) or to individual operators. An exemplary Simulated Network System provides network operators with high-fidelity training in defending and protecting networks. The Simulated Network System can be operated to teach users and network operators how to recognize and respond to attacks in a network-safe environment. It can be used to train IT professionals on defending network security with such scenarios as: recognizing a hacker attack, researching the risk, mitigating the threat, reporting the incident, detecting intrusions, isolating threats, diagnosing system failures or anomalies, and maintaining security.

Such a system can include a customized tool that simulates the user's full network environment, for training network operators to recognize and defend the most malicious cyber attacks. The Simulated Network System provides for high risk activities to be performed and for network operators to be exposed to real-life cyber threat situations. The training scenarios of such system can be tailored to a user's organizational needs and can be automated to provide repeatable events.

After a training session using the Simulated Network System ends, each trainee can be assisted by the system and methods in evaluating their performance in preparation for the next training session, thereby enhancing their abilities to better manage and protect a user's enterprise network. One or more persons, and often, at least two people, can be involved in the Workstation operation. One person will operate the Defender workstation and the other will operate the Aggressor workstation. One or more workstations can be established on the network simulator system for training or otherwise.

The environment and training provided by embodiments such as the Simulated Network System can provide improved skilled and highly professional network security operators, and can lead to the best possible network defenses. As a flexible tool, in addition to training, as described herein, embodiments such as the Simulated Network System can also be used to validate network security policies, procedures, processes, techniques, and operator skills.

In another embodiment, a Range End Unit (REU) can provide network simulator systems and methods for connecting to current/legacy and future cyber ranges. Such components can model a user's daily operating network environment and can be, in some situations, used for training or network observation, testing and analysis.

In some embodiments, systems and methods such as the Simulated Network System can include a hands-on training simulator (such as HOTSIM™), a trademark of EADS North America, that consolidates and brings all the capabilities of systems such as the Simulated Network System into a single embodiment, but having a smaller footprint and centralized management system. Systems such as a Training Simulator can be designed to augment network operations, management, and defense curriculum with a hands-on training environment that permits each student to configure or defend the network and understand how all tools and applications in a network collaborate together.

In some embodiments, the Simulated Network System includes a simulator to support test and evaluation (T&E) systems and methods. Such T&E network simulators and methods can be designed to support common testing requirements such as security, testing, evaluation, vulnerability assessments, verification and validation of the network.

In yet other embodiments, the Simulated Network System can include a computer network attack/computer network exploitation (CANE) and computer forensics that provide systems and capabilities that are different than a T&E and that can be expanded beyond a T&E simulated network system and method. For example, an embodiment such as CANE can provide modeling and simulation; and can be a system for network research and development efforts; and as well provide system upgrade or modification planning and review.

In one exemplary embodiment, the systems and methods can include Internet Protocol version 6 (IPv6) network layer for the next generation of packet-switched internetworks. The IPv6 is the designated successor of IPv4, the current version of the Internet Protocol for general use on the Internet. In such embodiments, an IPv6 simulator (SIXS) can provide for assisting an operator or users with developing and validating IPv6 transition plans, determining the impact of IPv6 on current systems, identifying impacts of running in a dual-stack environment, as well as training individuals and network crews on how to actually execute the transition.

Generally, as described herein, network simulator systems and methods such as the Simulated Network System can provide a realistic network environment which can be separated from the normal operational environment, yet mimics the normal operational environment. To achieve this, the network simulator can include infrastructure devices and servers that are configured to recreate the user's operational environment. Primary devices of the network architecture can be duplicated and/or emulated and then configured to duplicate the specified network architecture for which the user or operator desires to simulate. This then enables the operators or users the ability to effectively test or train as if in their normal environment without causing damage to real world resources. This duplication of the network architecture via hardware and software can be referred to as a simulator.

Referring now to FIG. 1, one exemplary embodiments of a Simulated Network System 100 can include all of the physical devices and the software that can be used to duplicate the network architecture. A Node 102 for a Simulated Network System 100 can include a Node ToolSuite Graphical User Interface (GUI) 104, and a simulated network 105 that can include simulated switches 106, routers 108, web servers 110, email servers 112, exchange servers 114, firewalls 116, internal simulated user computers 118, fileservers and/or databases 120, web proxies 122, Root DNSs 124, by way of example, and is not intended to be limiting. To reduce the footprint and cost, a simulator virtualization can be loaded on multiple "servers" that are operating on the same physical device or hardware server, or can be spread among hardware or simulated servers. In addition to servers and infrastructure, the Node 102 can also provide a limited number of workstations 126 for the students, users, or operators to use to interact with the simulated environment.

In addition to the Simulated Network System 100, the networks and methods as described herein include the ability to load or populate the simulated network with traffic that simulates real world traffic on the network. This includes any type of user traffic such as web surfing, e-mail, and file server access. Likewise, since few network architectures operate independent of the Internet, the networks and methods are configured to simulate or replicate traffic coming into the network from the outside world, e.g., via interfaces to external networks that are at the control of the user and the user environment. Some embodiments provide this capability by one or more software and hardware enabled systems or one or more modules, for example, by one embodiment herein referred to as a Sentinel™ (generally referred to herein as the Network Monitoring and Analysis module 230), Legion™ (generally referred to herein as Simulated Network Traffic Generator module 232), AutoBuild™ (generally referred to herein as Automated Network Build module 234), Myrmidon™ (generally referred to herein as the Attack Creation module 236) and Reconstitution™ (generally referred herein as the Network Reconstitution or Reconstitution module 238) or collectively as the Node 102 (or as SLAM-R™). Each of these is a trademark of EADS North America. The Node can perform one or more network simulator functions and can include one or more of loading traffic environments, loading attack scenarios, generating attacks and network traffic, and storing network preferences, by way of examples.

Figure 3:
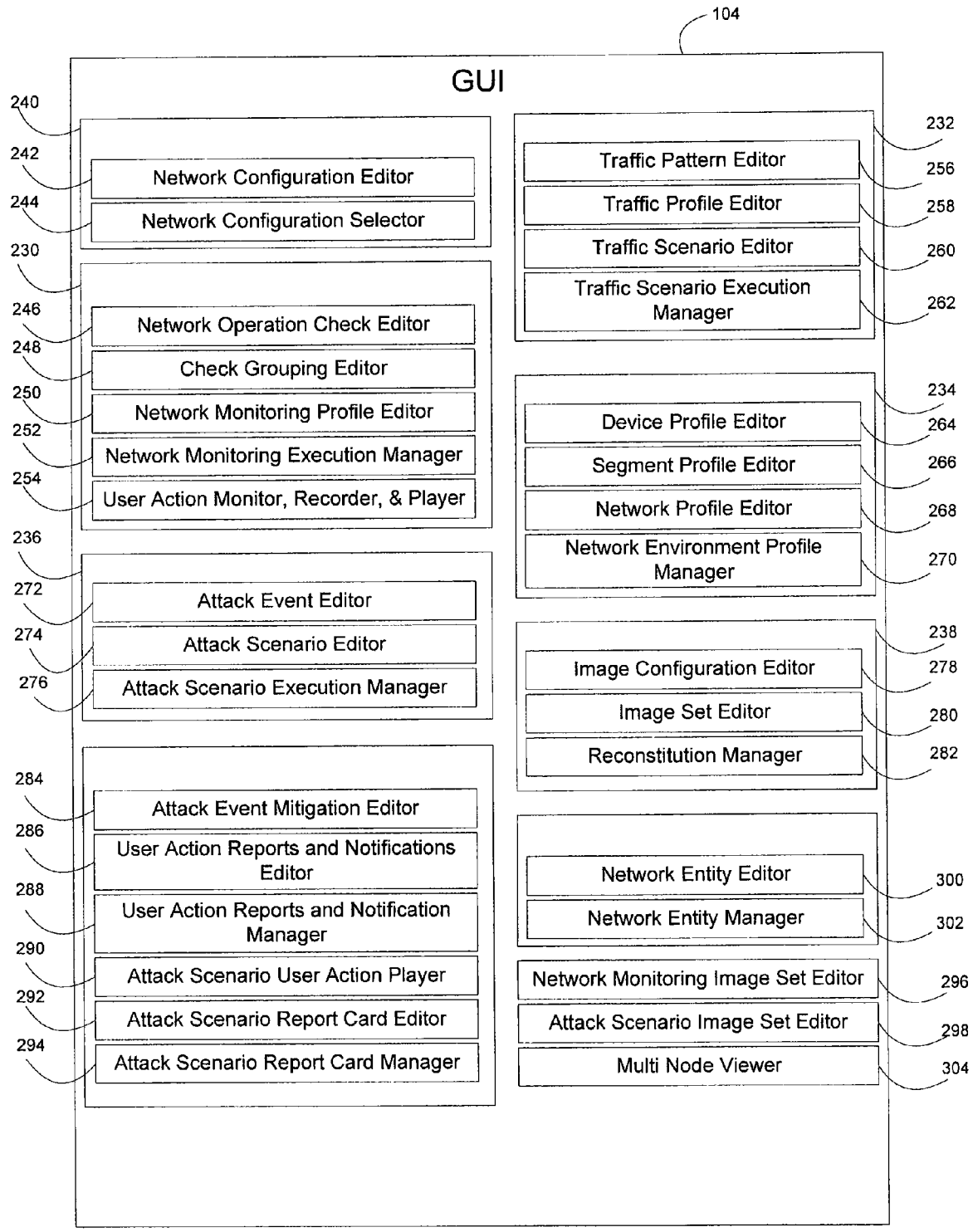
FIG. 3 is a block diagram of a Graphical User Interface (GUI) and exemplary modules suitable for use with the Simulated Network System according to one exemplary embodiment.

A graphical user interface (GUI) 104, can include a number of modules that are represented by user screens and tool bars and editors. One exemplary embodiment is shown in FIG. 3. The GUI 104 can include: A network configuration or framework 240 that can include a Network Configuration Editor 242 and a Network Configuration Selector 244. The Network Monitoring and Analysis module 230 can include Network Operations Check Editor 246, Check Grouping Editor 248, Network Monitoring Profile Editor 250, Network Execution Manager 252, and User Action Monitor Recorder & Player 254. The Simulated Network Traffic Generator module 232 can include the Traffic Pattern Editor 256, the Traffic Profile Editor 258, Traffic Scenario Editor 260, and Traffic Scenario Execution Manager 262. The Automated Network Build module 234 can include a Device Profile Editor 264, a Segment Profile Editor 266, a Network Profile Editor 268, and a Network Environment Profile Manager 270. The Attack Creation module 236 can include an Attack Event Editor 272, an Attack Scenario Editor 274, and an Attack Scenario Execution Manager 276. The Network Reconstitution or Reconstitution module 238 can include an Image Configuration Editor 278, an Image Set Editor 280, and a Reconstitution Manager 282. Additional integration displays and cross functional capabilities and modules can include: a Network Event Mitigation Editor 284, a User Action Reports and Notification Editor 286, a User Action Reports and Notification Manager 288, a Network Scenario User Action Player 290, a Network Scenarios Report Card Editor 292, a Network Scenario Report Card Manager 294, a Network Monitoring Image Set Generator 296, a Network Scenarios Image Set Generator 298, a Network Entity Editor 300, a Network Entity Manager 302, and a Multi-Node Viewer 304.

One exemplary embodiment of a network traffic simulator/generator 232, the Node 102 can be configured to provide realism or realistic traffic on the simulated network. Such systems can be provided as an integrated system or as multiple modules that work together and or independently to provide a unified interface for the simulator operator to use. Additionally, such Node software or systems can refer to programs that run the node or system as well as the rest of the simulated network system in some embodiments. The Node 102 can be composed of one or more components, and in one exemplary embodiment includes three components: the node, the Node Tool Suite, and the requisite modules. There may be more exchange email traffic than webmail, certain websites that get visited, or large amounts of bit-torrent traffic. The file is setup to describe what kinds of traffic are generated by what kind of users.

The Node

As described in this exemplary embodiment, the Node 102 of a Simulated Network System 100 can be a server that runs Node software. It can be physically connected to the network simulator or network in multiple areas or interface points so as to have full access to the simulated network environment, physically and/or logically. This can provide the backend for the user emulation, crew monitoring and testing, and simulator control. Although this can be a server that can be accessed via its own console or user interface so as to provide the primary mechanism for interacting with the Node 102 can be through the Node Tool Suite. The Node can be a physical server that sits in the simulator rack. For instance, the Node 102 may refer to a standard Dell PowerEdge 1950 server.

Figure 2:
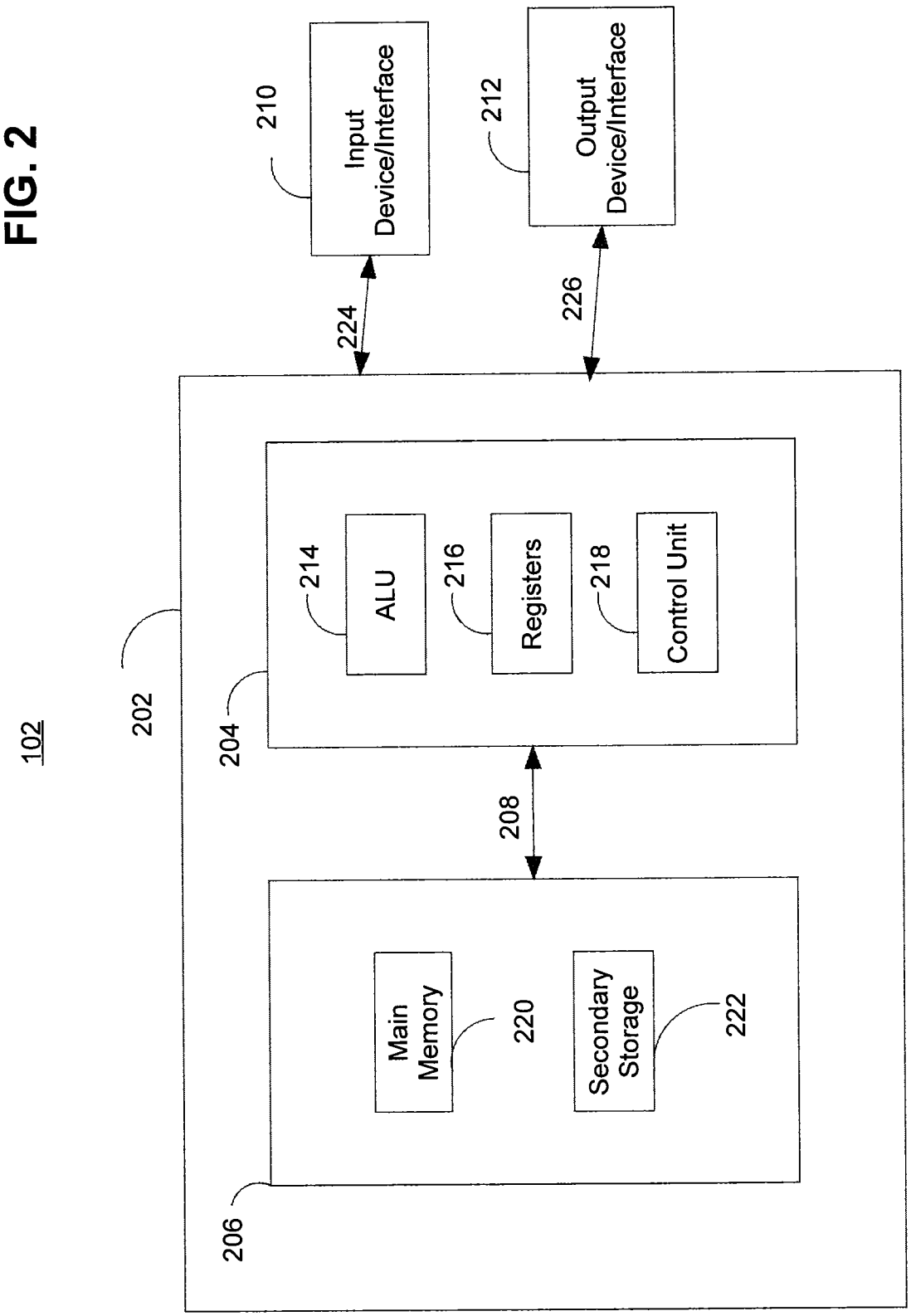
FIG. 2 is a block diagram of a computer system suitable for use for implementing a Node of a Simulated Network System according to one exemplary embodiment.

Referring to FIG. 2, an operating environment for an illustrated embodiment of the present disclosure can be a Node 102 having a computer 202 that comprises at least one high speed processing unit (CPU) 204, in conjunction with a memory system 206 interconnected with at least one bus structure 208, an input device 210, and an output device 212. These elements are interconnected by at least one bus structure 208.

The illustrated CPU 204 can be of familiar design and includes an arithmetic logic unit (ALU) 214 for performing computations, a collection of registers 216 for temporary storage of data and instructions, and a control unit 218 for controlling operation of the Node 102. Any of a variety of processors, including at least those from Digital Equipment, Sun, MIPS, Motorola, NEC, Intel, Cyrix, AMD, HP, and Nexgen, is equally preferred for the CPU X. The illustrated embodiment of the disclosure operates on an operating system designed to be portable to any of these processing platforms.

The memory system 206 generally includes high-speed main memory 220 in the form of a medium such as random access memory (RAM) and read only memory (ROM) semiconductor devices, and secondary storage 222 in the form of long term storage mediums such as floppy disks, hard disks, tape, CD-ROM, flash memory, etc. and other devices that store data using electrical, magnetic, optical or other recording media. The main memory 220 also can include video display memory for displaying images through a display device. Those skilled in the art will recognize that the memory system 206 can comprise a variety of alternative components having a variety of storage capacities.

The input device 210 and output device 212 are also familiar. The input device 210 can comprise a keyboard, a mouse, a physical transducer (e.g. a microphone), etc. and can be interconnected to the computer 202 via an input interface 224. The output device 212 can comprise a display, a printer, a transducer (e.g. a speaker), etc, and be interconnected to the computer 202 via an output interface 226. Some devices, such as a network adapter or a modem, can be used as input and/or output devices.

As can be familiar to those skilled in the art, the Node 102 further includes an operating system and at least one application program. The operating system can be the set of software which controls the computer system's operation and the allocation of resources. The application program can be the set of software that performs a task desired by the user, using computer resources made available through the operating system. Both are resident in the illustrated memory system 206.

In accordance with the practices of persons skilled in the art of computer programming, the present disclosure can be described below with reference to symbolic representations of operations that are performed by the Node 102. Such operations are sometimes referred to as being computer-executed. It can be appreciated that the operations which are symbolically represented include the manipulation by the CPU 204 of electrical signals representing data bits and the maintenance of data bits at memory locations in the memory system 206, as well as other processing of signals. The memory locations where data bits are maintained are physical locations that have particular electrical, magnetic, or optical properties corresponding to the data bits. The various embodiments as described in this disclosure can be implemented in a program or programs, comprising a series of instructions stored on a computer-readable medium. The computer-readable medium can be any of the devices, or a combination of the devices, described herein in connection with the memory system 206.

By way of examples, the Simulated Network System 100 can be configured in hardware from components that will run in a virtual network infrastructure that can be an exact replica of a user's network. Because the Simulated Network System 100 computer components are configured to exactly simulate a user's own network environment, the component's brand name and internal software used in the Computer Rack Station will vary depending on the type of equipment in his network. The range of components in the Simulated Network System 100 Computer Rack Station consists of Routers, Switches, Firewalls, Servers, UPS, a KVM and a KMM Console.

The KVM Oscar software provides the KMM (keyboard, monitor, mouse) to switch from server to server to enable an operator to partition a server, create virtual space on a server and control the software loaded on each server's virtual spaces.

VMware Server software can be loaded on the Internal Server, External Server and Workstation Server. The VMware console screen acts as the main interface from where many server configurations and software can be controlled. VMware controls the ability to create and setup virtual servers; install OS on virtual servers; assign virtual disk drive letters, allocate ram memory; control and start all virtual server's OS at the same time; load all software on one workstation and copy to other workstations from that single installation and configuration process; and configure devices including serial and parallel ports, DVD/CD-ROM drives, floppy drives, and USB ports to be automatically detected.

Servers can be host servers or virtual servers. Host servers are where virtual servers can be created. In one example, Microsoft's Windows Server 2003 Standard Edition OS or a similarly suitable operating system can be installed on the host servers and on most virtual servers. One of the virtual severs, virtual Root-Dns server, will have Red Hat Linux 5 OS installed. The four host servers are a management server, an internal server, an external server, and a workstation server. After the host servers are renamed, they can be built and configured. This can be accomplished by a server bios setup, server build and update utility, and OS installed. The bios setup are to be followed on four host servers (Management, Internal, External and Workstation) one at a time, until all are at the same build point. The server build and update utility software install and OS install can be completed on all of the servers. Next, VMware server software can be installed on all four servers except the management server. Using a host server's OS, unallocated space can be partitioned, formatted, and assigned a drive letter, making it ready for VMware Server to create virtual servers there.

The VMware Console can be used to create virtual servers on the host internal server, the host external server, and the host workstation server. The host internal server and host workstation server each can have one virtual server. The host external server can be a virtual server for Windows Server 2003 OS and one for Red Hat Enterprise Linux OS, by ways of examples. One virtual server can be created, then copied, pasted, and renamed after the OS install to create the other virtual servers needed on a host server.

The new virtual server recognizes its memory, hard disk, DVD/CD-ROM drive, floppy drive, one Ethernet adaptor, and its processors, but other system devices can be added and configured, such as, another Ethernet adapter, a USB device, a sound device, a serial port, a parallel port, and/or a SCSI device.

After an appropriate operating system can be installed on the workstation server's initial virtual server, commonly used software may be loaded on one virtual server. All application software can be installed on one server and then copied and pasted as many times as required. In addition, the operating system can be configured. The virtual servers that can be configured first are the host internal server's virtual servers, DC1 and DC2. These servers are domain controllers that maintain a domain and assign and manage addresses for other devices that will join the domain. Generally, a virtual server cannot join a domain until the DC1 and DC2 have been setup and configured.

At least two operators may be involved in the workstation operation. One such operator may operate the defender workstation and the other may operate the aggressor workstation. One or more, for example, 10 workstations can be configured for training, in one embodiment. One or more workstations can be configured as the "Defender" and one or more other can be configured as the "Aggressor" (sometimes referred to as the Attacker). The Defender workstations can include software that sets up the defenses against attack/threat scenarios that might be expected to come from outside or inside the network.

For example, software on the Defender Workstation can include: Microsoft Windows XP operating system, Microsoft Office 2003, Sidewinder Remote Cobra Admin GUI Network Gateway Security software, Adobe Reader, Win Zip, and PuTTY. PuTTY can be a multi-platform (Windows, Mac OS and Unix) client program for the SSH (secure shell, a high security protocol), Telnet and RLogin network protocols. These protocols are all used to login and run a remote session from one computer to a multi-user computer or server over a network using a command prompt interface. The server it communicates with runs on a "shell" program that interprets and carries out the commands that you input at the command prompt.

The Aggressor workstation can include software that sets up the threatening scenarios. The Aggressor workstation uses "attack bot" software created by the Simulated Network System 100. This plug-and-play attack simulation software has an Attack Manager interface that can be used to set up and simulate replica scenarios that are based on actual network operations experience. "AttackBots" are used to conduct a full range of cyber attacks, simulate outages and malfunctions, and emulate user problems on every level of the network. Its "AttackBots" can be updated to reflect the evolution of real attacks and threats over time, providing network simulations to accurately represent the latest operational environment.

As described herein, the disclosed traffic generator simulates typical real life computer network users and traffic. A Node Attack Manager can use various tabs, toolbars, and a scenario player control to execute attacks. The Node Attack Manager screen can provide several functionalities, including an Execution Manager, a Scenario Builder, an Event Builder, and an Event Library. The Simulated Network System 100 user interface (GUI) 104 components can include a standard top toolbar, a side selection tab toolbar, a selection content viewer, an information viewer, a scenario player controls, a message log viewer, a network manager view, and a current status bar.

The standard top toolbar can include file, view, tools, and help drop-down menu options. The file menu further can contain commands such as connect to node, disconnect from node, open scenario, close scenario, import scenario, export scenario, and exit. The view menu further can contain viewable options of the execution manager, the scenario builder, the event builder, and the event library. The items on the view menu can be disabled if not connected to a node. The tools menu controls access to user configurable aspects of the GUI 104 and the help menu can provide access to information on using the GUI 104 application.

The side selection tab toolbar for the Node Attack Manager can include an execution manager, a scenario builder, an event builder, and an event Library. The selection content viewer can show content of each of the selections in the side toolbar, while the information viewer displays information about the selections in the side toolbar. The scenario player can control the user interface to control the scenario execution. The controls can closely mimic standard media player controls such as Play/Pause, Stop, Previous and Next.

To initiate an attack, the operator or user can instigate by any suitable input means, such as by the operator by clicking a computer input device, for example a mouse, on the execution manager tab located in the left side selection tabs in the Attack Manager screen. The existing scenarios can be displayed in the selection content viewer. The operator or user can then select the desired attack scenario. After the attack scenario is started, the Defender workstation can begin to receive indications of possible problems. For example, if an e-mail type attack has been chosen, the Defender workstation can start receiving complaints that e-mail can be not sending or receiving. The Defender workstation can then begin to take steps to recognize and elevate the possible problems caused by the Aggressor workstation.

The Training Simulator embodiment can be configured from components that run in a virtual network infrastructure. The host server can contain a combination of internal and external virtual servers (called int/ext-svr). The range of components in the Training Simulator Rack Station can be grouped into three sets, such as labeled A, B and C. Each set can contain, by way of example, 2 Servers, 2 Routers and 2 Switches. Each set can be assigned an IP number, and all components in that set would have that number as its second number in the IP address.

VMware server software can be installed on the int/ext host server in each training set. The VMware console screen acts as the main interface from where many server configurations, virtual server creation, virtual server management and OS install and other software installations can be managed. VMware controls the ability to create and setup virtual servers; install OS on virtual servers; assign virtual disk drive letters; allocate ram memory; control and start all virtual server's OS at the same time; load all software on one workstation and copy to other workstations from that single installation and configuration process; and configure devices including serial and parallel ports, DVD/CD-ROM drives, floppy drives, and USB ports to be automatically detected.

As with the Simulated Network System 100, servers can be host servers or virtual servers. Host servers are where virtual servers can be created. A suitable operating system, such as Microsoft's Windows Server 2003 Standard Edition OS, can be installed on all host servers and on most virtual servers. One or more virtual severs, virtual Root-DNS server, etc, can have Red Hat Linux 5 OS installed, or a similar OS.

The training servers can be built and configured with a server BIOS setup, server build and update utility, and OS install. The BIOS setup can be followed on all host servers (ext/int-svr) one at a time, until all are at the same build point. The server build and update utility software install and OS install can be completed on all of the servers. Using a host server's OS, unallocated space can be partitioned, formatted, and assigned a drive letter, making it ready for VMware Server to create virtual servers there.

After the operating system is installed, the first software application to install on the Host Servers is usually the VMware Server. This software can be used to create virtual servers, install their Operating Systems. Each host server, except the mgt-svr, can have the VMware installed.

The VMware Console can be used to create virtual servers on the three host training servers (Host Training Server A, Host Training Server B, and Host Training Server C). Host training server A, B, and C each can have one virtual server for Windows Server 2003 OS and one for Red Hat Enterprise Linux OS, for example.

As with the Simulated Network System 100, the new virtual server recognizes its memory, hard disk, DVD/CD-ROM drive, floppy drive, one Ethernet adaptor, and its processors, but other system devices can be added and configured, such as, another Ethernet adapter, a USB device, a sound device, a serial port, a parallel port, and/or a SCSI device.

Using VMware, Windows Server 2003 OS or a similar OX can be installed on one virtual server and then copied, pasted, and renamed to make up the number of virtual servers needed on the host. Afterwards, an operating system can be installed on one virtual server and commonly used software may be loaded on one virtual server. Application software can then be installed on one server and then copied and pasted as many times as required.

While the rest of the network hardware in various embodiments of the Simulated Network System 100 can be deployed otherwise, the traffic and attack operations originate at the Node 102. Most of the servers existing on the simulated network can be emulated by either the Node 102 or an actual virtual machine sitting on another server in the simulator, but all users and attackers can be configured to originate from the Node 102. The operating system for the Node 102 can be any suitable such OS, and in some embodiments can have a suitable kernel for acting as a Xen Host.

In one embodiment of the Node 102, a UMID—User/Machine Id can provide a unique identifier for the pairing of a User and Machine. This can represent a functionally simulated user on the network. It can also represent the machine that an internet server is running on like google.com, or it could refer to an internal user such as a secretary and her desktop machine. Additionally, a Xen virtualization software similar to VMware or QEMU can be used on the node to virtualize lightweight Linux machines called Bots. Any UMIDs on the simulated network can be running on a Xen bot. Generally these are very lightweight only using 32 mb of memory and hard drive space, but they may get much bigger as processing power increases. The Node 102 can also include Bots 315 that are the virtualized machines that run on Xen 316 on the Node 102. These can be very tiny Linux machines that can emulate hundreds or thousands of simulated users. They can have a Bot Server Module (BSM) 318 running on them and get their commands via Relay Modules 310, 312. An Attack Scenario is an all-inclusive xml-based file that describes completely an attack scenario. They can describe UMIDS that take part in the attacks, specific processes used in the attack along with a timeline and dependency list for running a pre-planned scenario so that events occur at specific times. A traffic environment can be another xml-based file that has information regarding the UMIDS and traffic patterns for a certain environment. For example, in one user environment this can be 20,000 users ranging executives to secretaries, or in another user environment can be a small business with 50 staff users.

Figure 4:
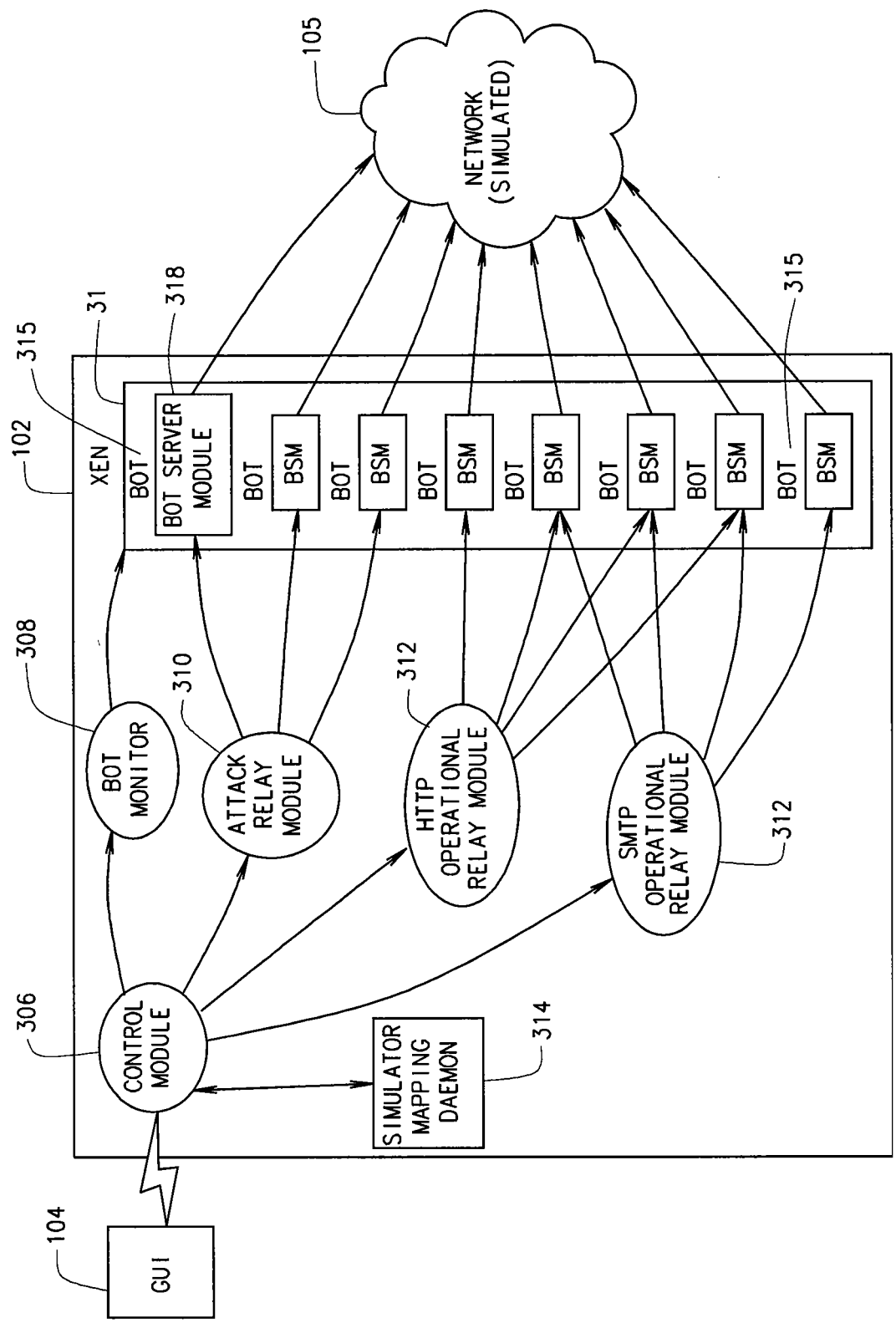
FIG. 4 is a block diagram of a Node for a Simulated Network system according to one exemplary embodiment.

In one exemplary embodiment of the Node 102, there can be multiple processes or software modules. As shown in FIG. 4, by way of example, a control module 306 (referred to herein as CM 306) can be provided that acts as the "brain" of the Node software. Such a control module 306 can be configured to handle all communication with the Node Tool Suite (described below) and any timing needed to keep all pieces on the same schedule/time. It can organize all communication with the different pieces so that there is a central place to control all the pieces and ensure they are in the correct state using simple commands. The CM 306 can communicate with a Bot Monitor 308 (BM), an Attack Relay Module 310 (ARM), an Operational Relay Module 312 (ORM) and/or a Simulator Mapping Daemon 314 (SMD) modules as described herein. Xen bots 315 within a Vitualization Technology 316 (also referred herein as the Xen) can include the various bots such as embodied in various BSMs 318. It can also be configured to determine which bots to bring up with what settings and instructs the BM 308 what to bring up. It can also be configured to load the attack scenario file and communicate any attacks with the ARM 310. A short list of possible responsibilities can include, but not be limited to:

Import/export scenario and traffic files
Communicate with GUI 104
Handle and synchronize all timing
Verify state of node
Keep log of scenario events
Apply any changes request by the Node Tool Suite The BM 308 can be configured to handle OS-specific functionality and in the current setup manages the Xen 316 and Xen Bots 315. For example, in loading a scenario, the BM 308 can take a command from the control module that includes a list of UMIDS and Bot ID's, and the BM 308 provides for the necessary functions required and then initiates the Xen Bots 315, which have the BSM 318 running on them. The BM 308 can connect to each of the BSMs 318 running on the bots 315, and after it has a successful connection to each, it notifies the CM 306 to proceed with the loading procedure. The BM 308 can handle the creation and/or teardown of Bots 315 so that different OS-specific solutions can be used, so the system can be configured to have one BM 308 for Xen 316 and another for VMware but both are interchangeable from the view of the CM 306.

The ARM 310 can be configured to handle scheduling of attacks and the processes/UMIDS associated with each attack. The ARM 310 can receive all the information such as bot ids, umids, times, dependencies, processes, arguments, transaction ids, etc. from the CM 306 and then generate an internal timeline, and using the timing given from the CM 306 it warns the CM 306 of when attacks will occur so they can be executed through the ARM 310. The ARM 310 can have individual connections to each of the BSM's 318 running on each Bot 315. The ARM 310 also can handle any process output from the processes running on the BSM's 318 and direct the output to the CM 306 where it is sorted and sent to the appropriate listeners (usually the Node Tool Suite).

The Operational Relay Module (ORM) 312 can be configured to manage the communication between the control module and the multiple BSMs 318. This can be configured such that instead of handling a schedule, the ORM 312 handles a queue which reflects traffics never-ending flow. The ORM 312 can request new queue items from the control module as the queue empties, and use this queue to start processes on the BSM's 318 which generate traffic. The ORM 312 can report any failures back to the CM 306.

The Bot Server Module (BSM) 318 can be configured to operate on the Xen Bots 316 and can be configured to control the bot 315. The Relay Modules 310 and 312 connect to the BSMs 318. The BSM 318 can be configured to execute processes on the bots, monitor those processes and provide pause/play/stop capabilities over those processes.

The Simulator Mapping Daemon (SMD) 314 module can be configured to map logical sections of a network to the specific switches, routers, ip ranges and netmask associated with a specific simulator, create a Network Preference Description. The SMD 314 can calculate both the internal and external addresses and routes that simulated users should or must use on a specific simulator. For example, a network simulator A can have an internal network of 192.168.15.0 with a netmask of 255.255.255.0 connected to the node's ethB, while network simulator B has an internal network of 10.10.0.0 with a netmask of 255.255.255.0 connected to the node's eth3. Generally, the CM 306 can be configured to interface with the SMD 314 to turn the term "internal" in a scenario file into actual physical interfaces and network segments.

Figure 5:
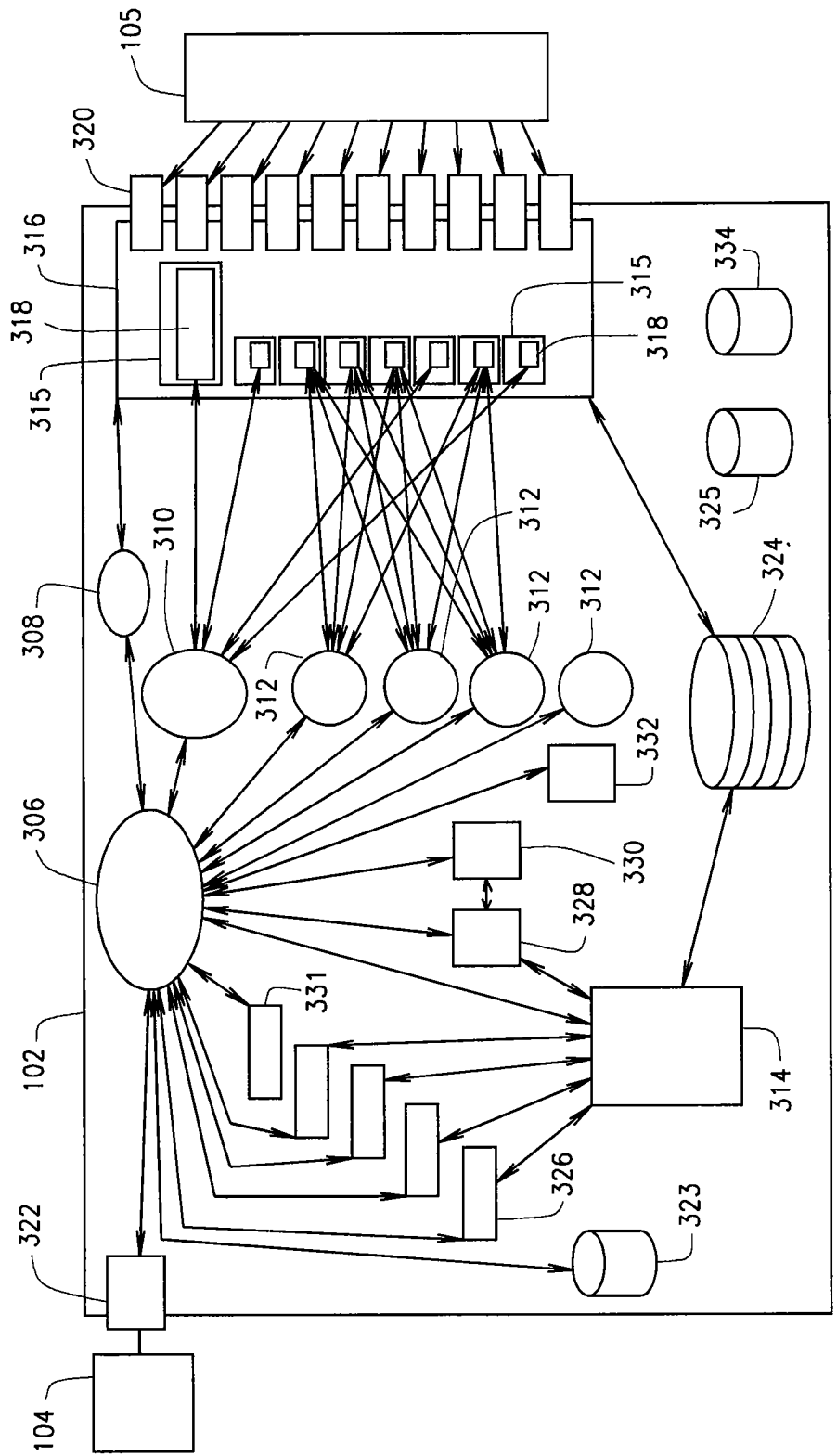
FIG. 5 is block diagram of a Node including modules and components and flows within a Node according to one exemplary embodiment thereof.

FIG. 5 illustrates the Node 102 in more detail including various flows between the modules as discussed with regard to FIG. 4. Additionally, FIG. 5 illustrates Physical Interfaces 320 for connecting the Node 102 to the Simulated Network 105 and the, the GUI interface 322, a Configuration Store 323, traffic store 324, traffic generation modules 326, a traffic analysis module 328, a reports analysis module 330, a network check module 331, a user action module 332, and a recorded user action store 334.

A Network Preference Description enables a user to view, add, remove and edit the Network Configurations for any network device. These can be entered manually by a user via the Network Preference Dialog of the Node 102 as mentioned above or via an automated network preference device manager, such as an Automated Network Build Module, which in one embodiment is referred to as AutoBuild, by way of example. The Network Devices can be defined by one or more of the following, which can be a field or entry of data:

1. Name—The name that will be displayed throughout the user interface for this Network Device.

2. Category—The assignment to a group that indicates how this Network Device will act in a simulation environment.

3. Function—The primary function or role this Network Device will assume in the network configuration.

4. Subfunctions—The secondary or ancillary role(s) this Network Device will assume in the network configuration subordinate to the primary role.

5. Operating System—The operating system installed on the Network Device.

6. Architecture—The Network Devices computer hardware.

7. NICS—The network interface controllers (NIC) available on the Network Device.

8. Available—The number of available network Device Connections on this Network Device.

Additionally, the connections or relationships between any two network devices can be defined as a Connection. The user can add or modify a connection between two Network Devices, or two NICs of two Network Devices in the configuration. These network connections can be defined by one or more data fields including:

1. Network Device—The Network Device that makes up one endpoint of the connection.

2. Network Device NIC—The NIC on the Network Device to which the connection is made.

3. Target Network Device—The Network Device that makes up the other endpoint of the connection.

4. Target NIC—The NIC on the Target Network Device to which the connection is made.

Network Preference User Interface—A Network Preference User Interface such as a GUI 104 can provide the user the capability to create, view and change network devices, network connections and network configurations for a system. The network preference GUI 104 actions can include, but is not limited to:

1. Connected Network Devices—Drop-down list that displays the currently connected Network Devices for selection.

2. Save—Commits the changes made in the editor back to the Network Device shown in Connected Network Devices.

3. Configurations—Drop-down list that displays the currently defined Network Configurations for the Network Device selected in Connected Network Devices.

4. Edit—Locks the configuration shown in Configurations. Grants exclusive access to the configuration to this editor for the purpose of making changes.

5. Network Device Table—The table lists all the currently configured Network Devices of the configuration selected in Configurations.

6. Add Network Device—Opens a blank Network Device Editor. The user must supply all the necessary information, that when validated, will add a new Network Devices to the currently displayed configuration.

7. Delete Network Device—Removes the selected Network Device in the Network Device Table from the currently displayed configuration.

8. Edit Network Device—Opens the Network Device Editor populated with the information of the currently selected Network Device in the Network Device Table.

9. View Network Device Connections—Open the Connection Summary dialog.

A Network Device Editor can provide the capability to create and edit the properties of a Network Device. These properties define what role a Network Device plays and the interactions with it from other Network Devices.

1. Edit—Opens the NIC editor which allows assignment and editing of the different properties of a NIC.
2. NIC List—Displays the list of names assigned to the available NICs on this Network Device.
3. NIC Properties—Area that displays the properties of the selected NIC in the NIC list.
4. Network Device Connections Table—Displays the list of current Network Device Connections made between this Network Device's NICs and other Network Devices NICs.
5. Edit Network Device Connections—Opens the dialog to create, remove and edit the Network Device Connections made between this Network Device's NICs and other Network Devices in the network configuration.
6. Previous (<<)—Changes the data in the editor to the previous item in the Selector List.
7. Selector List—Displays a selectable list of Network Devices that when selected will repopulate the editor with the information for that Network Device.

The GUI 104 can also enable users to add, remove and edit Network Device Connections. This can include the various fields, as described above, and also include editing functions such as:

1. Add Connection—Opens a blank Connection Editor that allows the user to create a connection between two Network Devices' NICs in the network configuration.
2. Remove Connection—Removes the selected connection from the configuration.
3. Edit Connection—Allows a user to edit the selected connection details.
4. Close—Closes the dialog. There can be no saving or discarding of unsaved work from this dialog as everything displayed is already saved.

A Connection Editor can enable the user to add or modify a connection between two Network Devices, or two NICs of two Network Devices in the configuration.

1. Network Device Name—The name of the Network Device from which this editor was launched (read-only) or a selectable list of all the Network Devices if adding a new connection.
2. NID ID—A selectable list of the NICs on the Network Device displayed in Network Device Name.
3. Properties Box—A display of the properties of the NIC selected in NID ID.
4. Target Network Device—A selectable list of Network Devices that have available non-connected NICs.
5. Target NIC—A selectable list of non-connected NICs on the Network Device displayed in Target Network Device.
6. Properties Box—A display of the properties of the NIC selected in Target NID ID.

This editor may be displayed from a Network Device Editor or the Connection Summary dialogs although its behavior may change slightly depending on the context in which it was displayed.

As will be discussed in more detail below, a Node Tool Suite (such as the SLAM-R Tool Suite by way of example) can be configured as a control mechanism for users over the Node software. Such tool suite can be used by an operator, such as an instructor, for connecting to the control module. It can be configured to import, export, load and close attack scenarios on the Node 102 via that connection. The Node Tool Suite can also be configured to pause, play, rewind, fast forward, modify and perform other operations on the loaded attack scenario as well. Its operation can be as simple as loading a pre-planned scenario and clicking "Play" to let it run automatically, or the user can have fine control over the scenario.

The Node Tool Suite can provide an interface to the Node 102 and one or more of its components. The tool suite can be implemented with any suitable GUI 104 or user interface and in one embodiment can be a Java client program installed onto a computer with the latest JRE (Java Runtime Environment). The Node Tool Suite can be configured to connect to the Node via a standard TCP/IP client-server relationship. The Node 102 can report status and provide for control of the different modules which are loaded on the Node 102. Not all modules are required to be present in any single embodiment, as each module can be capable of running independently or in unison with other modules. In some embodiments, the Node Tool Suite can provide for the centralization and integration of all the necessary tools into an intuitive and easy to use interface.

Exemplary Graphical User Interface (GUI) for the Node

The Node Graphical User Interface (GUI) 104 allows users to interact with the Node appliance. The GUI 104 is designed to give users access to various functionalities of the appliance and to enhance the efficiency and ease of use of such interactions.

Menu Bar—The menu bar provides access to various aspects of the program through drop down menus. The menu bar items closely mimic standard windows menu behaviors. Many of the functionalities accessed via the menu bar can be accessed through other means within the application, such as through buttons or context or right-click and menus.

File Menu—The file menu contains common commands. The menu items on this, and every menu, may be associated with the component/window of the application that has focus and will be enabled or disabled dependent on whether the item that has focus supports the operation associated with the menu item.

Disconnect—The Disconnect command will disconnect a currently connected appliance. The menu item will be enabled or disabled depending on whether or not the window that has focus is associated with a particular appliance connection. This action can also be accessed via a context menu in the appliance explorer.

Open Scenario—The Open Scenario command will present the user with a list of scenarios which may be loaded on an appliance. This command will be enabled or disabled depending on whether the window that has focus is associated with a valid connection to an appliance and that appliance does not already have a scenario loaded. This command can also be accessed via a context menu in the appliance explorer.

Close Scenario—The Close Scenario command will close the currently loaded scenario on an appliance. The menu item will be enabled or disabled depending on whether the window that has focus is associated with an appliance that has a scenario loaded. This command can also be accessed via a context menu in the appliance explorer. The user must provide confirmation to close the scenario which can be disabled in the Options dialog.

Exit—The Exit command closes the application which, if connected, will disconnect from an appliance. Any scenarios running on the appliance will not be affected. The user will be prompted to confirm they want to exit unless this confirmation is disabled in the Options dialog.

View Menu—The View Menu provides access to various components with the application which can be shown or hidden.

Toolbars—The various toolbars can be shown or hidden via the Toolbars submenu. An open toolbar will have a check mark next to its menu item.

Full Screen—The Full Screen command will either expand the application to the same size as the computer screen or shrink the application back to its size before it was maximized to full screen.

Tools—The Tools menu controls access to user configurable aspects of the application.

Options—the Options command will display options dialog to the user which allow the user to set various configuration options within the application. e.g., enable or disable confirmation dialogs.

Window—The Window menu provides access to the various windows within the application to include the Appliance Explorer, Output and Execution Manager windows. Also provided are actions which may be performed on a window if applicable.

Appliance Explorer—The Appliance Explorer command opens the Appliance Explorer window which by default docked on the left side of the application.

Appliance Windows—The Appliance Windows command provides access to a submenu which contains an entry for each connected appliance.

Connect—A connection to an appliance can be established by entering the IP address of a known appliance and clicking Connect.

Traffic

Zulu Time—Zulu (UTC) time is displayed.

Appliance Explorer—The Appliance Explorer component of the application provides access to various functions associated with managing and controlling appliance operations. Connected appliances will be shown in the window.

Appliance operations—Appliance operations can be performed by either double-clicking on the appliance display name, which will open the Appliance Window for the selected appliance, or by right-clicking on an appliance display name which brings up a menu of available commands for that appliance. The Appliance Explorer window can be minimized by clicking on the small left-facing arrow in the upper right hand corner of the window. Connection status of the appliance is indicated by the green or red icon next to the display name of the appliance.

View—Selecting this item opens the Appliance Window for the selected appliance (same as double-clicking).

Reconnect—Selecting this item will attempt to reconnect to the same IP as was previously connected. This menu item is enabled when a previously connected appliance has become disconnected.

Disconnect—Selecting this item will disconnect from the connected appliance. Note: The appliance will continue to run tasks or activities that were started before the disconnection occurred. This item is enabled when connected to an appliance. The user can be prompted to confirm the disconnect where confirmations have not been disabled in the Options dialog.

Open Scenario—Selecting this item will present the user with a selection dialog populated with the available scenarios on the connected appliance, if any. Item is enabled when connected to an appliance.

Close Scenario—Selecting this item will attempt to unload the scenario from the appliance. Item is enabled when connected to an appliance which has a scenario loaded. The user will be prompted to confirm closing the scenario if confirmations have not been disabled in the Options dialog.

Appliance View—The Appliance View displays the available modules on the appliance. Currently, only the Execution Manager is available. The display name of the appliance is shown on the tab.

Execution Manager—Currently the Execution Manager is the only available module. The Execution Manager provides the user the ability to view and control various aspects of the scenario that has been loaded on the appliance. The window is split into two parts, the scenario pane and content pane. The scenario pane on the left is a visual representation of the scenario in a tree-like view. The content pane on the right displays the metadata for the selected panel on the left.

Scenario Content—The main view of the Execution Manager when a scenario has been loaded. The content pane displays the scenario information (metadata) which is activated by clicking the mouse on the 'Scenario Information' panel. This can be the default view when opening a scenario.

Attack Content—Selecting one of the attack events the scenario information will display the details of the event in the content pane. These include: Attack Controls, Start, Stop, and Reschedule.

Attack Processes—Clicking this button will display a menu of internal processes that make up the event. The processes can be selected individually to see the output of each process in the content pane.

Scenario Player controls—The Scenario player controls allow the user to control the scenario execution. The controls closely mimic standard media player controls such as Play/Pause, Stop, Previous and Next.

Play—Clicking this button begins execution of a scenario. Once play has begun the play button becomes the Pause button. If Pause is then pushed the button will switch back to Play.

Stop—Clicking the button stops execution of a scenario. Selecting Stop will reset the scenario to an initial state prior to execution.

Previous—Clicking this button moves the timeline (T time) back to a point prior to the previous attack event or to the beginning of the scenario depending on how much of the scenario has executed.

Next—Clicking this button moves the timeline (T time) to a point prior to the next attack event that has not begun executing.

Time Slider—The time slider manually allows manipulation of the timeline to any point in the scenario timeline. Using the slider during the Play or execution of a scenario will not take effect until the user has released the time slider thumb and confirmed the new T time.

Output Window—Various types of information can be displayed in the output window regarding the activities and state of the application. The output window can be minimized by clicking the small downward-facing arrow.

Node Communication Protocol

The Node Communication Protocol is the mechanism for communication between the modules that can be included in the Node and can be a protocol as described herein as the Node Protocol, by way of exemplary embodiment herein. For the sake of brevity, this description is represented with regard to an attack network scenario that includes the CM protocol as a logical correlation between system components or modules. Additionally, while a specific protocol for executing certain functionalities may not be explicitly defined, one skilled in the art will understand that from this exemplary disclosure, a logical extension can be derived to provide the other system functionalities as otherwise described. As one example, in the section herein addressing the network reconstitution module, a specific application protocol for reconstitution is described.

This reconstitution protocol example, can be extended using this node protocol disclosure to incorporate other instructions and extensions as may be suitable for any needed functionality for one skilled in the art.

There can be two basic forms of communication between the user interface 104 and the control module 306. The first can be synchronous communication. The second can be asynchronous communication. Synchronous communication includes all standard commands and queries that may be performed on the node. The asynchronous communication includes heart-beat messages, log messages and state-change notifications.

Server message format—Whether a message from the server can be synchronous or asynchronous, it can have the same format: "TYPE <code>[<initiating-command>;] <message>." In an exemplary initial 4-character "word" it can specify the type of message, e.g. RESP. The initiating-command can be given for response messages. Finally, the message section can be free form text, unless otherwise specified for a specific message type.

The message code—The code can be any length and in one embodiment is a 3-digit number. They can be assigned by groups such as:

200-series numbers indicating definite success.

300-series indicating an intermediate success with a final response to be sent later.

400-series messages indicating a temporary error.

500-series indicating a permanent error. The first digit of the code indicates success or failure.

Success and failure categories can include:
2xx—Positive completion response
3xx—Positive intermediate reply
4xx—Temporary negative response
5xx—Permanent negative response The second digit of a code can indicate something about the type of the message. For example:
x0x—Syntax errors or miscellaneous messages
x1x—Informational messages
x2x—Connection related messages
x5x—Replies related to the scenarios themselves The initiating-command—The initiating-command field can apply to response messages and specify which command prompted the response. Response messages can have the RESP type. They can have an initiating-command immediately after the code. The initiating-command can be followed by a semi-colon. The trailing semicolon can be to separate multi-word commands from the free form message section.

The message text—As mentioned above the message section of the response can be generally free form text. Some messages may choose to specify a format for this section. When that occurs, fields may be delimited within it by semi-colons.

Initial connection—To initiate a connection with the node, the GUI 104 contacts the CM 306, on port face X. The CM 306 can acknowledge the connection with a multi-field (semi-colon delimited) message such as in the exemplary format: "CONN <code><node-name>; <software version>; <time>". When first connecting to the CM 306, a normal successful acknowledgment can be provided and can include a version number of the CM 306 and a 7 hexadecimal digits after the slash can provide an indication that the CM 306 source that was checked out of git. This can enable developers to always know exactly what can be running on the node. Following the second semicolon can be the current time in a localized format.

A temporary failure can be indicated by a 400-series message. In this case, the connection could be automatically retried later. This might happen if the server were out of memory or some other temporary resource problem. For example, a temporary failure may be: "CONN 440 Server busy. Try again later."

If a 500-series response can be received it indicates a permanent failure and there can be no sense in retrying the connection. This can include an exemplary permanent failure such as: "CONN 550 Access denied."

General command and response format—The traffic between the GUI 104 and the Node 102 can be line oriented. Whether a command can be being sent, a response can be being received or other communication can be occurring, each line can end with a carriage-return linefeed sequence, "\r\n". The content can be UTF-8 encoded to allow for non-English strings and data.

Typical commands and messages—The various commands are comprised of a 4-character "word" that may be followed by required or optional arguments: "CMND [args]."

Response messages—When a response message is sent it can be of the form: "RESP <code><initiating command>; <message>." For example, "RESP 210 CTRL; Control granted."

Multi-line messages—While single line responses can be the norm, it can be possible that the server needs to send multi-line messages. Log messages and possibly data transfer may require this. A format similar to the FTP and SMTP standards can be used. The final line of a response can have a space after the code, non-final lines can have a dash, —. For example, a multi-line response can include: RESP 220—HELP; This server supports the following commands:
RESP 220—HELP; Topics:
RESP 220—HELP; HELP CONN QUIT PLAY STOP
RESP 222—HELP; For more info use "HELP <topic>"
RESP 220 HELP; End of HELP info Interleaved message streams—Due to some asynchronous messages having a high priority it can be possible that the packets may arrive with different message types interleaved. The previous response could actually have come across mixed with other messages such as:
RESP 220—HELP; This server supports the following commands:
RESP 220—HELP; Topics:
BEAT 200 T+34
RESP 220—HELP; HELP CONN QUIT PLAY STOP
RESP 222—HELP; For more info use "HELP <topic>"
LOGG 200—Attack initiated:
LOGG 200 Alderaan targeted by deathstar.
LOGG 201—Strike back successful:
LOGG 201 Deathstar destroyed.
RESP 220 HELP; End of HELP info These may be sorted out by type giving the following streams of data:
BEAT 200 T+34
RESP 220—HELP; This server supports the following commands:
RESP 220—HELP; Topics:
RESP 220—HELP; HELP CONN QUIT PLAY STOP
RESP 222—HELP; For more info use "HELP <topic>"
RESP 220 HELP; End of HELP info
LOGG 200—Attack initiated:
LOGG 200 Alderaan targeted by deathstar.
LOGG 201—Strike back successful.
LOGG 201 Deathstar destroyed.

As such two log messages can be interwoven. However, it may be desirable in some embodiments that messages of the same type should never be mixed together. They can be sent sequentially. So, the log messages may then be further separated into two distinct messages by noting the spaces after the response code field on the final line of each message. For example:

LOGG 200—Attack initiated:
    LOGG 200 Alderaan targeted by deathstar.
    LOGG 201—Strike back successful.
    LOGG 201 Deathstar destroyed.

Essential node commands—After connecting, there are a number of different requests that the GUI 104 can make of the CM 306. They fall into a few basic categories that are delineated by the specific "word" that initiates each command, such as a 4-character word, by way of example. Commands can be sent one per-line and can end with a carriage-return linefeed sequence, "\r\n". Examples of CM 306 Commands include:

CTRL—Request control of the CM
    SCEN—Various scenario commands
    ATTK—Attack related commands
    STAT—Request the node's status
    CLOC—Turn on or off the time messages from the server
    LOGH—Send the log history These commands can produce an immediate response. But due to the fact that the CM 306 also generates asynchronous messages, they may not be received immediately after the command can be sent. Other, asynchronous messages may intervene. The GUI 104 may not send multiple commands at a time. After a command is sent, the GUI 104 may wait for a response before sending the next command.

CTRL: Requesting control of the node—This can be the simplest command, consisting of CTRL on a line alone. A single-line CTRL response can look to be for example:

RESP 220 CTRL; Success. Control Granted.
    RESP 440 CTRL; Node controlled by 10.10.128.97.
    RESP 501 CTRL; You already control the node.

The error responses can be text that is displayed to the user running the GUI 104. Stripping the response word and code could be optional.

SCEN: Scenario-related commands—SCEN has a set of sub-commands, all of which have to do with controlling scenarios on the server. The sub-commands are used to query, load, list and control the running scenario on the server. Many of these commands can be run with or without first taking control of the node via the CTRL command. The one definite exception can be the CTRL LOAD sub-command, which can be used to instruct the node to load-up and prepare to run a specific scenario. SCEN commands exemplary listing:

SCEN NAME—Name of loaded scenario, if any
    SCEN LIST—Return a list of scenarios
    SCEN LOAD—Load and prepare to run the given scenario
    SCEN FETC—Fetch the data for a given scenario from the node
    SCEN SAVE—Push and save the data for a given scenario on the node
    SCEN STAT—Query the status of the scenario
    SCEN TIME—Change scenario time
    SCEN PLAY—(Re)start playing the scenario
    SCEN PAUS—Pause the scenario
    SCEN STOP—Stop the scenario
    SCEN CLOS—Close and unload the scenario from the node When successful, the commands that cause a state change in the node can produce an asynchronous state-change message in addition to a regular response.

SCEN NAME: Name of current scenario—To query what scenario can be loaded, simply send the: "SCEN NAME command." The CM 306 can respond with the name of the scenario: "RESP 201 SCEN NAME; bd2008s1.scn; Bulwark Defender 2008 Scenario 1." The response consists of the RESP tag, a success code, the actual file name and a description. The file name and description can be separated by a semicolon and some optional space. Everything after that can be the description. If no scenario can be loaded, a temporary failure response can be sent, since there can be no current scenario to report on. "RESP 401 SCEN NAME; No scenario loaded."

SCEN LIST: The SCEN LIST command can return a list of available scenarios, such as:

RESP 201—SCEN LIST; bd2008s1.scn; Bulwark Defender 2008 Scenario 1
    RESP 201—SCEN LIST; bd2008s2.scn; Bulwark Defender 2008 Scenario 2
    RESP 201—SCEN LIST; bd2008s3.scn; Bulwark Defender 2008 Scenario 3
    RESP 201 SCEN LIST; bd2008s4.scn; Bulwark Defender 2008 Scenario 4

One possible temporary error response would be if the node had no scenarios, e.g., "RESP 402 SCEN LIST; No scenarios available." Other error responses are possible.

SCEN SAVE: Save a scenario on the node.—Before a scenario can show up in the SCEN LIST output it should have been saved to the node. This can be done with the SCEN SAVE command: "SCEN SAVE bs2008s1.scn." To which the server can respond with: "RESP 301 SCEN SAVE; Send file, end with "." on a line by itself or "RESP 501 SCEN SAVE; Need CTRL command first."

After file transmission can be complete the server can respond: "RESP 250 SCEN SAVE; bs2008s1.scn successfully saved or an appropriate error response." Error responses for SCEN SAVE can include: RESP 450 SCEN SAVE; Error saving bs2008s1.scn: drive full Since the scenario files are XML, a single period on a line by itself can be used to mark the end of the file. If, however, for some strange reason a line containing a single period is contained in the file, escape the period, ".", with a backslash, "\.". This also means that a line beginning with a backslash will need to be escaped as well.

The backslash escape can only be checked for at the beginning of a line during file transmission. It can not be processed during other commands nor can it be processed later in the line.

SCEN FETC: Fetch the data for a given scenario from the node—SCEN FETC can fetch a scenario file from the server: "SCEN FETC <filename>" to produce one of the following responses: "RESP 502 SCEN FETC; <filename> not found" or "RESP 302 SCEN FETC; Sending <filename> DATA . . . DATA . . . ", or "RESP 251 SCEN FETC; Finished sending <filename>".

SCEN LOAD: Load and prepare a scenario—Once the user has selected a scenario and it can be known to be saved on the server, it may be loaded and prepared for running using the SCEN LOAD command and the name of the file: "SCEN LOAD bd2008s1.scn."—Here the response can normally be an intermediate success message: "RESP 303 SCEN LOAD; Loading bs2008s1.scn." Once the scenario has been initialized another response can be sent along the lines of: "RESP 223 SCEN LOAD; Successfully initialized the bs2008s1.scn scenario"; or "RESP 505 SCEN LOAD; Something bad happened . . . "

SCEN STAT: Query the status of the scenario—The node sends asynchronous messages when a scenario's state changes. But, it may be necessary to query the state when first connecting to a node that has a loaded scenario. This may be done with: "SCEN STAT." There can be no error responses to the message. The successful responses include, by way of example:

RESP 271 SCEN STAT; None—No scenario loaded

RESP 271 SCEN STAT; Initializing—Initializing a scenario

RESP 271 SCEN STAT; Ready—Scenario initialized and ready

RESP 271 SCEN STAT; Running—Scenario running

RESP 271 SCEN STAT; Paused—Scenario paused

RESP 271 SCEN STAT; Completed—Scenario completed

RESP 271 SCEN STAT; Stopping—Stopping scenario processes

In addition to this response, the SCEN STAT command can also trigger the sending of a single-separate heart-beat message.

SCEN TIME: Change the scenario time—Once a scenario can be loaded, the time may be changed with: "SCEN TIME". This command can be used when the scenario can be in the "Ready", "Running", or "Paused" state. It can be up to the requesting source to verify that the time cannot be changed within 2 minutes of an event. In the case of a success, it can elicit the following response: "RESP 240 SCEN TIME; Time Changed to <t-time>." When this command can be executed, a heartbeat can be sent to all connected GUI's 104 as well as a logg message describing the change.

SCEN PLAY: (Re)start playing the scenario—Once a scenario can be loaded and the server can be ready: "SCEN PLAY", may be used to start the scenario. This command can be also used to resume playing a scenario after it has been paused. This can elicit the following response: "RESP 227 SCEN PLAY; Playing bd2008s1.scn from T+0." This can be followed by an asynchronous state-change message some time later.

SCEN PAUS: Pause the scenario—When a scenario can be in the "Running" state it may be paused: "SCEN PAUS". The response can indicate the point on the time line when things paused: "RESP 228 SCEN PAUS; Paused bd2008s1.scn at T+90." Any running processes on the bots can have SIGSTOP sent to pause their execution.

SCEN STOP: Stop the scenario—SCEN STOP can initiate a shutdown of the current scenario. This does not unload the scenario from the simulator. It just shuts down its processes and re-initializes it. Just send: "SCEN STOP" to the node. When this command can be received the process of killing the scenario begins, so a 300-series intermediate positive response can be sent: "RESP 329 SCEN PAUS; Stopping bd2008s1.scn . . . " Once the processes have been killed and everything has reset, a 200-series positive completion response can follow. "RESP 229 SCEN PAUS; Stopped bd2008s1.scn." Along with these, two asynchronous state-change messages can be sent. One upon entering the stopping state and one upon returning to the ready state.

SCEN CLOS: Close (unload) the scenario—After a scenario has been stopped, it may be completely unloaded from the node using the: SCEN CLOS command. The expected response would be like: "RESP 339 SCEN CLOS; Unloading scenario bd2008s1.scn." After the process of tearing down the bots and everything else can be completed a: "RESP 239 SCEN CLOS; Scenario unloaded successfully" message can be received along with an asynchronous state-change message to the None state.

ATTK: Attack-related commands—Possible ATTK commands include:

ATTK INFO—Set socket up for receiving attack process output

ATTK LIST—Get current timeline list of attacks

ATTK MOVE—Reschedule an attack

ATTK DURA—Change a scheduled attacks duration

ATTK STOP—Kill an attack or attack process

ATTK EXEC—Execute an attack now without warnings or reschedule

ATTK INFO—When a WARN message can be received, the front-end can open another connection to the node on the standard port, 6420610, and use this command to request the output from the attack process: "ATTK INFO <attack-id>; <process-id>." The attack-id can be the unique attack identifier that can be specified in the LOGG section. The process-id can be the unique process identifier specified in the scenario file. Possible responses are: "RESP 350 ATTK INFO; Process output from <attack-id>"; or "RESP 550 ATTK INFO; <attack-id> unrecognized". A successful response message can be followed by the un-massaged data stream from the attack process. It may be either line- or character-oriented, depending upon the attack process. The CM 306 does not control or interpret this data. However, the GUI 104 can respect CRLF pairs or other end-of-line character sequences. This can be because the stream may be generated by third-party software that was not written with the expectation that its standard output would be redirected across a network.

A successful post-attack LOGG message can include: "LOGG 251 DOS #1-P1; 134021; T+7230; Attack ran to completion." An unsuccessful post-attack LOGG message can include: "LOGG 551 DOS #1-P1; 134021; T+7230; Attack process terminated unexpectedly."

ATTK LIST—This command can be used in conjunction with SCEN FETC to get an up-to-date timeline from the node. It can contain the actual schedule of attacks which may differ from the original spec found in the scenario xml file. The command can be sent bare such as:

ATTK LIST—And the response can contain the entire timeline noting just the attack_id (gotten from the scenario file) and the schedule time in t-seconds:

RESP 201-ATTK LIST;60;1

RESP 201-ATTK LIST;120;2

RESP 201 ATTK LIST; List Finished

This response indicates attack_id 1 scheduled for minute 1, and attack_id 2 scheduled for minute 2.

ATTK MOVE—ATTK MOVE can reschedule all processes of a specified attack_id. It can be sent as: ATTK MOVE <attack id>;<t-seconds>. This can elicit a RESP message as well as a UPDT SCHD and a LOGG message noting the change.

RESP 200 ATTK MOVE; Moved attack <1> to time T+25 UPDT SCHD 1;25

LOGG 250 EVENT; 07:30:00; T+35; Attack ID <1> rescheduled to T+25

It can be currently up to the requesting source to verify the attack cannot be rescheduled in the next 2 minutes from current time.

ATTK EXEC—In some cases, such as a "Run Now" or "Jump to Event" GUI event, it can be required to have an attack execute immediately without waiting for the next tick or for warnings to be sent. This can be allowed for certain processes to execute on their own, so the command takes in both an attack_id and a process_id. If issued with a process id of 0, then the attack can be started normally with any non-persistent/non-dependent processes immediately executed.

For example:

```
ATTK EXEC <attk_id>;<proc_id>
ATTK EXEC 1;0
ATTK EXEC 1;1
ATTK EXEC 1;2
```

It can generate standard RESP and LOGG messages upon success, or just a failed RESP if failed.

ATTK STOP—This command can let the control GUI 104 stop an attack early by instantly killing any of the duration processes that the attack has running. This can currently leave any non-duration transient processes running to completion. This behavior can change if a "killable" flag if provided inside the scenario xml file. If issued with a process id of 0, then all duration processes for the given attack can be stopped.

```
ATTK STOP <attk_id>;<proc_id>
ATTK STOP 1;0
ATTK STOP 1;1
ATTK STOP 1;2
```

It can generate standard RESP, DONE and LOGG messages upon success, or just a failed RESP if failed.

ATTK DURA—As some attack processes have a predefined duration attached to them, this command gives the ability to change a duration on the fly when the process can be not running.

```
ATTK DURA <attk_id>;<proc_id>;<new_duration_in_seconds>
ATTK DURA 1;1;25
ATTK DURA 1;2;90
```

It can generate standard RESP, UPDT DURA and LOGG messages upon success, or just a failed RESP if failed.

STAT: Status request—At any point in time the GUI 104 may request a status notification by sending the STAT message. The response can be: "RESP 27x STAT; <state>; <available transitions>." The state can be one of None, Initializing, Ready, Running, Paused, Completed, or Stopping, Closing. If there are any transitions that can be initiated by the user via buttons or similar GUI 104 devices, the available STAT subcommands can be listed in available transitions. These may be any of PLAY, PAUS, STOP, and CLOS.

Some possible STAT responses include: "RESP 27x STAT; Running; PAUSE STOP," and "RESP 27x STAT; Paused; PLAY STOP."

CLOC: Controlling the heartbeat clock—The CLOC message may be used to request heartbeat and attack-warning messages from the server. Heartbeat messages are sent ever-so many seconds and indicate the current point on the time line. A warning message can be sent the requested number of seconds before an attack can be initiated, such as: "RESP 240 CLOC T+3600; Thu January 17 15:22:13 CST 2008." The T+3600 means that the current time can be 3,600 seconds, 1 hour, into the scenario. The time following the semicolon can be simply the current time on the bot. This can be the same text that would be produced by running the date command on the node. Sending CLOC with a number indicates how often a heartbeat message can be desired. Use this form to turn on heartbeat messages. Another example includes: CLOC <seconds>;<warning seconds> by sending CLOC 60; 15. This requests a heartbeat message when T modulus 60=0 and a warning message 15 seconds before a pending attack. To turn off asynchronous heartbeat messages, send: CLOC 0; 15, and the server can stop sending heartbeat messages. But it can still send the 15 second attack-warning message. Setting both to zero, CLOC 0; 0 or CLOC 0, can turn off all heartbeat messages from the node.

LOGH: Get log history—When reattaching to a node, it may be necessary to get the log history. This may be done with the LOGH command: LOGH. This can include Chronological vs. Reverse Chronological, Format, and Time stamping. This has described an exemplary embodiment of the synchronous aspects of the GUI-node protocol. One skilled in the art should understand how to connect to a node, how to take control of it and what is necessary for running a scenario.

Asynchronous messages—In addition to the synchronous messages, the server may send some asynchronous messages as well. These can all be denoted by an initial 4-letter code. For example:
  BEAT—A "heartbeat" message
  WARN—An attack-warning message
  EXEC—An attack execute message
  DONE—An attack has finished
  STAT—A state-change message
  LOGG—A log message
  UPDT DURA—A duration has been changed
  UPDT SCHD—An attack was rescheduled
  UPDT SCEN—A scenario file was changed BEAT: The time line heartbeat message—Heartbeat messages may be requested or turned off using the CLOC command detailed above. When the server sends a heartbeat message it has the form: BEAT T+<seconds>. This indicates how many seconds the system can be into the scenario's time line and the local time of the node as explained with the CLOC command.

WARN: An attack can be coming—When the CLOC command has been used to request an attack-warning message the node can send the following, when an attack can be eminent. The time included can be the current time, not the time of the scheduled attack that can be calculated by the current time+warn time. For example, "WARN <t-seconds>;<attk_guid>; <process_guid>"; "WARN 60;1;1." Here, attack-id can be the unique attack identifier, which can be discussed in the log messages section. At this point, if the GUI 104 wants to capture the process display info for the attack, it can open another connection to the node on the standard port and send an ATTK INFO command requesting the process display info for that attack.

EXEC: An attack can be executing—When an attack process actually begins execution, a message can be sent to all connected GUI's 104 to inform them, as well as a LOGG message. It can also contain how many times this attack process has been executed since load. The EXEC message itself can be very similar to the WARN, in the format: "EXEC <t-seconds>;<attack id>;<process_id>; Process Started;" "EXEC 60;1;2; Process Started." The logg message can include: "LOGG 250 EVENT; 15:22:53; T+30; Attack ID <1> Proc ID <1> Started for Run[1]."

DONE: An attack finished executing—When an attack process finishes execution, a message can be sent to all connected GUI's 104 to inform them, as well as a LOGG message. The DONE message itself can be very similar to the WARN and EXEC, in the format: "DONE <t-seconds>;<attack_id>;<process_id>; Process Finished;" "DONE 72;1;2; Process Finished." The logg message can include: "LOGG 250 EVENT; 15:22:53; T+30; Attack ID <1> Proc ID <1> Stopped Running."

STAT: Node state change messages—When the scenario status changes, the node 102 can send a STAT message. This can either happen automatically (like when a scenario has finish initializing) or it can happen as the result of a SCEN command. For example, the State message can be: STAT 205 Ready. The state following the numeric code can be one of the states listed under the SCEN STAT command.

LOGG: Log messages—The server message format gives: LOGG 210 <source-tag>; <real-time>; <T-time>; <message>. The source-tag can be SCENE, Node, or a unique attack identifier. The SCENE tag can be for messages specific to the scenario. The Node tag can be for node-level errors and messages which are not related to a scenario. The unique attack identifiers are not defined in this document. However, the source-tag can end with dash-P-number, –P#, indicating whether this can be the first, second, or later pass through the given attack since the scenario was started. (If the scenario can be stopped and later re-begun, these can start over at one.)

The real-time can be given in 24-hour clock HHMMSS format. Seconds can be left off. Since the time line can be rewound and things may be run in a non-linear fashion, this field may be used to sort things, at least down to second resolution. (This may be necessary if it can be decided to send log history in some sort of reverse-chronological block-oriented order.)

The T-time can be given as T+seconds, where seconds can be the number of seconds within the scenario.

For example, a sample of LOGG messages can include:

```
LOGG 250 SCENE ; 14:40:09; T+ 0; Scenario < example_scenario .scn > Loaded
LOGG 250 SCENE ; 14:40:11; T+ 0; Scenario < example_scenario .scn >Started
LOGG 250 SCENE ; 14:40:19; T+ 39; Scenario < example_scenario .scn
>Changed from Time T+8 to new Time T +39
LOGG 250 EVENT ; 14:40:40; T+ 60; Attack ID <1> Proc ID <2>Started for
Run [1]
LOGG 250 EVENT ; 14:40:40; T+ 60; Attack ID <1> Proc ID <1>Started for
Run [1]
LOGG 250 EVENT ; 14:40:43; T+ 63; Attack ID <1> Proc ID <1>Stopped
Running
LOGG 250 EVENT ; 14:41:00; T+ 80; Attack ID <1> Proc ID <2>Stopped
Running
LOGG 250 EVENT ; 14:41:40; T+ 120; Attack ID <2> Proc ID <1>Started for
Run [1]
LOGG 250 EVENT ; 14:41:40; T+ 120; Attack ID <2> Proc ID <1>Stopped
Running
LOGG 250 SCENE ; 14:42:59; T+ 299; Scenario < example_scenario .scn >
Changed from Time T +199 to new Time T +299 20
LOGG 250 SCENE ; 14:43:00; T+ 300; Scenario < example_scenario .scn
>Completed
```

The attack specific messages may have their own error codes at the beginning of the message field.

This format requires that each attack have a unique identifier, not necessarily a UUID. It also requires that the CM 306 and ARM 310, etc. keep track of how many times an attack event has been started.

UPDT DURA—This message indicates that an attack process has had its duration changed. Its format can be:

"UPDT DURA<attk_id>;<proc_id>;<new_duration_in_t_sec>."

UPDT SCHD—This message indicates that an attack has had its run-time rescheduled. Its format can be:

"UPDTSCHD<attk_id>;<new_run_time_in_t_sec>."

UPDT SCEN—This message indicates that a scenario file has been uploaded, changed or removed. This can indicate that the GUI 104 needs to do a new list_fetch sequence: "UPDT SCEN."

UPDT TRAF—Can be sent from the CM 306 to all GUI's when traffic can be toggled, sending either: "UPDT TRAF on"; or "UPDT TRAF off."

TRAF GETT—This can be a command sent from the GUI 104 to the CM 306, and can give a response of: "RESP 200 TRAF GETT;on" or "RESP 200 TRAF GETT;off"

TRAF RATE—This can be sent from the GUI 104 to the CM 306, in the form: "TRAF RATE http;1.5" or "TRAF RATE smtp;5." Any float value can be used, and it can be per second ("0.5" can be every 2 seconds, "5" can be 5 per second).

TRAF STAR—Used to start Traffic, can respond with: "RESP 200 TRAF STAR."

TRAF STOP—Used to stop Traffic, can respond with: "RESP 200 TRAF STOP."

Node MODE—Used by GUI 104 to query CM 306 about mode, can respond with: "RESP 200 Node MODE; Auto" or "RESP 200 Node MODE; Manual."

Node MSET—Used by GUI 104 to set mode if it has control: "Node MSET auto" or "Node MSET manual." Can Generate a response in form of: "RESP 220 Node MSET; Mode set to auto(default)"; or "RESP 220 Node MSET; Mode set to manual."

UPDT MODE—This can be sent to all GUIs 104 by the CM 306 when mode can be changed: "UPDT MODE auto"; or "UPDT MODE manual".

Control Module-to-ORM Protocol—One exemplary embodiment of an inter-module communication protocol between the control module and the ORM 312 is described herein, including the various system components involved, their responsibilities and requirements. The format for communication can be derived from these.

| ORM Protocol Message List |
| --- |
| BOTS total_bots;total_traffic_bots |
| QUEU bot_id;tid;command;umid;arguments |
| SERV bot_id;tid;umid;command;arguments |
| RATE float |
| PLAY |
| PAUS |

Figure 8:
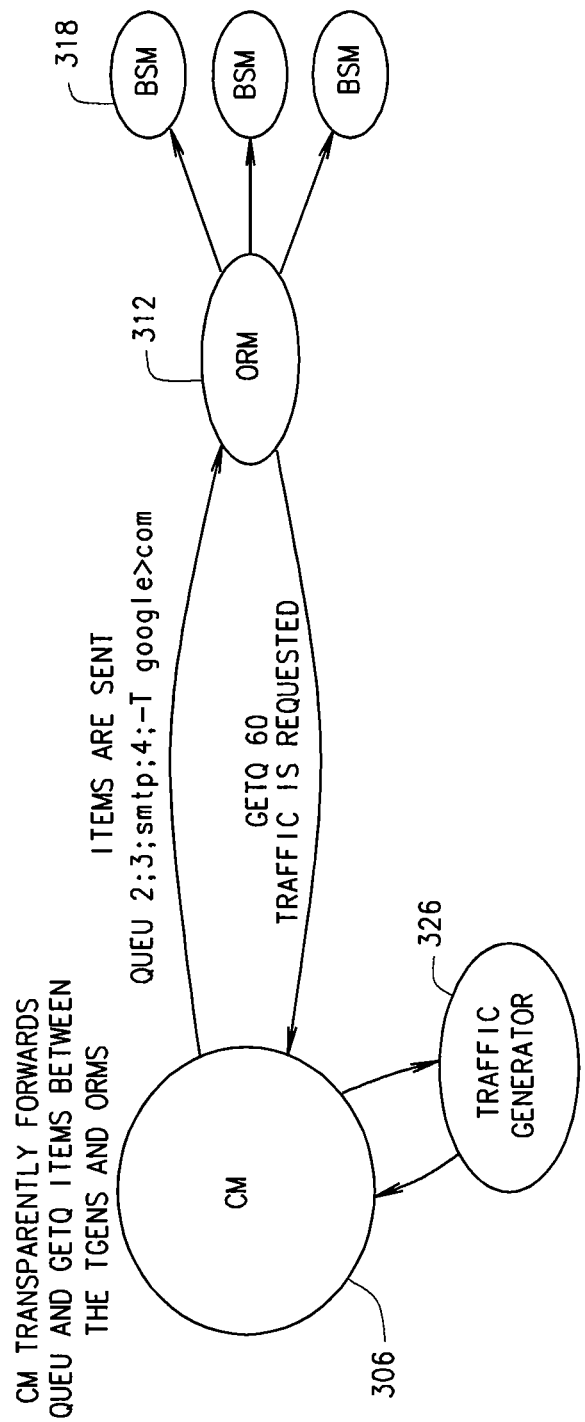
FIG. 8 is a flow chart illustrating a protocol flow for the generation of traffic within the simulated network of a Node according to one embodiment.

This can provide the protocol to be communicated by the CM 306. The CM 306 can then communicate in terms of ORM 312 commands. An example of this protocol exchange is shown in FIG. 8, by way of example.

CM→ORM Commands

BOTS—Sent when ORM 312 first connects, it contains the number of bots so the ORM 312 knows which BSM's it should connect to: "BOTS total_bots;total_traffic_bots"

QUEU—The actual lines generated from the traffic generator for future lines to be executed: "QUEU bot_id;tid;

command;umid;arguments." For example, "QUEU 2;234; ping;4;-n www.google.com -c 4."

SERV—This line can be used to start persistent servers, any commands passed in this manner will be automatically restarted. A small note but in the future release the umid and command are already swapped to retain symmetry with the QUEU and ARM's SCHD: "SERV bot_id;tid;umid;command;arguments."

RATE—This can update the rate per second at which queue items are executed on the BSM's. It can be below 1 for a multi-second rate, and can go up until the max rate of the ORM 312, which can be set at startup: "RATE float," for examples, "RATE 0.0343" or "RATE 25.0."

PLAY—This command can causes traffic to start flowing: "PLAY."

PAUS—This command can cause traffic to stop flowing, by not executing any new items, previously executed items will continue to execute until their timeout occurs: "PAUS."

ORM-> CM Commands

| ARM -> CM protocol |
|---|
| GETQ num_items |
| FAIL tid |
| TIMO tid |
| OVER |
| LOGG |

GETQ—Get Queue, used to grab more items as the internal queue is depleted: "GETQ integer" such as "GETQ 65."

FAIL—Used to notify the CM 306 of a traffic item that has failed: "FAIL tid."

TIMO—Used to notify the CM 306 of a traffic item that has timed out: "TIMO tid."

OVER—Used to notify the CM 306 when the ORM 312 has an alarm which hits after the specified threshold indicating a timing problem. For example: "OVER This ORM 312 is over an alarm limit of ±3 seconds."

LOGG—Can be used for misc communication which might want to be passed back up through to the GUI 104. For example: "LOGG 400 Out of Queue Items." This may also be transformed into a standardized LOGG message and sent to the connected GUIs 104.

Control Module to Attack Relay Module (ARM) Protocol—The following describes an exemplary embodiment of communications relayed by the inter-module communication protocol, the system components involved, their responsibilities and requirements. From this, a format for communication can be derived.

| Attack Relay Module ARM 310 Protocol Message List |
|---|
| BOTS total_bots;total_traffic_bots |
| ATTK SCHD |
| bot_id;tid;time;duration;umid;attk_id;proc_id;command;argument |
| ATTK EXEC attk_id;proc_id;time |
| ATTK MOVE attk_id;proc_id;time |
| ATTK DURA attk_id;proc_id;time |
| ATTK LIST |
| ATTK STOP attk_id;proc_id |
| PAUS |
| CONT |
| CLOS |
| BEAT T+tsec |
| TIME |
| STOP |

This can provide the basic protocol for communication from the CM 306. For this communication, the CM 306 speaks in terms of ARM 310 commands.

CM→ARM Commands

BOTS—Sent when a scenario is loaded, this informs the ARM 310 of the total number of attackers. The ARM 310 uses this information to connect to each of the attacking BSMs 318: "BOTS total_bots;total_traffic_bots."

ATTK SCHD—Used during the process of loading a scenario, gives all information needed to schedule a process for later execution. This will parse the line and actually insert the data into a timeline node: ATTK SCHD bot_id;tid;time;duration;umid;attk_id;proc_id;command;arguments." The bot_id can be ignored, time is the time in T-Minutes of the process. This can be different than most all other commands that are in t-seconds (and this might be changed later to t-seconds, but since its read from xml file which is in t-minutes, currently leaving it in minutes to save a byte or two).

ATTK EXEC—This is used by the CM 306 to actually have the ARM 310 run the process: "ATTK EXEC attk_id; proc_id;time." The time can be in t-seconds and can be used for managing duration processes, so that the ARM 310 knows what time a process was actually started rather than when it was scheduled.

ATTK MOVE—Used to move attacks around, moves all processes of certain attack id, to new time that can be in t-seconds: "ATTK MOVE attk_id;time." This indicates that it cannot move if within 2 minutes of impending attack, warnings and exec may already be scheduled.

ATTK DURA—Used to change attack duration in duration process, to new duration which is in t-seconds: "ATTK DURA attk_id;proc_id;time." This will not change the duration of a currently running attack process, so use before an attack starts, or manually stop the process, change duration and restart.

ATTK LIST—This returns a list of the current timeline in the format: "RESP 201-ATTK," "LIST;time;attk_id." This command can be used by the GUI 104 to get an up-to-date timeline which may differ from the scenario xml file.

ATTK STOP—Allows a attk_id or process_id of 0 to mean all attacks or all processes in a certain attack. Will kill processes: "ATTK KILL attk_id;proc_id."

BEAT—Simply gets heartbeat in same format as GUI 104: "BEAT T+tsec."

TIME—Used anytime the cm manually changes its time. This lets the ARM 310 know that any past warnings may need to be sent again: "TIME."

PAUS—Sends a signal to all active children to pause execution. Works via sending SIGSTOP to the processes: "PAUS."

CONT—Sends a signal to all active children to resume execution. Works via sending SIGCONT to the processes: "CONT."

STOP—Sends a signal to all active children to terminate execution. Works via sending SIGKILL to the processes: "STOP."

CLOS—Used to reset ARM 310 when the scenario is closed. Frees all free-able memory and returns ARM 310 to fresh init state: "CLOS." This command generates response RESP 200 CLOS; to notify CM 306 of success that along with the BM's 310 response triggers a scenario's successful close.

ARM-> CM Commands

| ARM -> CM protocol |
|---|
| OUTP attk_id;proc_id;output |
| RUNA attk_id;proc_id |
| RUNI attk_id;proc_id |

-continued

```
EXEC attk_id;proc_id;instance
LIST
```

OUTP—Used to pass output through the ARM 310 to the CM 306. Output can be binary: "OUTP attk_id;proc_id;output."

RUNA—Run-At Used to notify CM 306 of impending attack, will be triggered 2 minutes before attack. Part of the reasoning behind the 2 minute mark, is that if for some reason the first heartbeat (2 minutes before event) is sent early or missed, the heartbeat directly before the event will trigger it: "RUNA attk_id;proc_id;t-sec," such as "RUNA 1;1;120."

RUNI (Run-In)—This can be similar to RUNA, only instead of running at a specific time(such as T+60 or T+120), it runs based on the current time, so it may run 15 seconds from the current time even if not on a minute mark: "RUNI attk_id;proc_id;t-sec," for example to run 15 seconds from right now: "RUNI 1;2;15."

EXEC—This is response to the CM's 306 ATTK EXEC message notifying the CM 306 that an attack was actually started. The run instance is included to differentiate runs of same process: "EXEC attk_id;proc_id;instance."

RESP—This is in response to CM's 306 messages: "RESP 201-ATTK LIST." This command can be used when the cm is waiting on a response from the CM 306.

ARM 310 Specifics

Timing—The mechanism for timing can be maintained by the CM 306, with the ARM 310 simply holding the information for processes and receiving heartbeats. If a heartbeat is sent that is within a certain range for an impending attack, the ARM 310 will notify the CM 306 with the scheduled time and an attack_id. The CM 306 will be responsible for warning all connected GUI's 104 of the attack, and when the attack's scheduled time occurs the CM 306 will send an EXEC command with the attack_id to the ARM 310 that will trigger the process to fire. The flow can be:

1. CM 306 Schedules attack with ARM 310.
2. ARM 310 receives heartbeat directly before scheduled time, notifies CM 306 of impending attack.
3. CM 306 sets up timer for warnings to GUI's 104 as well as the execution of actual event.
4. CM 306 sends out Exec signal to ARM 310.
5. ARM 310 sends command to BSM 318, notifies CM 306.

Duration Handling—Another function the ARM 310 holds is determining the correct duration of a certain process. This is to keep the responsibility of handling attacks within the ARM 310 rather than the CM 306. Once a process with duration is started, the ARM 310 will handle in intelligently. When the ARM 310 receives a heartbeat out of range of the scheduled duration, it will kill the process. Its timing is based completely from the heartbeats it receives from the cm.

Communication Flowing through ARM a. Attack output. On new socket opened by CM 306 sending ATTK EXEC, to BSM 318 from ARM 310. This socket is then setup to forward all data directly to CM 306 with header attached for process info.

b. Send CM 306 log messages about event/process c. Attk schedule/exec info from CM 306 to ARM 310, exec causes ARM 310 to send msg to BSM 318.

Control Module to Bot Monitor Protocol—This section lays out the data relayed by the inter-module communication protocol, the system components involved, their responsibilities and requirements. From this, a format for communication is derived.

```
BM Protocol
TOTAL total_umids;total_bots
CREAT umid;bot_id
CLOSE
```

This gives us the basic protocol that can be sent by the CM 306. The CM 306 speaks in terms of BM commands.

CM→BM Commands

TOTAL—Sent when a scenario is loaded, it tells the BM how many CREAT messages to expect as well as what memory to allocate: "TOTAL total_umids;total_bots."

CREAT—Used to send the exact mappings between umids and bots, each umid should only appear once: "CREAT umid;bot_id."

CLOSE—Sent when scenario is attempting to close, it causes the BM to free any memory relating to the current scenario and calls xm destroy on the number of bots the last TOTAL was sent with. (it may try to execute xm destroy on a bot that isn't up yet or failed to load): "CLOSE"

BM→CM Responses—The BM only has two types of responses. The first type is the standard "RESP xxx Command" response such as: "RESP 504." The second is the successful load message which is: "BMBM RESP 200."

Bot Server/Server Monitor (BSM) Protocol—The Bot Server Monitor has the following responsibilities:

1. Handle the multiplexing of incoming connections
2. Spawns TEM, TAM, PEM, and PAM processes as directed
3. Track all children processes by tid/umid/pid.
4. List/Stop any child processes.
5. Allow either regular or quiet start to either redirect stdout to either the socket or /dev/null.
6. Parses initial and updated xml configuration and stores information to shared memory for use by processes.

Bot-Command is the message sent from an operational module to the bot. This could be a command given from the queue to start a process, or a command to query or kill a spawned child process. umid and tid are required to be a positive non-zero integer.

Bot-Command Format—The server monitor expects a bot command(instruction) from the ARM/ORM in the following format: Bot-Command Message Format:

COMMAND|TID|MOD|UMID|ARGS

Commands:

STAR—start with socket mapped to stdout
QSTA—quiet start with stdout mapped to /dev/null
STOP—kill a child process by TID
PAUS—Pause all child processes
CONT—Continue(un-pause) all child processes
TERM—kill all children processes
STAT—Status, List all active child processes or search for specific TID
USTA—Status by Umid, search for specific UMID
NOOP—no op
SHUT—shutdown BSM
QUIT—closes connection
MOD (http, smtp, gates, etc)-Actual executable name
TID/UMID—Positive Non-zero integer, tid should be unique.

Some examples include the following:

QSTA;124;apache;345;args—Starts apache http server with umid 345, tid 124 with stdout mapped to /dev/null STAR;100;http-get;444;http://www.google.com—Starts TEM with umid 444, tid 100 to run the http-get program to fetch Google NOOP—No-op, check connection.

Delimiter—Where a fixed, four character command is provided at the beginning of the command string, the fifth character can be used at the delimiter for the rest of the bot-command. It can be any ascii character, but can be a printable character such as a semicolon for testing purposes and a non-printable for production as the payload of the command may include every printable character.

Children Processes—Upon receiving a message in the proper format, such as:

```
STAR;000001;http;454;http://www.yahoo.com
 |   |   |   |     +---------- TARGET(as arg)
 |   |   |   +--------------UMID
 |   |   +-------------------Executable to exec
 |   +--------------------------TID
 +--------------------------------Command
```

The server will fork and spawn the child process passing the entire message to it, and by re-assigning the socket to the standard in/out of the child process. (or linking stdout to /dev/null for QSTA)

Tracking—The BSM will track every spawned child's pid, tid and umid when forked. As the children die it will release this information. This can be implemented as a pre-allocated array which uses the first available slots to store information, this may change to a linked list or other structure as needed in the future.

Restarting—The actual storage of the initial bot-command and restarting can be handled by the ARM/ORM, which will issue a STOP command and upon success will issue a new STAR/QSTA command with the original bot-command.

Bot-Command Behavior

STAR—Start—This simply spawns a child process, passing the Bot-Command as the first argument. It hands off the socket by duping the socket to stdin/stdout/stderr for the child. It will return error if the TID is already in use.

QSTA—Quiet Start, used for PEM's—Will spawn a child process. It will pass the bot-command to the spawned process and hand off the socket to stderr while remapping stdout to /dev/null. It will return error if the TID is already in use.

STAT—Status—The STAT bot-command returns all currently running children's PID, TID and UMID. To query a specific tid, use the form STAR;TID to retrieve specific information as needed.

USTA—Umid Status—This should be called in the format USTA;UMID and will return all currently running children for the given umid.

STOP—Stop child—Used in the form: "STOP;TID". This will kill the process associated with the TID or return error if process is not alive.

PAUS—Pause all children processes—Used to pause all active processes that are tracked by the BSM. For example when scenario is paused.

CONT—Continue(un-pause) all children processes—Used to continue(un-pause) all active processes that are tracked by the BSM. For example when scenario is re-started.

TERM—Kill all children processes—Used to kill all active processes that are tracked by the BSM. For example when scenario is stopped.

NOOP—No-op—Gives simple response to check connection.

QUIT—Quit gracefully—Has bot server close connection

As described herein, a module can be a program that runs on the Node 102 or a server and can be controlled by the Node Tool Suite. The modules can include, but are not limited to, the Simulated Network Traffic Generator 232, the Attack Creation Module 236, the Network Monitoring and Analysis module 230, the Network Reconstitution module 238, and the Automated Network Build module 234, by ways of examples.

Automated Network Build Module

A module such as the exemplary embodiment as described herein as the Automated Network Build module 234 (or simply AutoBuild), can automate the installation and configuration of components comprising a network environment and in particular the Network Preferences, for any network component whether physical, virtual, or simulated devices within or attached to a network. An Automated Network Build module 234 can also provide for the initial mechanism for the network simulator to be built from "bare metal" into all of the appropriate servers and devices. The Automated Network Build module can provide the initial mechanism for the simulated network to be built utilizing server virtualization technology into all of the appropriate virtual servers and devices. This connects to the appropriate servers or devices and builds them from predetermined configuration files. This Automated Network Build module 234 can provide a consistent baseline by removing the element of human error and allows for the simulator to be built faster, as all installation configurations are automated.

The following describes some of functionality of an exemplary embodiment.

Device Profiles—A device profile is a listing of a component and all its properties which define it as a unique entity on the network.

As such, the system is configured for creating device profiles for components that can include the actual configuration or installation information to fully install or configure a device of a given type or function; additionally, these profiles store metadata as defined by the user or application. In order to accomplish this, the user can configure the device profile via a Device Profile Editor 264.

An example of an Automated Network Build module interface and property list for network device is shown in the section below entitled Automated Network Build module Description.

The information that is selected/configured via the Device Profile Editor 264 can be temporarily stored in memory until such time that it is processed to be saved, at which point it is transmitted back to a central processor or CM 306 as described herein via a protocol such as the Node Communication Protocol as described by way of example in the section below.

The Device Profile Editor 264 can then write the configuration into a standard XML formatted file and then sends the file via the Node Communication Protocol to the CM 306. System specific information is automatically generated by the CM 306 so as to maintain unique attributes of a given device profile (e.g. serial numbers for device profiles which are unique within the system by automatic incrementation of a global serial number listing inside the system) and these are added into the XML file which is then written to the Configuration Store 323.

Figure 9:
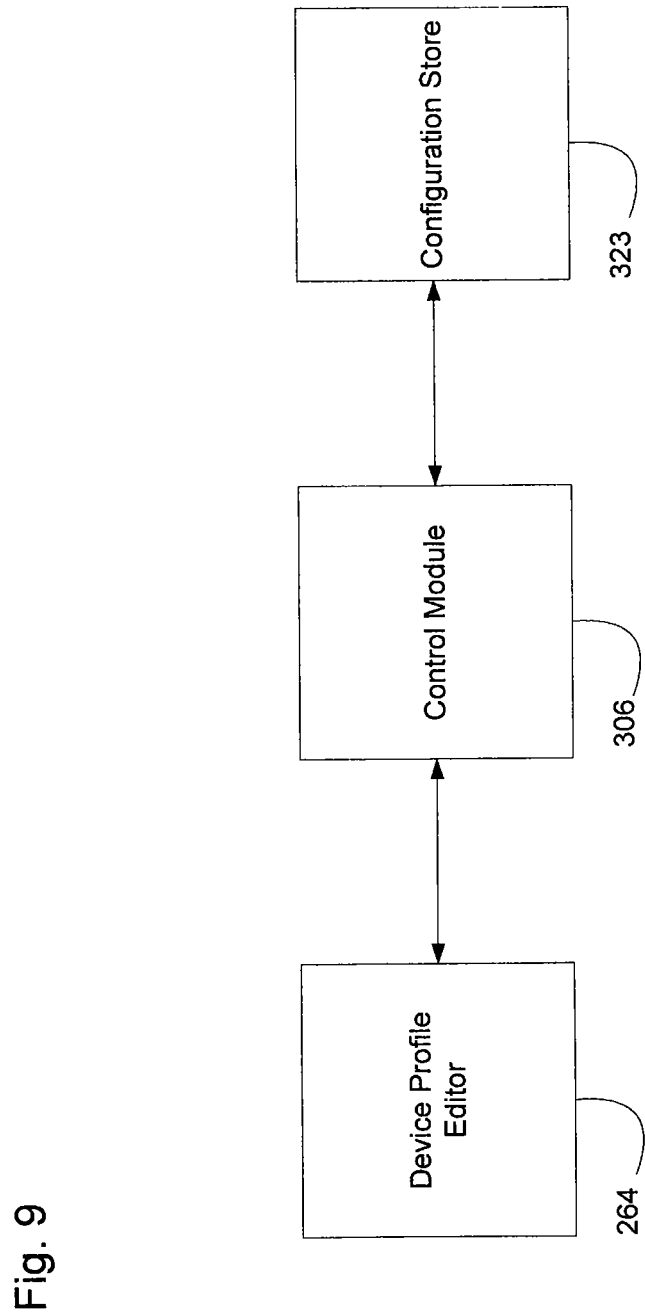
FIG. 9 is a block diagram of a Device Profile Editor process flow according to one embodiment of an Automated Network Build module.

The Device Profile Editor 264 can send the appropriate directive via the Node Communication Protocol to the CM 306), which can remove the device profile from the Configuration Store 323 as shown in FIG. 9. In other cases, the Device Profile Editor 264 can write the configuration into a standard XML formatted file and then sends the file via the Node Communication Protocol to the CM 306. The CM 306 validates the system specific information so as to maintain unique attributes of a given device profile (e.g. serial numbers for device profiles which are unique within the system by automatic incrementation of a global serial number listing inside the system) and then writes the information into the Configuration Store 323. A user can browse and/or query the saved device profiles based upon a specified criterion/criteria. The device profile details are transmitted to the Device Profile Editor 264 via the Node Communication Protocol by the CM 306, which reads from the Configuration Store 323 the device profiles that are available. The Device Profile Editor 264 is able to sort, filter, or group the device profiles based upon the metadata defined at the time of the profile creation.

A user can start the automated process of installation/configuration of a device based upon a specified device profile. The Network Environment Profile Manager 270 can send the appropriate directives via the Node Communication Protocol to the CM 306 which in turn retrieves the appropriate information from the Configuration Store 323 and forwards all information to the BM 308. The BM 308 then signals the Virtualization Technology 316 with the appropriate configuration data and the Virtualization Technology starts the bot 315 with the appropriate configuration. The Bot Server Module (BSM) 318 then executes the appropriate software programs from the data store 324 to ensure that the bot 315 is configured correctly. The build progress can be monitored via a status report of any or all devices in the process of building as follows: as a relative percentage, as a function of time, or as a detailed informational view Updates can be sent to the Network Environment Profile Manager 270 via the Node Communication Protocol by the CM 306. The CM 306 receives its updates from the BM 308, which in turn receives its updates from the BSM 318 as to the success, state, or other information pertaining to the processes.

Figure 10:
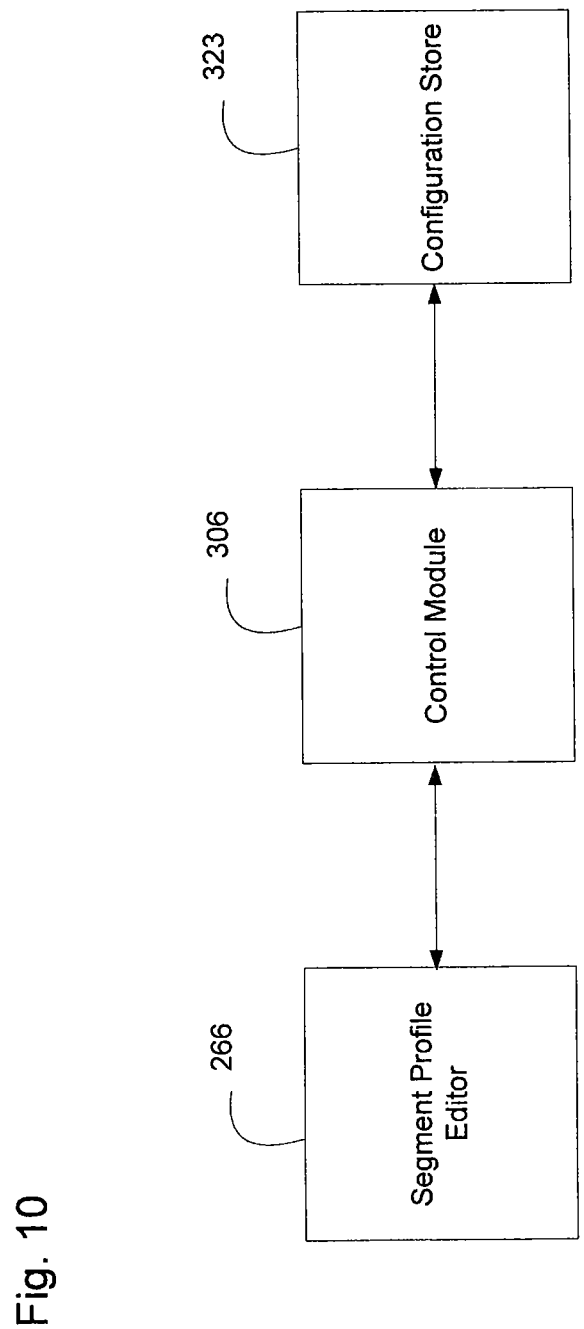
FIG. 10 is a block diagram of a Segment Profile Editor process flow according to one embodiment of an Automated Network Build module.

In addition to device profiles, the Automated Network Build module can create segment profiles. A segment profile can be a group of device profiles that can also include metadata for the segment as defined by the user or application. A Segment Profile Editor 268 can be used to group device profiles together and assign them a hierarchy to execute based on dependencies with other devices. The information that is selected/configured via the Segment Profile Editor 266 is held in memory until such time that it is processed to be saved, at which point it is transmitted back to the CM 306 via the Node Communication Protocol. A segment profile can be saved using the Segment Profile Editor 266 that writes the configuration into a standard XML formatted file and then sends the file via the Node Communication Protocol to the CM 306. System specific information is automatically generated by the CM 306 so as to maintain unique attributes of a given segment profile (e.g. serial numbers for segment profiles which are unique within the system by automatic incrementation of a global serial number listing inside the system) and these are added into the XML file which is then written to the Configuration Store 323 as shown in FIG. 10.

A segment profile can be deleted using the Segment Profile Editor 266 that is configured to send the appropriate directive via the Node Communication Protocol to the CM 306, which then removes the segment profile from the Configuration Store 323. In other cases, the segment profile can be modified by having the Segment Profile Editor 266 write the configuration into a standard XML formatted file and then send the file via the Node Communication Protocol to the CM 306. The CM 306 validates the system specific information so as to maintain unique attributes of a given segment profile (e.g. serial numbers for segment profiles which are unique within the system by automatic incrementation of a global serial number listing inside the system) and then writes the information into the Configuration Store 323.

A user can browse and/or query saved segment profiles based upon a specified criterion/criteria. Segment profile details can be transmitted to the Segment Profile Editor 266 via the Node Communication Protocol by the CM 306, which reads from the Configuration Store 323 the segment profiles that are available. The Segment Profile Editor 266 is able to sort, filter, or group the segment profiles based upon the metadata defined at the time of the profile creation.

Figure 27:
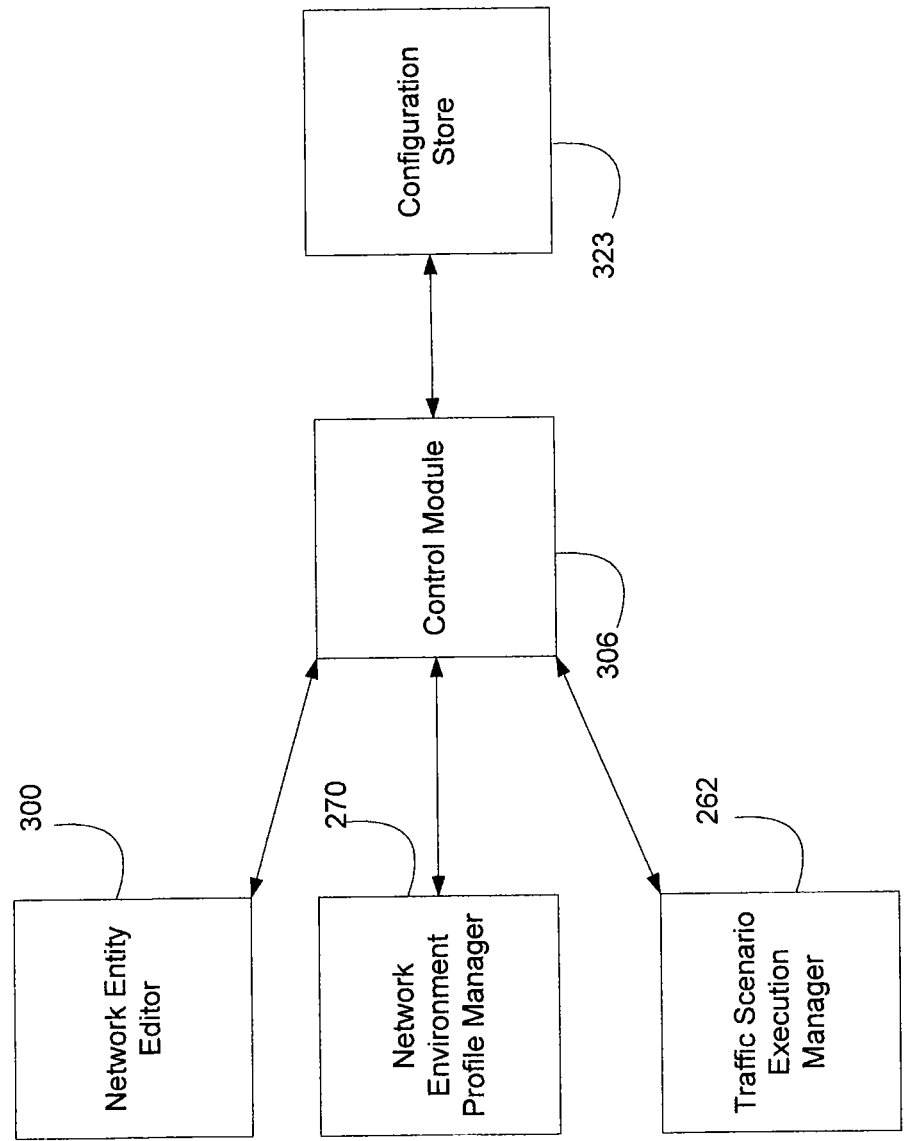
FIG. 27 is a block diagram of a Network Entity Editor process flow according to one embodiment of a Network Monitoring and Analysis module.

An automated process of installation/configuration of all devices included within a segment profile can be initiated or started, when the Network Environment Profile Manager 270 sends the appropriate directives via the Node Communication Protocol to the CM 306 which in turn retrieves the appropriate information from the Configuration Store 323 and forwards all information to the BM 308. The BM 308 then signals the Virtualization Technology 316 with the appropriate configuration data and the Virtualization Technology starts the bots 315a through 315f with the appropriate configuration. The BSMs 318a through 318-f then execute the appropriate software programs from the data store 324 to ensure that the bots 315a through 315-f are configured correctly. The build progress can be monitored via a status report of the segment profile in the process of building as a whole relating to the following: as a relative percentage, as a function of time, as a detailed informational view, with respect to an individual component, referring back to an individual component's status report. Updates can be sent to the Network Environment Profile Manager 270 via the Node Communication Protocol by the CM 306 as shown in FIG. 27. The CM 306 receives its updates from the BM 308, which in turn receives its updates from the BSM 318g as to the success, state, or other information pertaining to the processes.

A network environment profile can be created that is a group of segment profiles that also include network environment metadata as defined by the user or application.

A Network Environment Profile Editor 268 can be used to group segment profiles together and assign them a hierarchy to execute based on dependencies with other segments. The information that is selected/configured via the Network Environment Profile Editor 268 is held in memory until such time that it is processed to be saved, at which point it is transmitted back to the CM 306 via the Node Communication Protocol.

Figure 11:
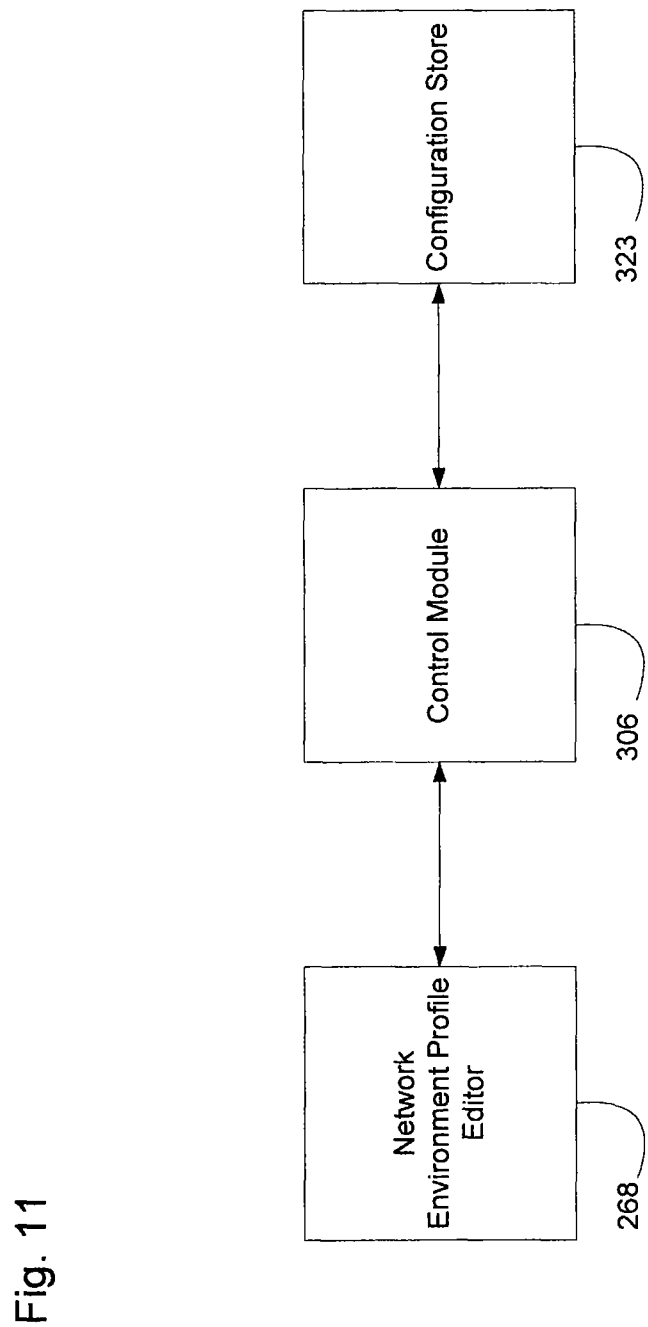
FIG. 11 is a block diagram of a Network Environment Profile Editor process flow according to one embodiment of an Automated Network Build module.

A network environment profile can be saved when the Network Environment Profile Editor 268 writes the configuration into a standard XML formatted file and then sends the file via the Node Communication Protocol to the CM 306. System specific information is automatically generated by the CM 306 so as to maintain unique attributes of a given network environment profile (e.g. serial numbers for network environment profiles which are unique within the system by automatic incrementation of a global serial number listing inside the system) and these are added into the XML file which is then written to the Configuration Store 323 as shown in FIG. 11. A network environment profile can be deleted by the Network Environment Profile Editor 268 sending the appropriate directive via the Node Communication Protocol to the CM 306, which then removes the network environment profile from the Configuration Store 323. The network environment profile can be modified by the Network Environment Profile Editor 268 by writing the configuration into a standard XML formatted file and then sending the file via the Node Communication Protocol to the CM 306. The CM 306 validates the system specific information so as to maintain unique attributes of a given network environment profile (e.g. serial numbers for network environment profiles which are unique within the system by automatic incrementation of a global serial number listing inside the system) and then writes the information into the Configuration Store 323. A user can browse or query saved network environment profiles based upon a specified criterion/criteria.

Figure 12:
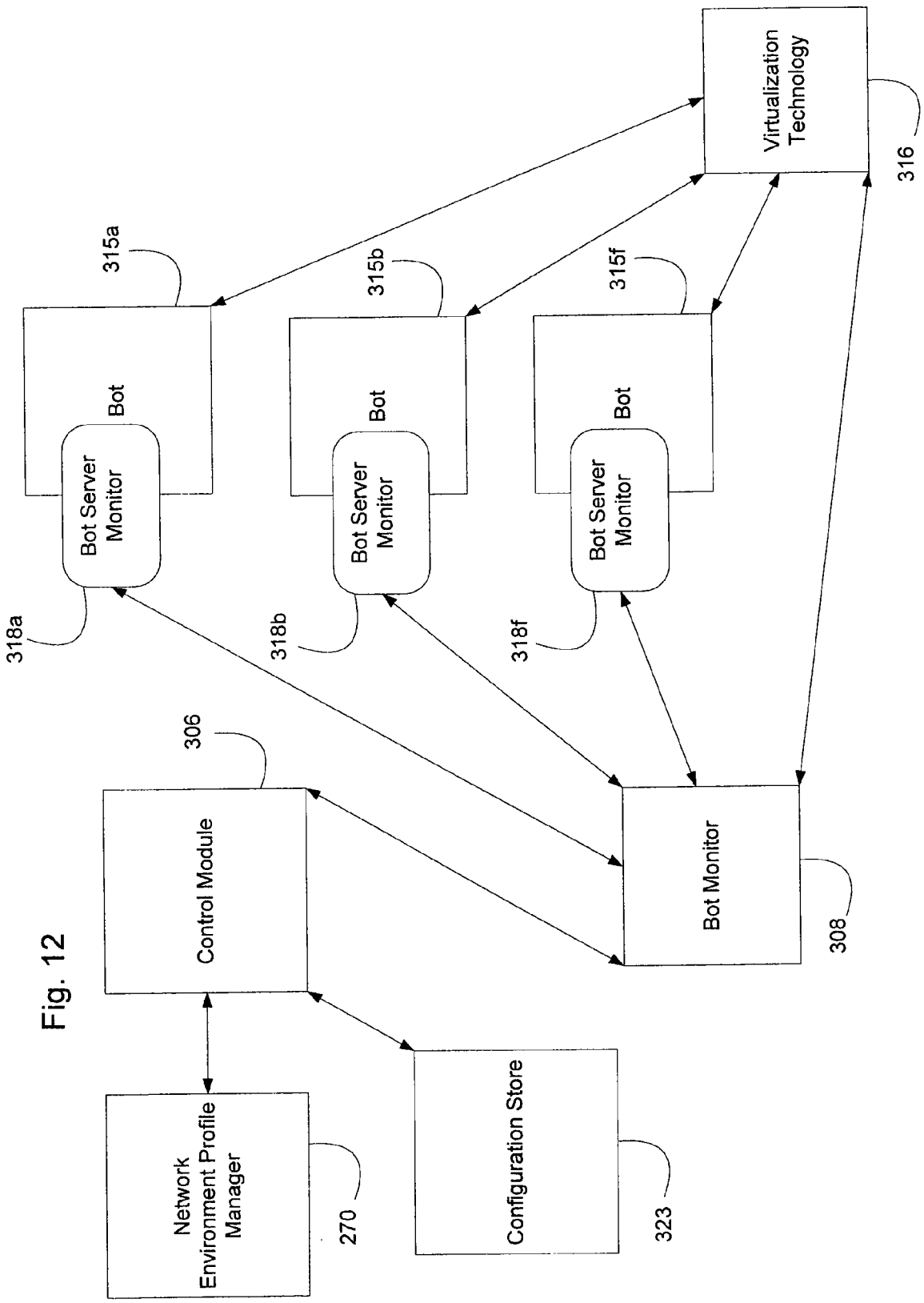
FIG. 12 is a block diagram of a Network Environment Profile Manager process flow according to one embodiment of an Automated Network Build module.

As shown in FIG. 12, an automated process of installation/configuration of devices included within a network environment profile can be started by the Network Environment Profile Manager 270 sending the appropriate directives via the Node Communication Protocol to the CM 306 which in turn retrieves the appropriate information from the Configuration Store 323 and forwards all information to the BM 308. The BM 308 then signals the Virtualization Technology 316 with the appropriate configuration data and the Virtualization Technology starts the bots 315a through 315f with the appropriate configuration. The BSMs 318a through 318-f then execute the appropriate software programs from the data store 324 to ensure that the bots 315a through 315f are configured correctly. The build progress can be monitored via a status report of the network environment profile in the process of building as a whole relating to the following: as a relative percentage, as a function of time, as a detailed informational view, with respect to a specific segment profile, referring back to an individual segment profile status report, or with respect to an individual component, referring back to an individual component's status report.

Updates can be sent to the Network Environment Profile Manager 270 via the Node Communication Protocol by the CM 306. The CM 306 receives its updates from the BM 308, which in turn receives its updates from the BSM 318g as to the success, state, or other information pertaining to the processes.

The automated build of an entire network entity to include the network environment configuration and the traffic generation specification can include a network environment profile containing all information to build the devices that a user would maintain in his environment. It is desired that all information is included to produce a fully realistic experience for the user due to a dearth of traffic on the network. By integrating the automated traffic pattern capabilities that exist in The Simulated Network Traffic Generator, a network entity is able to be produced. The Network Entity Editor (80) would be able to produce a configuration containing the information within the network environment profile and configuration information that is within the traffic scenario.

An example network entity would be a hospital, where its configuration would include all of the configuration information for the main server farm and additionally the information for all of the desktop computers throughout the hospital, the latter part being sent to the Traffic Scenario Execution Manager 262.

The Network Entity Manager 302 would display all available entities and allow for selection based upon metadata such as name (e.g., Mercy Hospital) or type (e.g., medical facility, branch).

Automated Network Build module operates in multiple modes:
1. Configuration information gathering
2. Virtual machine creation and configuration
3. Operating system (OS) installation and configuration
4. Environment validation and reporting Each mode can be presented as a screen for the user and can be presented in a sequential manner since each mode is dependent on the previous mode.

Configuration Information Gathering—The Automated Network Build module provides the user with a GUI 104 to provide configuration information for each machine. The information gathered from this process can be used to create automated installation answer files and script parameters that can serve to configure the servers and workstations that make up the simulated network.

The GUI 104 can provide for a matching of inputs such as the class of machine. For example, domain controllers can have different information than a HIDS box, and can be unique when compared to a SMTP gateway since they all serve different purposes.

Alternatively, complete configuration files can be imported into the GUI 104 to either configure an individual device or replicated environment (all devices that make up the training environment). The capability to edit and save profiles is also provided via this file operation screen. The import file can be a standard comma separated value (CSV) file. Files can be checked for completeness and if necessary the user can be prompted to fill in fields that were not populated automatically.

The fields within the file are in the following order: Tab Name (From Configuration Information Gathering UI), Machine Name, Field, Destination File, and Line.

Once the necessary information has been provided and the "Start Build" button has been pressed, the GUI 104 can move to the Virtual Machine Creation and Configuration mode.

Virtual Machine Creation and Configuration—The Automated Network Build module can take the data collected from the information gathering screens or import utility as input for the creation of the necessary scripts/answer files needed for the automated installation process for each particular product/OS.

The following exemplary mapping of fields to the individual files and entries is provided by way of example: Tab Name, Machine Name, Field, Destination File, and Line.

| | | | |
|---|---|---|---|
| Domain Controller | DC1 | Machine Name | RunOnceHotSimDC1.vbs |
| strCompName = "DC1'" | | | |
| Domain Controller | DC1 | Admin Password | winnt.sif [UserData] |
| AdminPassword="XXXXXXXX" | | | |
| Domain Controller | DC1 | Admin Password | RunOnceHotSimDC1.vbs |
| strPW = "XXXXXXX" | | | |
| Exchange | EXCH | Admin Password | winnt.sif [UserData] |

```
AdminPassword="XXXXXXXX"
    Exchange    EXCH Admin Password    RunOnceHotSimEXCH.vbs strPW =
"XXXXXXX"
    Workstation    WS    Admin Password    winnt.sif    [UserData]
AdminPassword="XXXXXXXX"
    Workstation    WS    Admin Password    RunOnceHotSim.vbs strPW =
"XXXXXXX"
    Workstation    WS    AD DNS Domain Name    RunOnceHotSim.vbs
strDNSDom = "cnd.training"
    HIDS    HIDS    Machine Name    Autoinst.xml    <name>HIDS HIDS</name>
<hostname>HIDS</hostname>
    HIDS    HIDS    AD DNS Domain Name    Autoinst.xml    SMTP
Antivirus    SAVGW    Admin Password    winnt.sif    [UserData]
AdminPassword="XXXXXXXX"
    SMTP Antivirus    SAVGW    Admin Password
    RunOnceHotSimSAVGW.vbs strPW = "XXXXXXX"
    Web/DNS Server    EXT-DNS    Admin Password    winnt.sif
    [UserData] AdminPassword="XXXXXXXX"
    Firewall    FW    Machine Name    /etc/hosts    172.16.60.1
fw.cnd.training FW
    Firewall    FW    Machine Name    /var/ipcop/ethernet/settings
RED_DHCP_HOSTNAME=fw
    Firewall    FW    Machine Name    /var/ipcop/main/settings
    HOSTNAME=fw
    GREEN_NETADDRESS=172.16.60.0 (CALCULATED FROM IP ADDRESS
AND NETMASK)
    ORANGE_BROADCAST=172.16.80.255 (CALCULATED FROM IP
ADDRESS AND NETMASK)
    RED_NETADDRESS=172.16.100.0 (CALCULATED FROM IP ADDRESS
AND NETMASK)
```

OS Installation and Configuration—An OS Installation and Configuration interface can provide visual indicators of the machine build and configuration status. For Windows-based installations Automated Network Build module can utilize standard Microsoft automated build utilities and configuration files to set OS options and settings. This includes the customization of the standard Windows installation answer file, winnt.sif. The winnt.sif file contains information to provide all necessary answers to prompts that would be presented to a user during a standard attended installation of Windows. The answer file can also provide configuration information to customize the machine to its intended function. For example, the filing can be included:

Disk partition and format information
Configure components that can be installed beyond the normal out-of-the-box Windows installation
Networking configuration
Firewall settings and policies
Desktop settings to be applied to all users
Third-party driver information for drivers not already integrated into the installation media
Licensing information
Post-installation scripts to be executed after the normal installation has completed More information regarding winnt.sif is available from Microsoft.

As part of the Automated Network Build module, post installation scripts are called from within the installation answer file to install any necessary software, configure environment parameters, or perform complicated configuration tasks scripts such as VBScript or shell scripts. One exemplary naming convention for these post-installation scripts follows the naming convention below:

RunOnceRangeTypeMachineName.vbs

As an example a script for a Training Simulator domain controller would be RunOnceHotSimDC1.vbs. The phrase "RunOnce" denotes that the script temporarily populates the Windows registry RunOnce key with information to kick off multiple installation commands that can only execute a single time. The RunOnce registry keys are cleared after the tasks have completed, preventing them from running over and over again. More information regarding the RunOnce process is available from the Microsoft library.

Logic can be incorporated within the GUI 104 to ensure that the machine builds happen in the proper order or sequence. The machines can be built in multiple phases:

Machine Name/Type Notes
Phase 1:
DC1 (first domain controller) Required to establish the domain
EXT-DNS Has no dependencies/requirements so can be built in phase 1
SAV-GW Has no dependencies/requirements so can be built in phase 1
HIDS Has no dependencies/requirements so can be built in phase 1
FW Has no dependencies/requirements so can be built in phase 1
Phase 2:
EXCH (first Exchange 2003 server) depends on DC1 (first domain controller) to be completely operational before joining the domain and installing Exchange 2003 software
WS1 Depends on DC1 (first domain controller) to be completely operational before joining the domain)
WS2 Depends on DC1 (first domain controller) to be completely operational before joining the domain). Depends on WS1 since the same script to join them to the domain is used and workstations are added in sequential order.
WS3 Depends on DC1 (first domain controller) to be completely operational before joining the domain). Depends on WS2 since the same script to join them to the domain is used and workstations are added in sequential order.

The individual machines can update a log file that can give the GUI 104 an update to feed the progress status of the machine.

Open-SUSE installations can utilize the AutoYast automated installation processes. This consists of a customized autoinst.xml file that contains all of the selected options for the OS installation, the software packages to be installed, and custom post-installation scripts to be executed after the OS has been installed.

Environment Validation and Reporting—After all machines have completed the build process, the Automated Network Build module GUI 104 can present the "report card" screen depicting the build result by color (green=success, yellow=warning, red=failure). Any reported warnings or failures can be reported to the user.

Warnings/failures can be obtained from the BuildStatus.txt file to be used to report the offending and any necessary details of the failure.

Simulated Network Traffic Generator Module

As one example, a Simulated Network Traffic Generator module 232 (one embodiment of such is referred to herein as "Legion™") can provide an improved traffic generation that fully mimics the live networking environment of the user or the particular network. Such a Simulated Network Traffic Generator module 232 provides capabilities, as can be described that are more than a simple traditional traffic generator (TG). In some embodiments, such Simulated Network Traffic Generator 232 can provide for emulating actions of actual users of the particular network. Past performance has shown that users of simulators are able to easily identify traffic produced by existing traffic generators, and thus the realism of the simulator suffers. The users are often unable to be trained to their full potential or, in the case of evaluations, are able to detect the test conditions and are able to "cheat the system" by such current systems. In contrast, as described herein, embodiments of a Simulated Network Traffic Generator module 232 provides for emulating on a level never before achieved. Traffic can be configured to run without instructor intervention for long periods of time, and yet can be able to be modified "on the fly" without stopping the traffic that can be already in progress. Traffic can also be "paused"—that is, stopped at a specific moment in time and restarted from that exact moment. Entire segments of traffic can be modified via user profiles, traffic protocols, or expected actions.

The Traffic Generator Module 232 can produce traffic based upon actual user and/or machine behavior patterns, where said patterns are defined by the user or application. This module can be configured to create network traffic patterns including metadata as defined by the user or application. The user can configure the network traffic patterns via the GUI 104 component Traffic Pattern Editor 256. An example traffic pattern can be an emulation of a network user surfing the Internet. The traffic produced is not limited to a single protocol, but rather is a combination of DNS requests/responses, HTTP requests/responses, and some requests/responses for streaming media (RTSP) due to advertisements or embedding by the web page owner. This results in at least three or more distinct communications between the local user and multiple servers on multiple remote networks. The totality of these communications forms a basic traffic pattern. However, a user surfing the Internet would not likely surf one web page and then turn off his computer. Typically, after reviewing the fully loaded page, the user then either selects a link from the current page or browses to a completely new web server address, thus initiating another series of requests/responses that is in itself another basic traffic pattern.

A network traffic pattern can be one of the patterns mentioned above, but typically is a multitude of these patterns that continue for a variable length of time, each of which is separated by another variable length of time. This second length of time is itself inconsistent from one instance to another.

This information can be selected/configured by a user via a Traffic Pattern Editor 256 that can be held in memory until such time that it is processed to be saved, at which point it is transmitted back to the CM 306 via the Node Communication Protocol.

The network traffic patterns can be automatically generated based upon predetermined criterion/criteria and can include metadata as defined by the user or application. From the repetitive yet stochastic example of web browsing of a common web user, the creation of traffic patterns that emulate real users can be done, but is very time consuming and tedious. The automation of these patterns can provide for generating the equivalent of 5000 distinct users surfing web pages. By accepting specific criteria which can be used as limits or bounds of the total quantity of network traffic patterns produced, a formula to produce a large quantity of traffic can be provided. One exemplary algorithm for generating these patterns is as follows:

A user enters the names of 100 different web sites. The user then selects an integer which can be used as input for the level of variance between the basic traffic patterns. A mathematical algorithm is applied, producing a sequence of number paired such that they represent the web site surfed to and the length of time in seconds until the next pair is to be read, e.g., [23,30:99,13:40,676] where the 23rd web site is surfed to immediately, then the 99th web site is surfed to 30 seconds later, and then the 40th web site is surfed to 13 seconds later. In this example, the list of 100 different web sites and the integer for variance provides the specified criteria. The capability to produce a series that contains the list and that applies the listing to web sites is provided herein.

Figure 13:
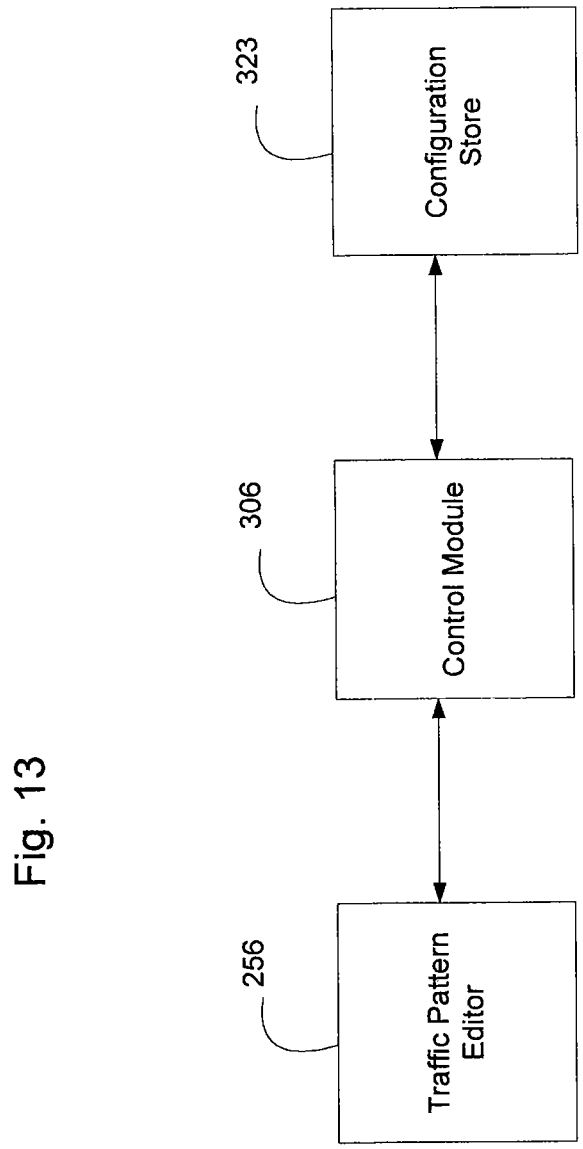
FIG. 13 is a block diagram of a Traffic Pattern Editor process flow according to one embodiment of a Simulated Network Traffic Generator module.

The user can select information via the Traffic Pattern Editor 256 that is held in memory until such time that it is processed to be saved, at which point it is transmitted back to the CM 306 via the Node Communication Protocol. The network traffic patterns can be saved by a Traffic Pattern Editor 256 that writes the configuration into a standard XML formatted file and then sends the file via the Node Communication Protocol to the CM 306. System specific information is automatically generated by the CM 306 so as to maintain unique attributes of a given network traffic pattern (e.g., serial numbers for network traffic patterns which are unique within the system by automatic incrementation of a global serial number listing inside the system) and these are added into the XML file which is then written to the Configuration Store 323 as shown in FIG. 13. The network traffic patterns can be deleted by the Traffic Pattern Editor 256 sending the appropriate directive via the Node Communication Protocol to the CM 306, which then removes the network traffic pattern from the Configuration Store 323.

Network traffic patterns can be modified by either a saved network traffic pattern or during/prior to execution. The Traffic Pattern Editor 256 can write the configuration into a standard XML formatted file and then sends the file via the Node Communication Protocol to the CM 306. The CM 306 validates the system specific information so as to maintain unique attributes of a given network traffic pattern (e.g. serial numbers for network traffic patterns which are unique within the system by automatic incrementation of a global serial number listing inside the system) and then writes the information into the Configuration Store 323.

A user can browse or query saved network traffic patterns based upon a specified criterion/criteria. The network traffic pattern details are transmitted to the Traffic Pattern Editor 256 via the Node Communication Protocol by the CM 306, which reads from the Configuration Store 323 the network traffic patterns that are available. The Traffic Pattern Editor 256 is able to sort, filter, or group the network traffic patterns based upon the metadata defined at the time of the network traffic pattern creation.

A saved network traffic pattern can be executed either within a traffic scenario or on demand. The Traffic Scenario Execution Manager 262 can send the appropriate directives via the Node Communication Protocol to the CM 306 which in turn produces traffic according to the process defined herein.

A Traffic Profile can also be created such that the traffic profile is a group of traffic patterns that also include traffic metadata as defined by the user or application. The Traffic Profile Editor 258 can be configured to group traffic patterns together and assign them a distribution of execution as a single entity, in this case either a user or a machine. The information that is selected/configured by the user via the Traffic Profile Editor 258 can be held in memory until such time that it is processed to be saved, at which point it is transmitted back to the CM 306 via the Node Communication Protocol.

Figure 14:
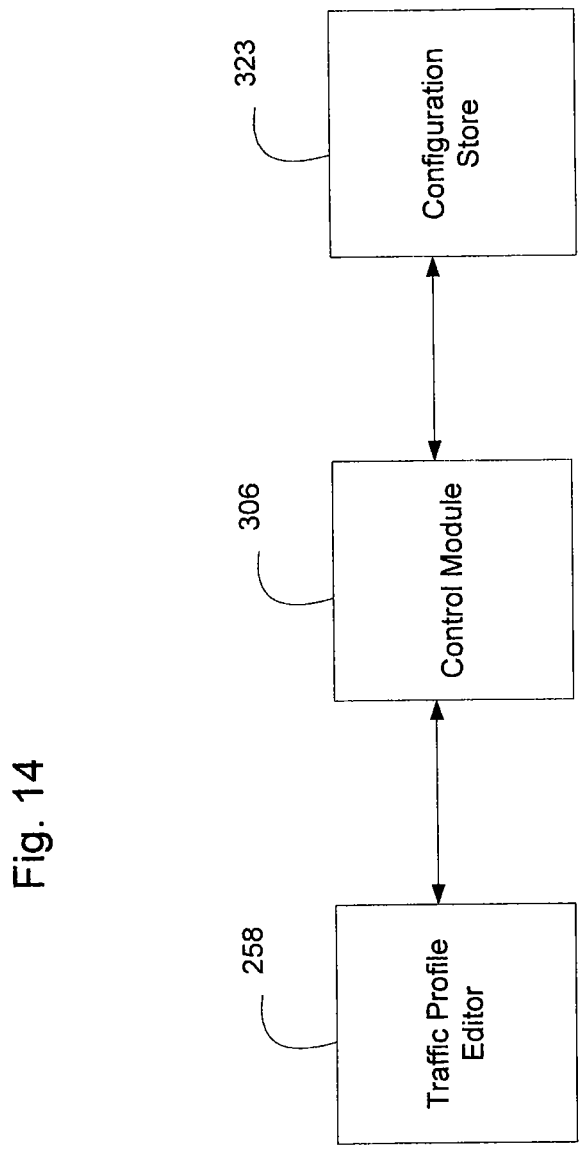
FIG. 14 is a block diagram of a Traffic Profile Editor process flow according to one embodiment of a Simulated Network Traffic Generator module.

The traffic profiles can be saved by the Traffic Profile Editor 258 writing the configuration into a standard XML formatted file and then sends the file via the Node Communication Protocol to the CM 306. System specific information is automatically generated by the CM so as to maintain unique attributes of a given traffic profile (e.g. serial numbers for traffic profiles which are unique within the system by automatic incrementation of a global serial number listing inside the system) and these are added into the XML file which is then written to the Configuration Store 323. The traffic profile can be deleted by the Traffic Profile Editor 258 sending the appropriate directive via the Node Communication Protocol to the CM 306, which then removes the traffic profile from the Configuration Store 323 as shown in FIG. 14. A traffic profile can be modified by, either a saved profile or during/prior to execution. The Traffic Profile Editor 258 writes the configuration into a standard XML formatted file and then sends the file via the Node Communication Protocol to the CM 306. The CM 306 validates the system specific information so as to maintain unique attributes of a given traffic profile (e.g. serial numbers for traffic profiles which are unique within the system by automatic incrementation of a global serial number listing inside the system) and then writes the information into the Configuration Store 323. A user can browse or query saved traffic profiles based upon a specified criterion/criteria. The Traffic Profile details can be transmitted to the Traffic Profile Editor 258 via the Node Communication Protocol by the CM 306, which reads from the Configuration Store 323 the traffic profiles that are available. The Traffic Profile Editor 258 is able to sort, filter, or group the traffic profiles based upon the metadata defined at the time of the traffic profile creation. A traffic profile can be executed, either within a traffic scenario or on demand. The Traffic Scenario Execution Manager 262 sends the appropriate directives via the Node Communication Protocol to the CM 306 which in turns produces traffic according to the process defined herein In addition, a Traffic Scenario can be created such that the traffic scenario is a group of traffic profiles that also include metadata that is specific to the traffic scenario as defined by the user or application. A Traffic Scenario Editor 260 can be configured to group traffic profiles together and assign them a distribution of execution based on a total number of machine and user mappings; that is, a scenario requiring 5000 users on 5000 separate machines would be a collection of 5000 entities (referenced as UMIDs), comprising both a machine-based profile and a user-based profile. While this may seem vast, if all 5000 users are of the same profile type and the same machine type, the entry would be quite small while still allowing for a vast amount of deviation due to the level of randomness in the specific traffic patterns.

Figure 15:
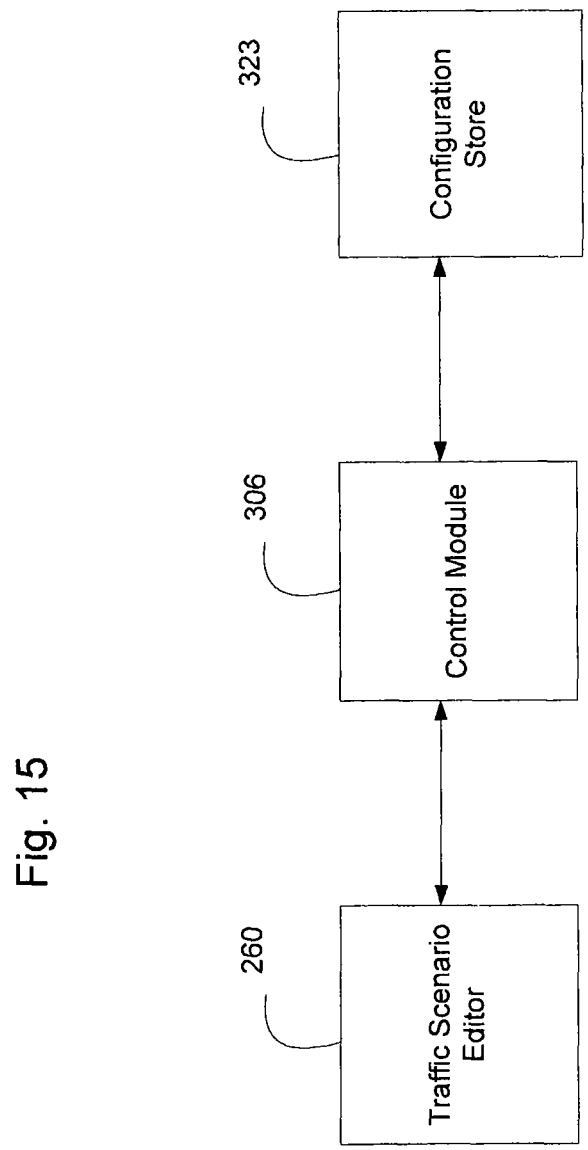
FIG. 15 is a block diagram of a Traffic Scenario Editor process flow according to one embodiment of a Simulated Network Traffic Generator module.

The information that is selected/configured via the Traffic Scenario Editor 260 is held in memory until such time that it is processed to be saved, at which point it is transmitted back to the CM 306 via the Node Communication Protocol. The Traffic Scenario can be saved by the Traffic Scenario Editor 260 writing the configuration into a standard XML formatted file and then sends the file via the Node Communication Protocol to the CM 306. System specific information is automatically generated by the CM so as to maintain unique attributes of a given traffic scenario (e.g. serial numbers for traffic scenarios which are unique within the system by automatic incrementation of a global serial number listing inside the system) and these are added into the XML file which is then written to the Configuration Store 323 as shown in FIG. 15. A Traffic Scenario can be deleted by the Traffic Scenario Editor 260 sending the appropriate directive via the Node Communication Protocol to the CM 306, which then removes the traffic scenario from the Configuration Store 323.

A traffic scenario can be modified by either a saved traffic scenario or during/prior to execution. The Traffic Scenario Editor 260 writes the configuration into a standard XML formatted file and then sends the file via the Node Communication Protocol to the CM 306. The CM 306 validates the system specific information so as to maintain unique attributes of a given traffic scenario (e.g. serial numbers for traffic scenarios which are unique within the system by automatic incrementation of a global serial number listing inside the system) and then writes the information into the Configuration Store 323.

A user can browse or query saved traffic scenarios based upon a specified criterion/criteria. The Traffic Scenario details can be transmitted to the Traffic Scenario Editor 260 via the Node Communication Protocol by the CM 306, which reads from the Configuration Store 323 the traffic scenarios that are available. The Traffic Scenario Editor 260 is able to sort, filter, or group the scenarios based upon the metadata defined at the time of the traffic scenario creation.

Figure 16:
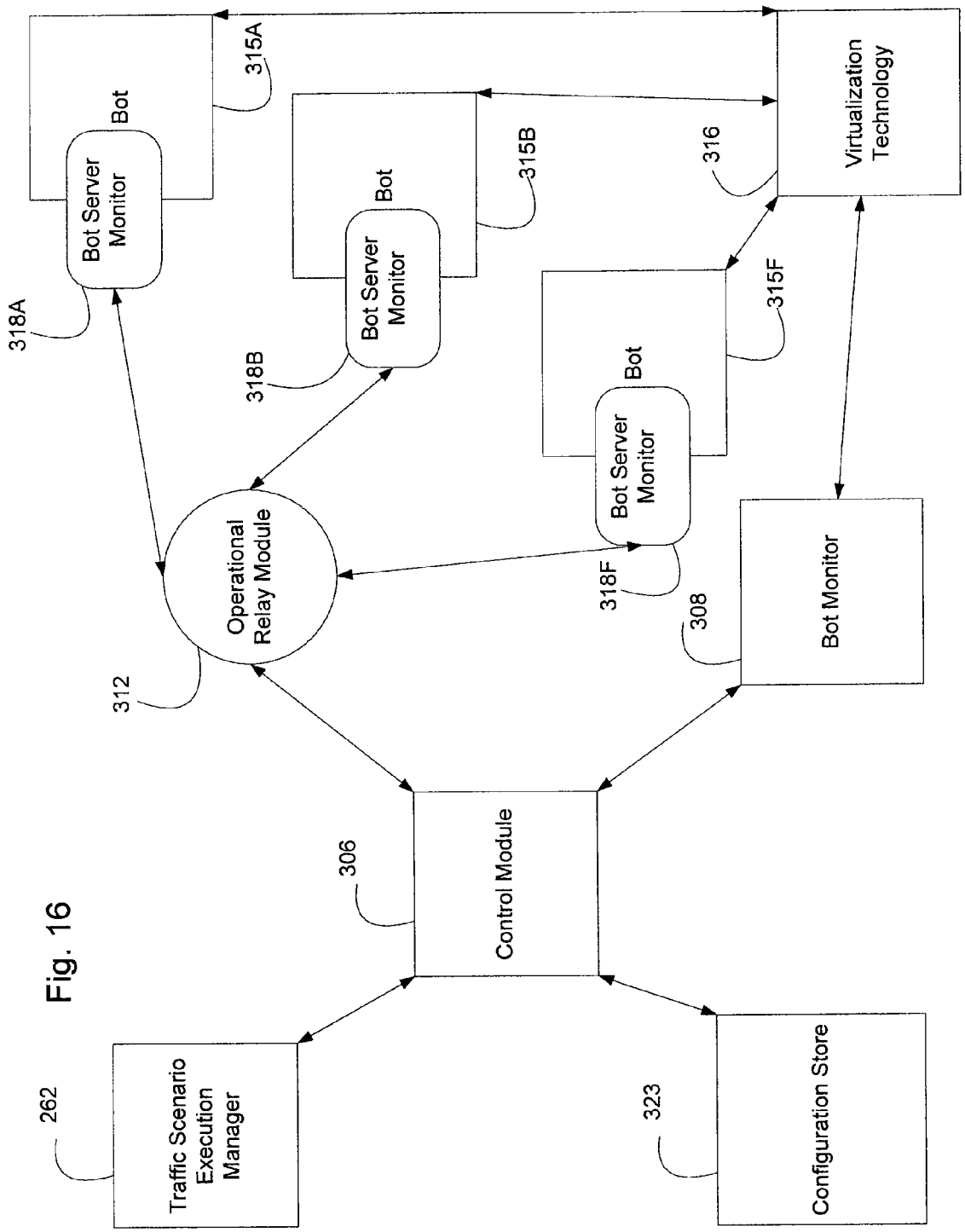
FIG. 16 is a block diagram of a Traffic Scenario Execution Manager process flow according to one embodiment of a Simulated Network Traffic Generator module.

As shown in FIG. 16, a traffic scenario can be executed by a Traffic Scenario Execution Manager 262 sending the appropriate directives via the Node Communication Protocol to the CM 306 that in turn produces traffic according to the process defined in the following section. As can be seen, BSM 318A through BSM 318F each start Bots 315A through Bots 315F, respectively as directed by the ORM 312 and as instructed by CM 306.

The Traffic Generator and Attack Creation (as will be discussed below) can be configured, by way of example, using the following internal flow:

Bot Creation—Bot 315 creation can take multiple steps:
1. Scenario and Traffic files are loaded.
2. CM 306 calculates needed Bots 315 from umids.
3. CM 306 contacts BM 308 to start Bots 315.
4. BM start bots.

Figure 6:
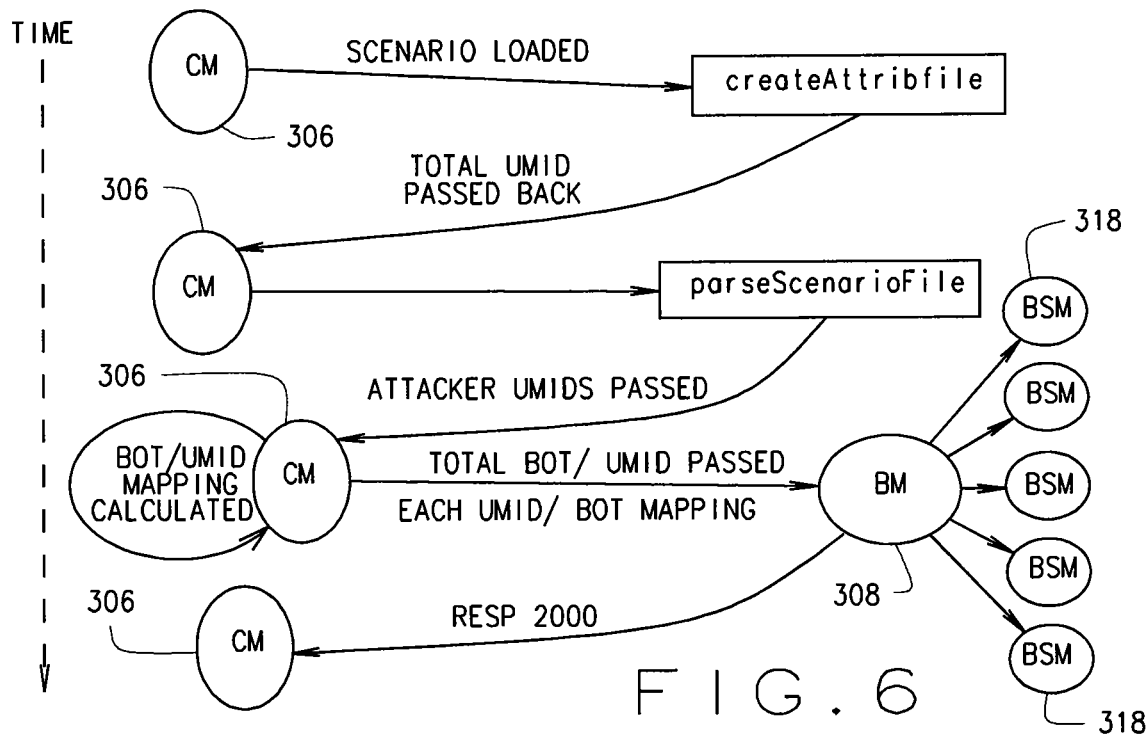
FIG. 6 is a flow chart illustrating a protocol flow for generating an attack within a Node according to one embodiment.

Scenario/Traffic Files Loaded—First, the traffic and scenario files are passed to the createAttribFile parser which shifts the attacker umids to appear after the traffic umids. This parser then tells the CM 306 the total number of umids through essentially a one-way socket not using the socket library, it is opened, written to and closed. The scenario file is then passed to the parseScenarioFile parser to determine which umids are attacker umids. This information is also passed back to the CM 306 in the same way as the createAttribFile parser. This process is shown by way of example in FIG. 6.

CM Calculates Bot <-> Umid mapping—Knowing both the number of attacker and traffic umids, the CM 306 now allocates bot id's for each umid. It first gives each attacker umid a bot ID starting at 1, in the order they appear in the actual attacks. This could be changed in the future, however the system was originally designed for attacker and traffic umids to appear intermixed, and for the parser to operate in a single pass. After the attacker umids each have sequential bot ID's starting at 1, the traffic umids begin to get lumped together in groups. Currently the CM 306 only knows the total number of umids and the number of attacker umids, therefore no introspection into the specific qualities of the umids is performed. (i.e. cannot split based on which are http or smtp umids)

CM 306 contacts BM to start Bots 315—The CM 306 first tells the BM the total number of Bots 315 and umids, it then sends a single umid/bot mapping across. It continues sending these umid/bot mappings to the BM 308.

BM starts Bots 315—When the BM 308 has received the total number of total reported umids, it clears the /dev/shm directory and starts executing the startbot script serially for each bot. The startbot script takes care of any per-bot configuration such as the creation of the file system, settings and actually instructing Xen 316 to start the bot. After each call to the startbot script, the BM 308 adds a connection to a list of Bot Server Module (BSM)'s 318 to try and connect to. When the last startbot script has exited successfully, the BM 308 begins to try to reconnect to all of the bot's BSM's 318 every 10 seconds, once they have all connected (and stay connected), it notifies the CM 306 that bot creation has been successful.

Bot Shutdown—When a scen clos is issued by the controlling GUI 104, a CLOSE is sent from the CM 306 to the BM 308. This signal causes the BM 308 to go through each bot issuing a xm destroy botx for each bot. When the final xm destroy has been executed, the BM 308 notifies the CM 306 of a successful close.

Attack Process Execution—After having a Scenario loaded, attacks can be run manually or automatically.

Figure 7:
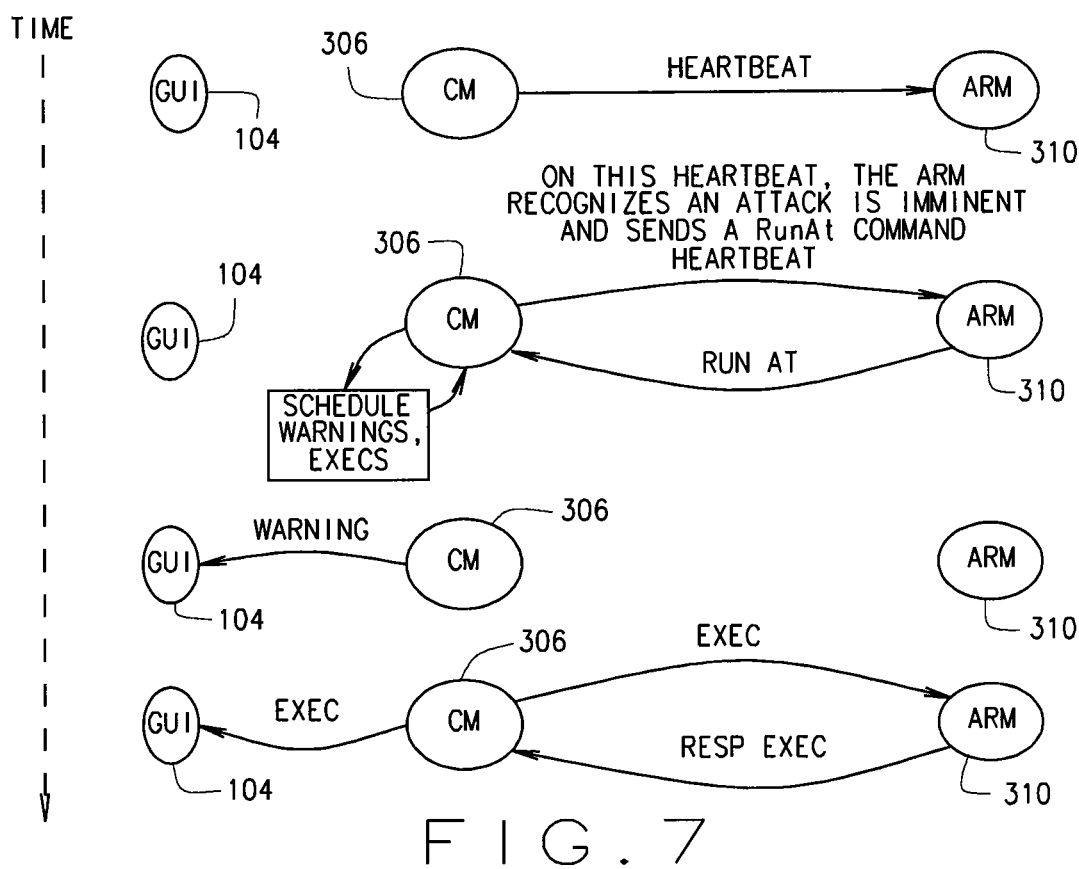
FIG. 7 is a timeline flow chart illustrating protocol flow including a heartbeat within a Node according to one embodiment.

Automatic Attack Execution—The heartbeats are flowing to the ARM 310. When a heartbeat is received within a certain time limit of an impending attack, the ARM 310 notifies the CM 306. The CM 306 then schedules the warnings and execs needed to process the attack for all connected GUIs 104. The time is ready for the warning, so the CM 306 sends it to the GUI 104. When it is time for the attack, the CM 306 sends the exec message to the ARM 310, and upon receiving a response notifies the GUI 104 of the running attack. This process is shown in FIG. 7 by way of example.

General steps can include, by way of example:

a. Scenario is Loaded and parsed timeline is passed to ARM 310 where it is stored.

b. Heartbeats happen until right before an attack event is scheduled and the ARM 310 sends a RUNA command to notify the CM 306 of an impending attack.

c. The CM 306 schedules any warnings and the execution of the attack itself.

d. The CM 306 sends warnings when needed.

e. The CM 306 sends the EXEC at the proper time to the ARM 310, which in turn fires off the start command to the BSM which will actually start the process.

f. As the CM 306 is notified of the process actually starting, it sends out EXECs to the GUI's as well as LOGG messages about it starting.

g. The ARM 310 sends the STAR command to the appropriate module.

This exemplary method can keep any alarm or timing out of the ARM 310 to avoid any sync issues with the CM 306 and the ARM 310 time. Using this communication between the CM 306 and ARM310, we effectively can keep all scenario specific knowledge out of the CM 306 while retaining all timing within the CM 306. Using this model, all timing originates from the CM 306 and the ARM 310 is only used to track the attacks. Any pausing, stopping or time changing is handled in one place, the CM 306.

Dependent Processes—These are held by the ARM 310, and when needed the ARM 310 uses the RUNI(run in) command to the CM 306. The RUNI command is essentially a relative start, and it is used to say the equivalent of "start 15 seconds from now". The rest of the progression CM 306 warning GUI 104 and CM 306 sending Exec to ARM 310) is the same as automatic attacks.

Manual Attack Execution—When the controlling GUI 104 issues an attk exec x;x command, the CM 306 sends the exec to the ARM 310 as if the ARM 310 had previously warned the CM 306 about its execution. The ARM 310 sends STAR line to appropriate BSM 318 and notifies CM 306 of success.

Traffic Process Execution—The ORM 312 fills its queue (currently 3*max rate) with items. The ORM 312 sends out queue items at the specified rate. The processes are moved from the queue to an active processes list. They are monitored for success, fail or timeout. In the case of Fail or Timeout, the CM 306 is notified.

Process Execution at the Bot level—The BSM 318 is contacted from a relay modules 310, 312 with a command to start a process. The BSM 318 executes an instance of the botWrap program and passed off information. The botWrap looks up needed information from its configuration files and executes process.

Attack Creation Module

In another embodiment, a module referred herein to as the Attack Creation module 236 or Attack Creator can provide a tool for attacking the network architecture in the simulated network system. Such an Attack Creation system can be one or more parts, and can be summarized for explanation purposes as three separate parts: an event builder, a scenario builder, and an execution manager. Generally, attacks are instantaneous random events. Events are a list of steps/actions that a hostile entity would take to attack a network. These events are in turn organized onto a timeline for automated playback. This grouping of events along a timeline can be referred to as a scenario. Once an instructor/operator has loaded a scenario, he can simply press the play button and all events are executed according to their scheduled time. The operator does not have to interact with the Attack Creation module 236. Operators don't have to know how a given event works but typically the system provides for the design by an operator or user for configuring scenarios. The Attack Creation module 236 provides for this by providing many levels of user interaction and configuration, from the simplistic user who doesn't even know how an event works, to the expert user who wants to create completely new events using the raw exploit data. The expert user can create new events or use existing ones (that have been saved into a database on the node) by using the event builder. He can then schedule those events into a timeline to create a scenario by using the scenario builder. This scenario can then be saved so that either the advanced user or a simple user can execute the scenario without altering its performance. This can be done by using the execution manager.

A scenario can be loaded into the execution manager. Once loaded, the play button may be pressed at any time. Once pressed, the timer starts and the instructor can be able to maintain a controlled timetable for the events. Typically, events do not occur immediately or even one after another, but rather are scheduled at random intervals accordingly to cause the most surprise and be unpredictable for the students. The execution manager can be "skipped" to the next event. The operator can skip to the previous event and start it again if necessary, or to pause an entire scenario. This can enable the operator to maintain full control of the simulated environment.

Embodiments of the Attack Creation module 236 can provide for the modification of events on the fly. The Attack Creation module 236 can also provide for full manual control of an attack machine by the operator. In some embodiment, an attack or exploitation module can exploit any component in a network environment, whether these components are physical, virtual, or simulated devices attached to a network. The attack events can be created such that they are the exploitation of published and unpublished vulnerabilities of hardware and software network systems, devices, or applications; attack events can also be hardware or infrastructure failures. These can include attached event metadata as defined by the user or application. To accomplish this, the user can configure the attack via an Attack Event Editor 272.

As described by way of example in the section below entitled Simulated Network Exploitation User Interface, a user interface can be configured for management of the Network Exploitation module. The processes that appear in the right hand side of the figures are transmitted to the Attack Event Editor 272 via an extension of the Node Communication Protocol by the CM 306, which reads from the Configuration Store 323 which processes are available.

The information that is selected/configured via the Attack Event Editor 272 is held in memory until such time that it is processed to be saved, at which point it is transmitted back to the CM 306 via the Node Communication Protocol.

Figure 17:
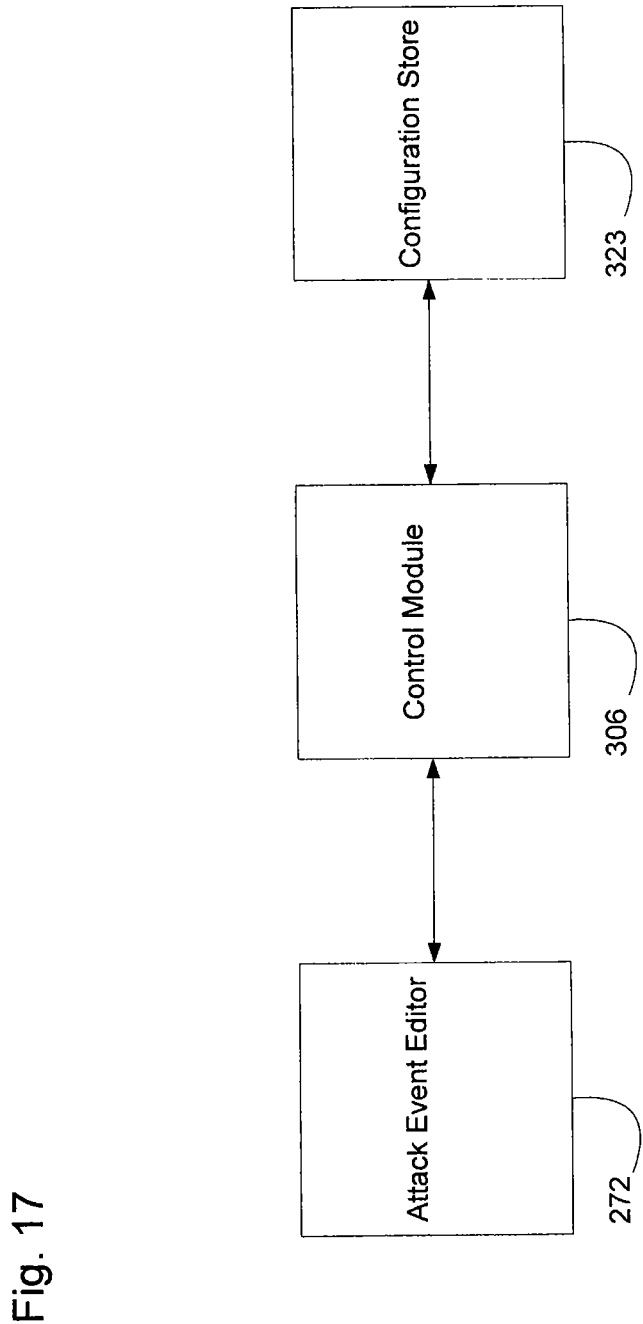
FIG. 17 is a block diagram of an Attack Event Editor process flow according to one embodiment of an Attack Creation module.

As shown in FIG. 17, the attack events can be saved by the Attack Event Editor 272 writing the configuration into a standard XML formatted file and then sends the file via the Node Communication Protocol to the CM 306. System specific information is automatically generated by the CM 306 so as to maintain unique attributes of a given attack event (e.g. serial numbers for attack events which are unique within the system by automatic incrementation of a global serial number listing inside the system) and these are added into the XML file which is then written to the Configuration Store 323.

The attack events can be deleted by Attack Event Editor 272 sending the appropriate directive via the Node Communication Protocol to the CM 306, which then removes the attack event from the Configuration Store 323. The attack events can be modified by either a saved event or during/prior to execution. The Attack Event Editor 272 writes the configuration into a standard XML formatted file and then sends the file via the Node Communication Protocol to the CM 306. The CM 306 validates the system specific information so as to maintain unique attributes of a given attack event (e.g. serial numbers for attack events which are unique within the system by automatic incrementation of a global serial number listing inside the system) and then writes the information into the Configuration Store 323.

A user can browse or query the saved attack events based upon a specified criterion/criteria. All attack events that appear in the left hand side of the figures are transmitted to the Attack Event Editor 272 via an extension of the Node Communication Protocol by the CM 306, which reads from the Configuration Store 323 the attack events that are available. The Attack Event Editor 272 is able to sort, filter, or group the attack events based upon the metadata defined at the time of the event creation.

A saved attack event can be executed either within an attack scenario or on demand. The Attack Scenario Execution Manager 276 can send the appropriate directives via the Node Communication Protocol to the CM 306 which in turns executes an attack. The attack event can be monitored for execution via a status report as follows: success/failure of an attack event, and as a detailed informational view.

Updates can be sent to the Attack Scenario Execution Manager 276 via the Node Communication Protocol by the CM 306. The CM 306 receives its updates from the ARM 310, which in turn receives updates from the BSM 315 as to the success, state, or other information pertaining to the attack event. The section herein entitled Node GUI Design provides one exemplary embodiment suitable for use as described herein.

An attack scenario can be created such that it is a group of attack events that can include attack scenario specific metadata as defined by the user or application. An Attack Scenario Editor 274 can be configured to group attack events together and assign them a time to execute based from the beginning of an attack scenario execution. The information that is selected/configured via the Attack Scenario Editor 274 can be held in memory until such time that it is processed to be saved, at which point it is transmitted back to the CM 306 via the Node Communication Protocol.

Figure 18:
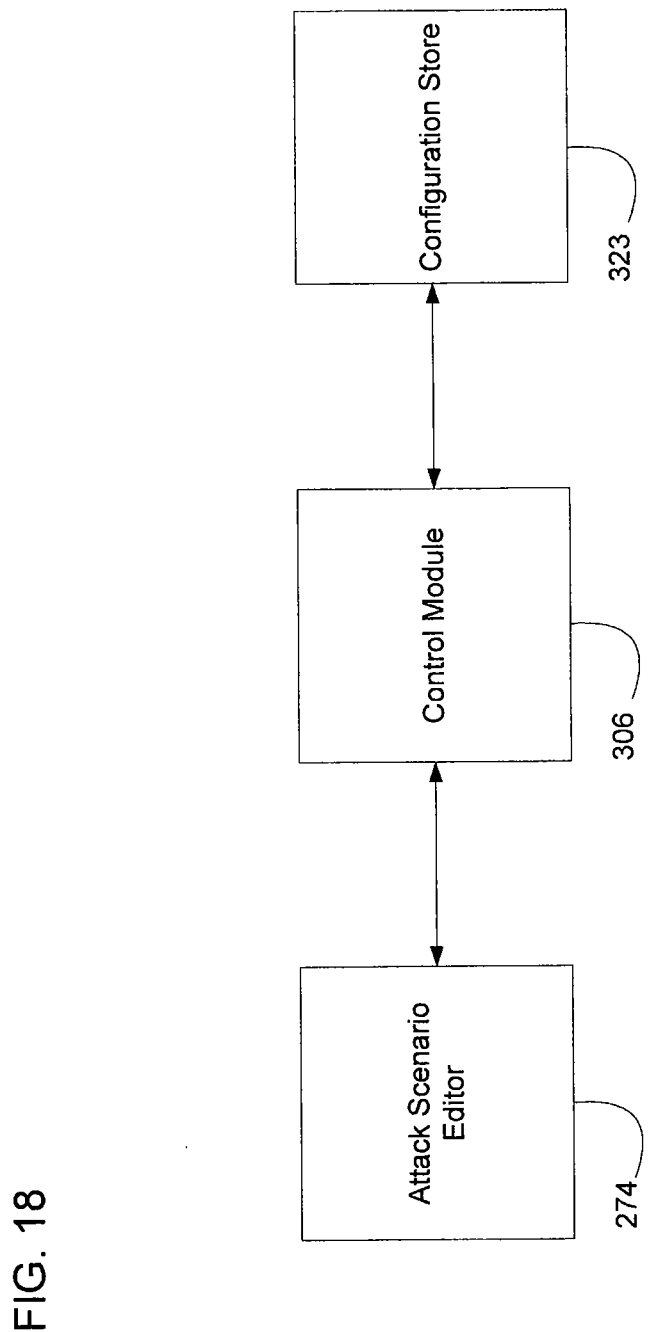
FIG. 18 is a block diagram of an Attack Scenario Editor process flow according to one embodiment of an Attack Creation module.

As shown in FIG. 18, an attack scenario can be saved by an Attack Scenario Editor 274 that writes the configuration into a standard XML formatted file and then sends the file via the Node Communication Protocol to the CM 306. System specific information is automatically generated by the CM 306 so as to maintain unique attributes of a given attack scenario (e.g. serial numbers for attack scenarios which are unique within the system by automatic incrementation of a global serial number listing inside the system) and these are added into the XML file which is then written to the Configuration Store 323.

The attack scenario can be deleted by the Attack Scenario Editor 274 sending the appropriate directive via the Node Communication Protocol to the CM 306, which then removes the attack scenario from the Configuration Store 323.

An attack scenario can be modified by either a saved attack scenario or during/prior to execution. The Attack Scenario Editor 274 can write the configuration into a standard XML formatted file and then send the file via the Node Communication Protocol to the CM 306. The CM 306 validates the system specific information so as to maintain unique attributes of a given attack scenario (e.g. serial numbers for attack scenarios which are unique within the system by automatic incrementation of a global serial number listing inside the system) and then writes the information into the Configuration Store 323.

A user can browse or query saved attack scenarios based upon a specified criterion/criteria. Attack scenario details are transmitted to the Attack Scenario Editor 274 via the Node Communication Protocol by the CM 306, which reads from the Configuration Store 323 the attack scenarios that are available. The Attack Scenario Editor 274 is able to sort, filter, or group the attack scenarios based upon the metadata defined at the time of the attack scenario creation.

Figure 19:
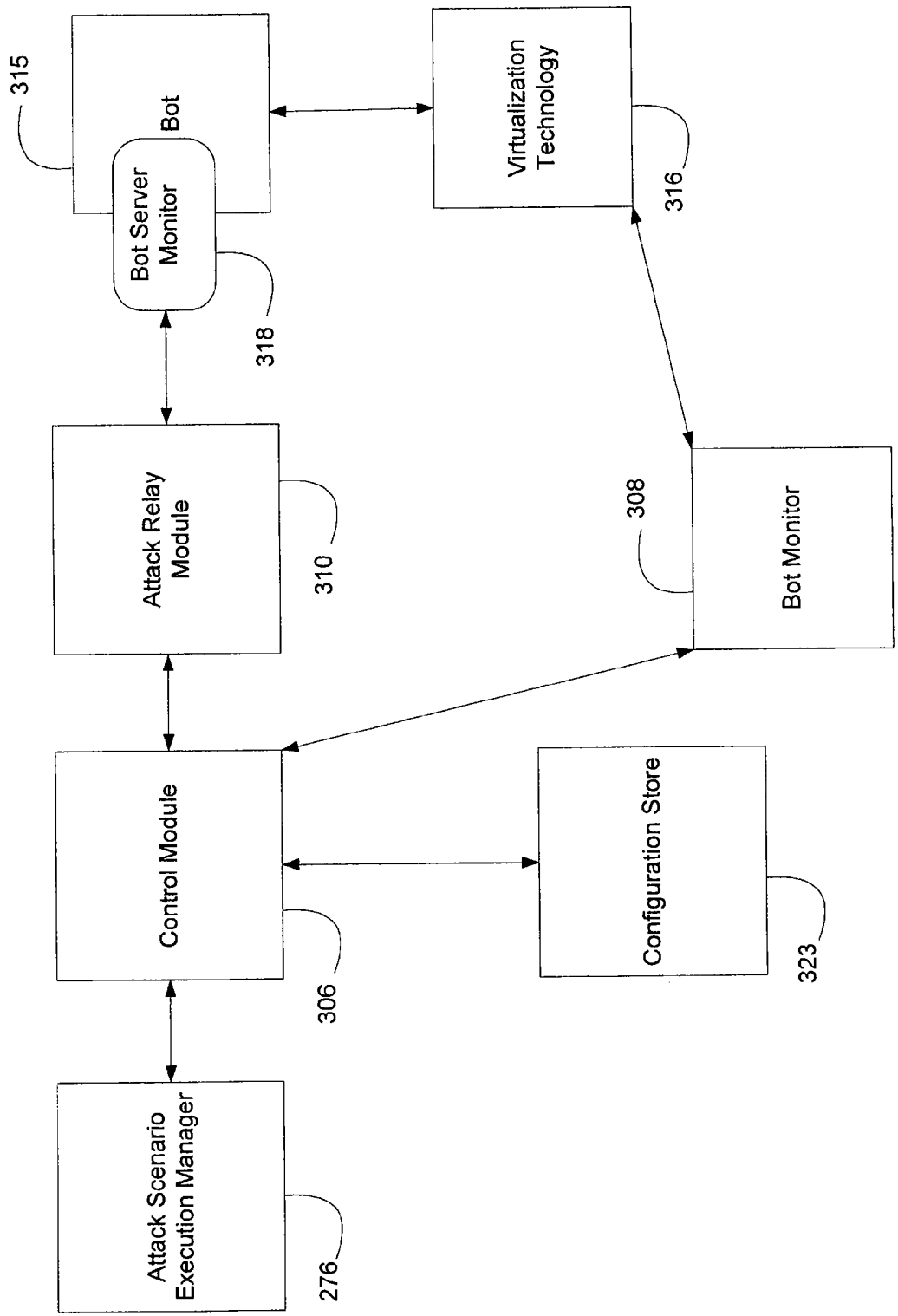
FIG. 19 is a block diagram of an Attack Scenarios Execution Manager process flow according to one embodiment of an Attack Creation module.

An attack scenario can be executed as an automated playback of attack events along an operational timeline as shown in FIG. 19. The Attack Scenario Execution Manager 276 sends the appropriate directives via the Node Communication Protocol to the CM 306 which in turn executes an attack. The attack scenario execution can be monitored via a status report of the attack scenario as a collective whole relating to the following: as a relative percentage of successes/failures, as a detailed informational view, with respect to an individual attack event, referring back to an individual attack event's status report Updates can be sent to the Attack Scenario Execution Manager 276 via the Node Communication Protocol by the CM 306. The CM 306 receives its updates from the ARM 310, which in turn receives updates from the BSM 315 as to the success, state, or other information pertaining to the attack event.

Figure 25:
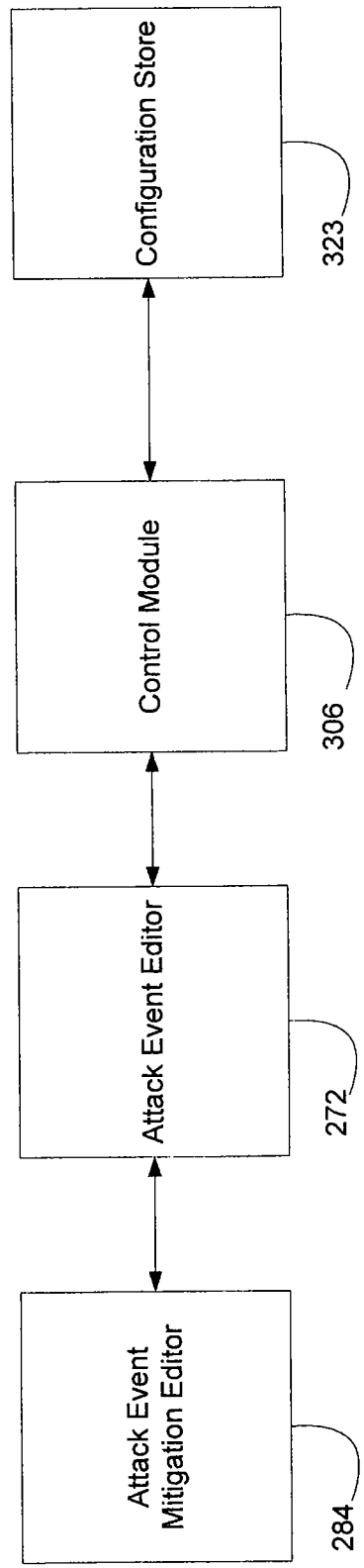
FIG. 25 is a block diagram of an Attack Event Mitigation Editor process flow according to one embodiment of an Attack Creation module.

Referring now to FIG. 25, a set of expected user actions can be defined within the metadata of an attack event which would mitigate the attack event or prevent the attack event from being successful. An Attack Event Mitigation Editor 284 can present these options as an extension to the Attack Event Editor 272. The process of defining a mitigation set is similar as described herein. In one embodiment, additional information is written into the same XML file.

Figure 29:
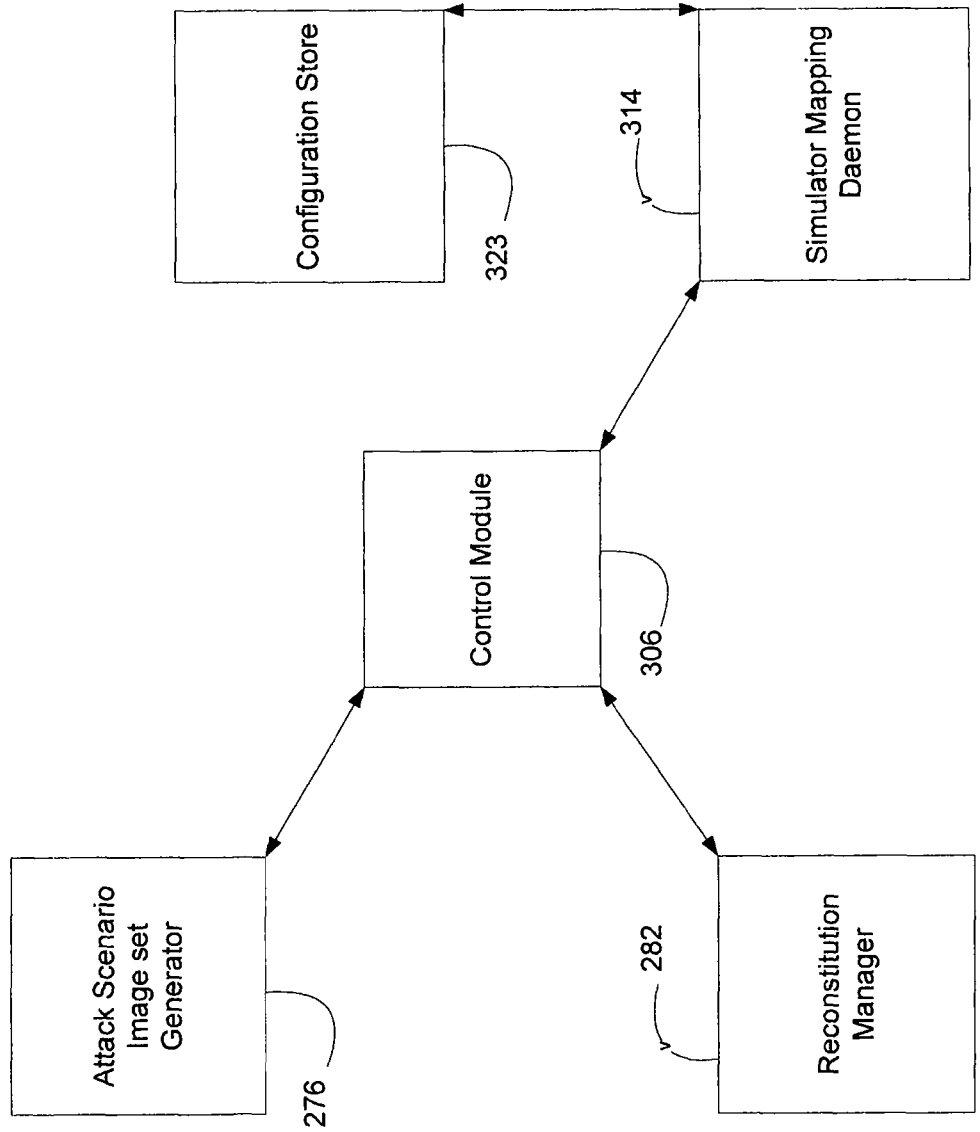
FIG. 29 is a block diagram of an Attack Scenario Image Set Generation process flow according to one embodiment of a Network Monitoring and Analysis module.

Referring now to FIG. 29, the internal listing of which devices can be restored based upon a successful execution of an attack scenario so that the appropriate images and image sets can be created before execution of the attack scenario can be provided. The Attack Scenario Image Set Generator 276 can query the SMD 314 through the CM 306 via the Node Communication Protocol as to which specific Bots 315 will be affected by the execution of the attack scenario, and then generates the appropriate configuration which can then be sent to the CM 306 to create an image set which can be read by the Reconstitution Manager 282.

A user interface for the simulated network exploitation module can be provided as follows, by way of example, and not intending to be limiting in any manner.

The Event Editor menu item can be configured to that it is only enabled when the GUI 104 is connected to an appliance and has control of that appliance. Clicking the menu item can bring up the Event Editor which will default to the currently selected appliance, if the user is connected to more than one appliance at the time the editor is launched.

Event editor window—The Event Editor will allow the user to edit events on currently connected appliances. The user must have control of the appliance in which they wish to edit events otherwise the editor will function in read-only mode.

The complete list of available events, for the selected appliance, is shown in a tree-like structure similar to common file explorers. Each event is assigned a category which is used to organize the list.

Event metadata is editable and shown in tabs.

Included processes are shown in tabs and can be added by dragging a process from the list of Available Process or selecting from the drop down list on the Add Process tab.

Populating process data is done by selecting appropriately filtered data from the drop down list or other mechanism. The selection method depends on the type of data to be completed. Data for drop down lists is populated from the configuration options table or from the Network Preferences Dialog. Source information can be populated from the Zone information.

Unsaved work is indicated by both an asterisks on the tab of the event and the Save button is in the enabled state.

Configuration Options is common data shared across all events on all appliances. It is saved as preferences for the GUI 104 on the local machine. Information is filtered and displayed in the configurable options of an exploit.

Event context menu will provide common functions such as:
 Copy—Copy the event to the clipboard for pasting.
 Paste—Copies the event from the clipboard prompting to provide a new name.
 Delete—Removes the event from the appliance.
 Rename—Changes the entry to an editable field to allow the name to be changed.
 Save—Saves changes (if any).
 Save To—Opens a dialog allowing the user to save the event to another appliance.
   i. Appliance Context Menu will provide appliance level functions:
   i. New Event—Create new empty event on the selected appliance.
   ii. Refresh—Reload event data for the selected appliance.
   iii. Import—Open a dialog to select an event XML file from which to import events.
   iv. Export—Opens a dialog to select a location on the local machine to save the XML file.
   v. Save All—Save all events that have been modified but have not been saved.
 Context Menus can also be provided.

Network Monitoring and Analysis Module

In another embodiment, a module referred to as the Network Monitoring and Analysis module 230 can be the monitoring agent that reports the actions and responses of the users/students. Often during simulations and testing, the students overreact to a real or perceived threat and inadvertently disable some part of the simulator in an attempt to defend their network. The Network Monitoring and Analysis module 230 can provide a log of what the user/student has done in the past, but can also be configured to provide real time alerts so that the instructor/operator can be notified immediately when something negative has occurred, such as a network or component outage or event. This can provide the operator with the ability to maintain control and direct the user/students towards a desired solution.

Such a module, in some embodiment, can be configured to monitor a network environment and report when there is a change, by analyzing current network operations and comparing them to an existing baseline.

A network operation check can be created that is a testable configuration of a traffic pattern or protocol. These network operation checks can contain metadata as defined by the user or application. The user can configure network operation checks via the GUI component Network Operation Check Editor 246.

A basic traffic pattern (as described herein with regard to the network traffic generator) can be used to validate network operations. However, the basic traffic pattern should be broken down into its constituent parts in order to provide detailed reporting. Using the example of a user surfing the Internet as described in relationship with the network traffic generator, this module can provide the following additional description:

A basic traffic pattern for accessing a web server would have only the URL of the website, e.g. www.cnn.com. The network operation check actually contains all information to check the entire communication path, where discrete protocols such as DNS, HTTP, and RTSP are validated independently. The execution of a basic traffic pattern may result in a multitude of errors and these are typically addressed generally, making it difficult to discern the reason for a given error or failure. In the network operation check, when a failure is encountered it is logged at the precise failure level, allowing for a detailed report and clear identification of the issue.

Additionally, successful execution of a basic traffic pattern may be problematic, example being that the basic traffic pattern that accesses the web site www.cnn.com is unaware of what the definitive content should be, and although it successfully retrieves a web page, it is unable to report an error on whether it has actually accessed the appropriate page. A network operation check can validate whether the actual web page that is retrieved is the intended page by comparing the retrieved document against a known good copy.

The information can be selected/configured via a GUI 104 component such as a Network Operation Check Editor 246. This information can be held in memory until such time that it is processed to be saved, at which point it is transmitted back to the CM 306 via the Node Communication Protocol.

Figure 20:
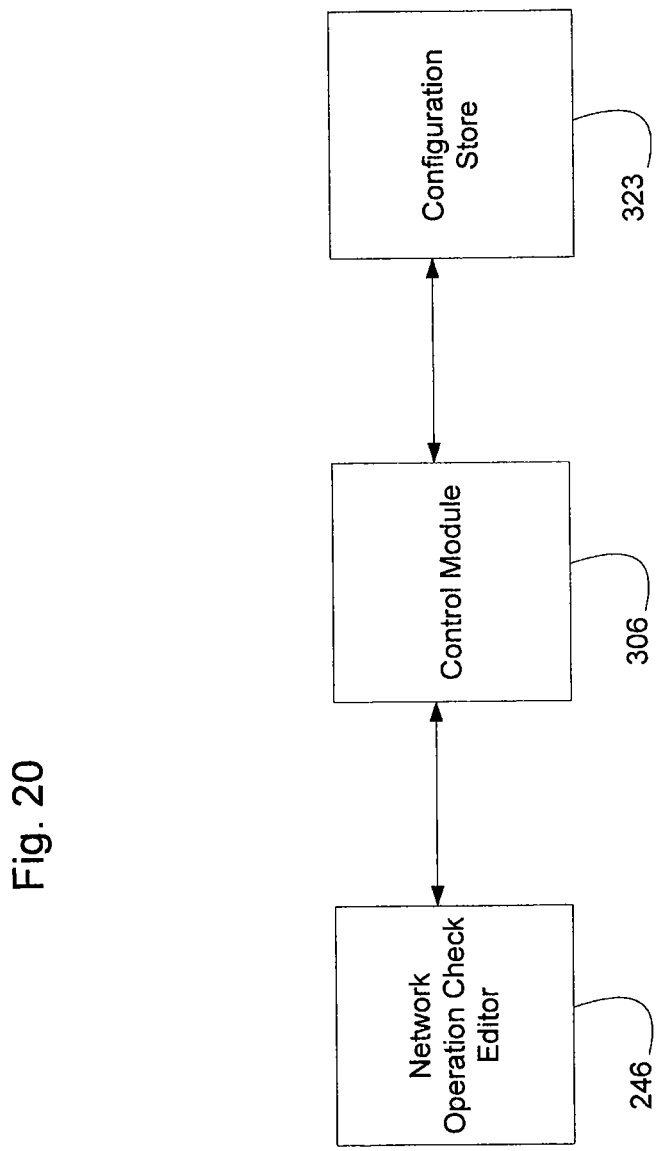
FIG. 20 is a block diagram of a Network Operation Check Editor process flow according to one embodiment of a Network Monitoring and Analysis module.

Referring now to FIG. 20, the network operation checks can be saved by a Network Operation Check Editor 246 writing the configuration into a standard XML formatted file and then sends the file via an extension of the Node Communication Protocol to the CM 306. System specific information is automatically generated by the CM 306 so as to maintain unique attributes of a given network operation check (e.g. serial numbers for network operation checks which are unique within the system by automatic incrementation of a global serial number listing inside the system) and these are added into the XML file which is then written to the Configuration Store 323.

The network operation checks can be deleted by the Network Operation Check Editor 246 sending the appropriate directive via the Node Communication Protocol to the CM 306, which then removes the network operation check from the Configuration Store 323. A modification of the network operation checks can be provided by either a saved network operation check or during/prior to execution. The Network Operation Check Editor 246 can write the configuration into a standard XML formatted file and then sends the file via the Node Communication Protocol to the CM 306. The CM 306 validates the system specific information so as to maintain unique attributes of a given network operation check (e.g. serial numbers for network operation checks which are unique within the system by automatic incrementation of a global serial number listing inside the system) and then writes the information into the Configuration Store 323.

A user can browse or query saved network operation checks based upon a specified criterion/criteria. Network operation check details can be transmitted to the Network Operation Check Editor 246 via the Node Communication Protocol by the CM 306, which reads from the Configuration Store 323 the network operation checks that are available. The Network Operation Check Editor 246 is able to sort, filter, or group the check based upon the metadata defined at the time of the network operation check creation.

A saved network operation check can be executed either within a currently running monitoring session or on demand. A Network Monitoring Execution Manager 252 can be configured to send the appropriate directives via the Node Communication Protocol to the CM 306 which in turn executes the traffic to perform the network operation check with the following exceptions:

The network operation check is typically only performed once at the time of the request, since it is the equivalent of the basic traffic pattern and not a full network traffic pattern.

The network operation check can be monitored via a status report as follows: success/failure of the check, as a detailed informational view, and as a graphical view of the network operation check through a logical topology.

Updates are sent to the Network Monitoring Execution Manager 252 via the Node Communication Protocol by the CM 306. The CM 306 receives updates from the NCM 331, which in turn receives specific information from the BSM 318 pertaining to the process.

The output of the network operation check status report can be provided which flows from the BSM 318 to the NCM 331 to the CM 306 is written by the CM 306 into the log store 325. Metadata is also stored to help define this output as unique and correlate it with the appropriate simulator mapping.

A check grouping can be created that is a group of network operation checks that can include check grouping metadata as defined by the user or application. A Check Grouping Editor 248 can be configured to group network operation checks together and assign them a time, frequency, or sequence to execute. The information can be selected/configured via the Check Grouping Editor 248 and held in memory until such time that it is processed to be saved, at which point it is transmitted back to the CM 306 via the Node Communication Protocol.

Figure 21:
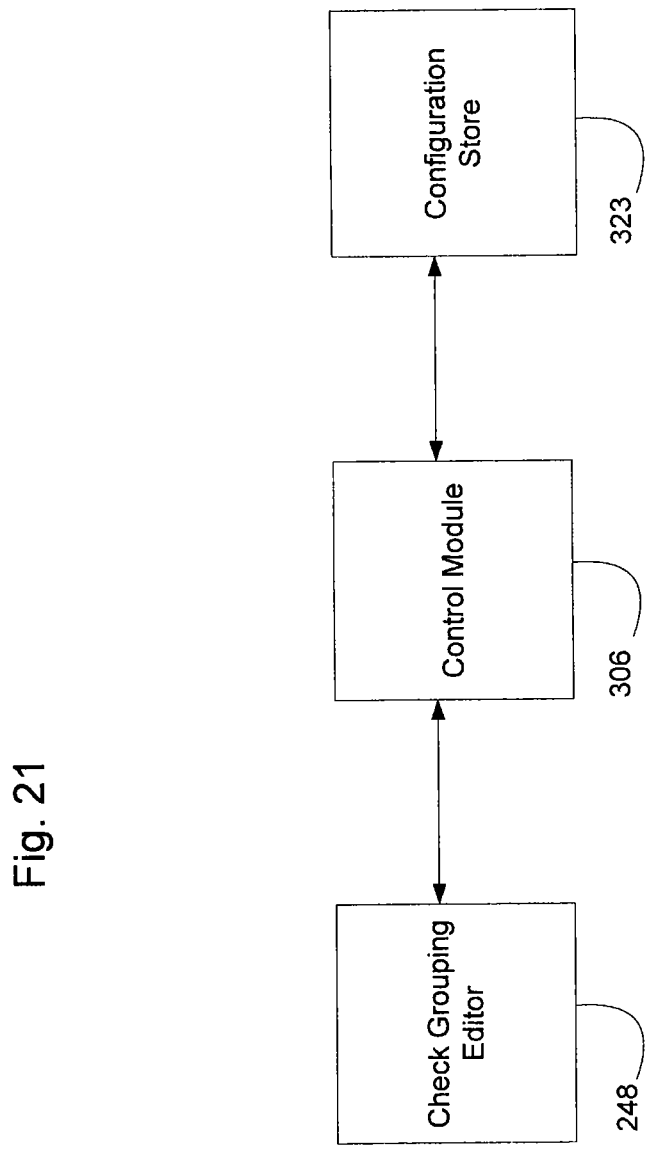
FIG. 21 is a block diagram of a Check Grouping Editor process flow according to one embodiment of a Network Monitoring and Analysis module.

In FIG. 21, a check grouping can be saved by a Check Grouping Editor 248 writing the configuration into a standard XML formatted file and then sends the file via the Node Communication Protocol to the CM 306. System specific information is automatically generated by the CM so as to maintain unique attributes of a given check grouping (e.g. serial numbers for check groupings which are unique within the system by automatic incrementation of a global serial number listing inside the system) and these are added into the XML file which is then written to the Configuration Store 323.

A check grouping can be deleted by the Check Grouping Editor 248 sending the appropriate directive via the Node Communication Protocol to the CM 306, which then removes the check grouping from the Configuration Store 323. A modification to a check grouping can be configured by the Check Grouping Editor 248 writing the configuration into a standard XML formatted file and then sending the file via the Node Communication Protocol to the CM 306. The CM 306 validates the system specific information so as to maintain unique attributes of a given check grouping (e.g. serial numbers for check groupings which are unique within the system by automatic incrementation of a global serial number listing inside the system) and then writes the information into the Configuration Store 323. A user can browse or query saved check groupings based upon a specified criterion/criteria. Check grouping details are transmitted to the Check Grouping Editor 248 via the Node Communication Protocol by the CM 306, which reads from the Configuration Store 323 the check groupings that are available. The Check Grouping Editor 248 is able to sort, filter, or group the check groupings based upon the metadata defined at the time of the check grouping creation.

A saved check grouping can be executed either within a currently running monitoring session or on demand. A Network Monitoring Execution Manager 252 sends the appropriate directives via the Node Communication Protocol to the CM 306 which in turn executes the traffic to perform the network operational checks listed in the check grouping according to the process defined in (5). These network operational checks are performed based on: an elapsed time period starting from the moment of check grouping execution, a time based frequency starting from the moment of check grouping execution, a sequence order as defined within the check grouping, a combination of the above, being that a sequence of network operational checks could be performed sequentially, every 300 seconds, where the elapsed time is measured in intervals between executions The check grouping can be monitored via a status report as follows: as a relative percentage of successes/failures, as a detailed informational view, as a graphical view of the check grouping through a logical topology, and with respect to an individual network operation check, referring back to an individual check's status report.

Figure 28:
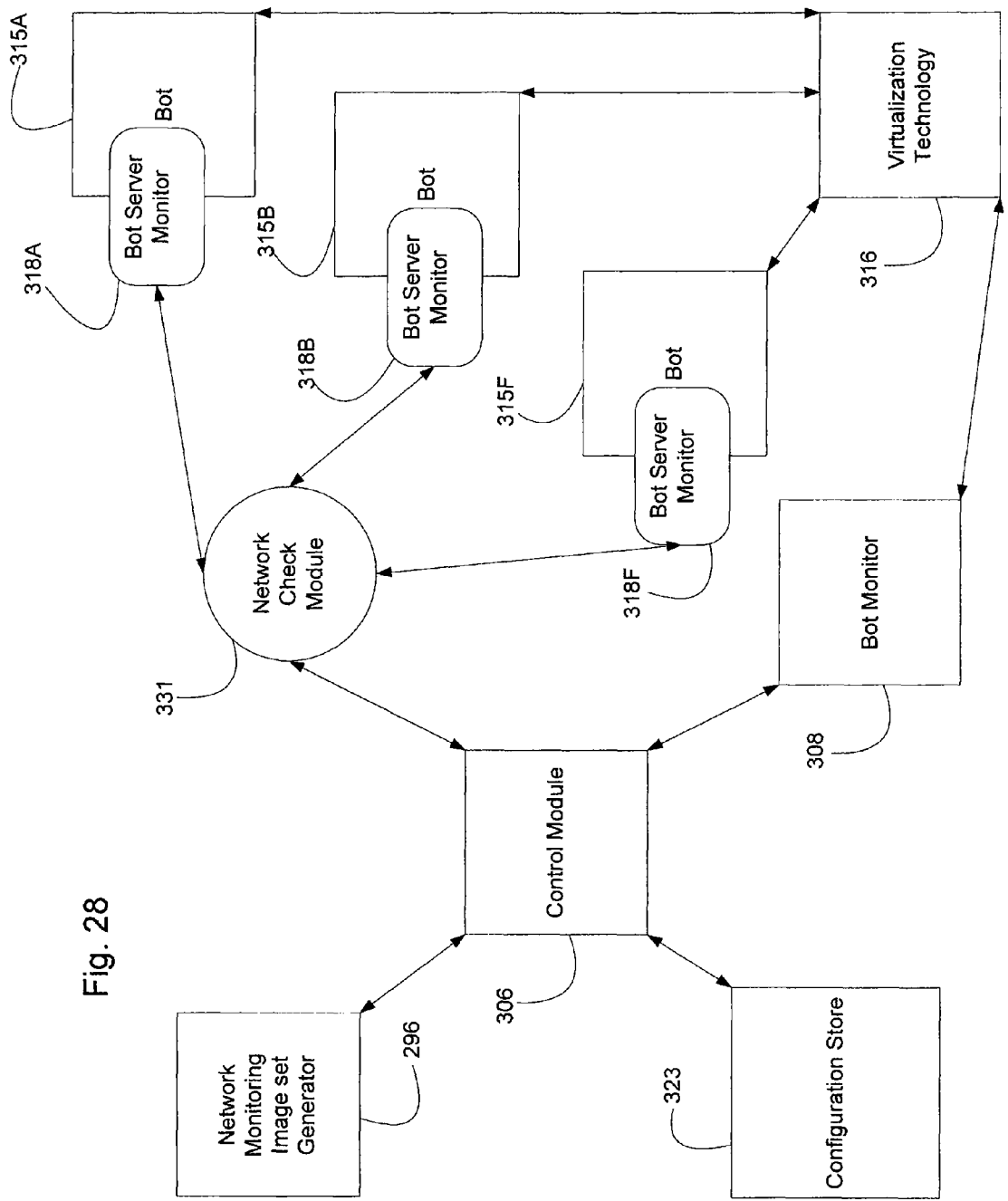
FIG. 28 is a block diagram of a Network Monitoring Image Set Generation process flow according to one embodiment of a Network Monitoring and Analysis module.

As shown in FIG. 28, updates can be sent to the Network Monitoring Execution Manager 252 via the Node Communication Protocol by the CM 306. The CM 306 receives updates from the NCM 331, which in turn receives specific information from the BSMs 318a through 318f for starting bots 318a through 318f respectively.

The output of the check grouping status report can be saved as the output which flows from BSM 318 to the NCM 331 to the CM 306 is written by the CM 306 into the log store 325. Metadata is also stored to help define this output as unique and correlate it with the appropriate simulator mapping.

A network monitoring profile can be created such that it is a group of check groupings that includes specific metadata as defined by the user or application. A Network Monitoring Profile Editor 250 is used to group check groupings together and assign them a time, frequency, or sequence to execute. The information that is selected/configured via the Network Monitoring Profile Editor 250 is held in memory until such time that it is processed to be saved, at which point it is transmitted back to the CM 306 via the Node Communication Protocol.

Figure 22:
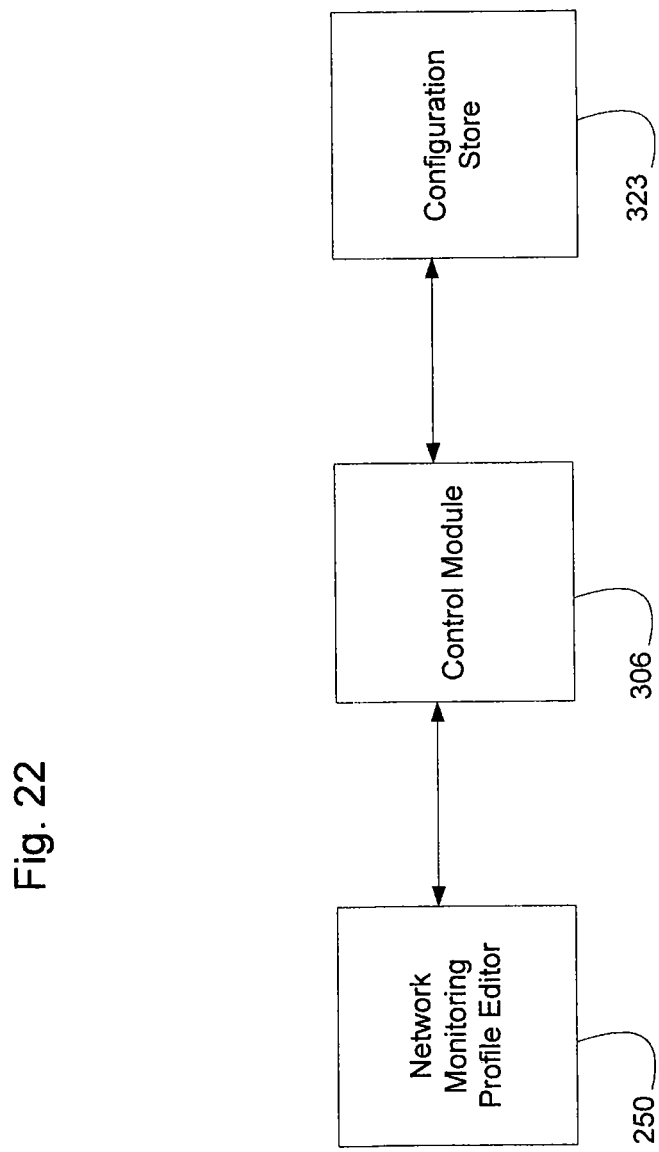
FIG. 22 is a block diagram of a Network Monitoring Profile Editor process flow according to one embodiment of a Network Monitoring and Analysis module.

A network monitoring profile can be created by A Network Monitoring Profile Editor 250 that writes the configuration into a standard XML formatted file and then sends the file via the Node Communication Protocol to the CM 306. System specific information is automatically generated by the CM 306 so as to maintain unique attributes of a given network monitoring profile, e.g. serial numbers for network monitoring profiles which are unique within the system by automatic incrementation of a global serial number listing inside the system, and these are added into the XML file that can then be written to the Configuration Store 323 as shown in FIG. 22. The network monitoring profile can be deleted by the Network Monitoring Profile Editor 250 sends the appropriate directive via the Node Communication Protocol to the CM 306, which then removes the network monitoring profile from the Configuration Store 323.

The network monitoring profile can be modified by the Network Monitoring Profile Editor 250 writing the configuration into a standard XML formatted file and then sends the file via the Node Communication Protocol to the CM 306. The CM 306 validates the system specific information so as to maintain unique attributes of a given network monitoring profile (e.g. serial numbers for network monitoring profiles which are unique within the system by automatic incrementation of a global serial number listing inside the system) and then writes the information into the Configuration Store 323.

A user can browse or query saved network monitoring profiles based upon a specified criterion/criteria. Network monitoring profile details are transmitted to the Network Monitoring Profile Editor 250 via the Node Communication Protocol by the CM 306, which reads from the Configuration Store 323 the network monitoring profiles that are available. The Network Monitoring Profile Editor 250 is able to sort, filter, or group the network monitoring profiles based upon the metadata defined at the time of the network monitoring profile creation.

Figure 23:
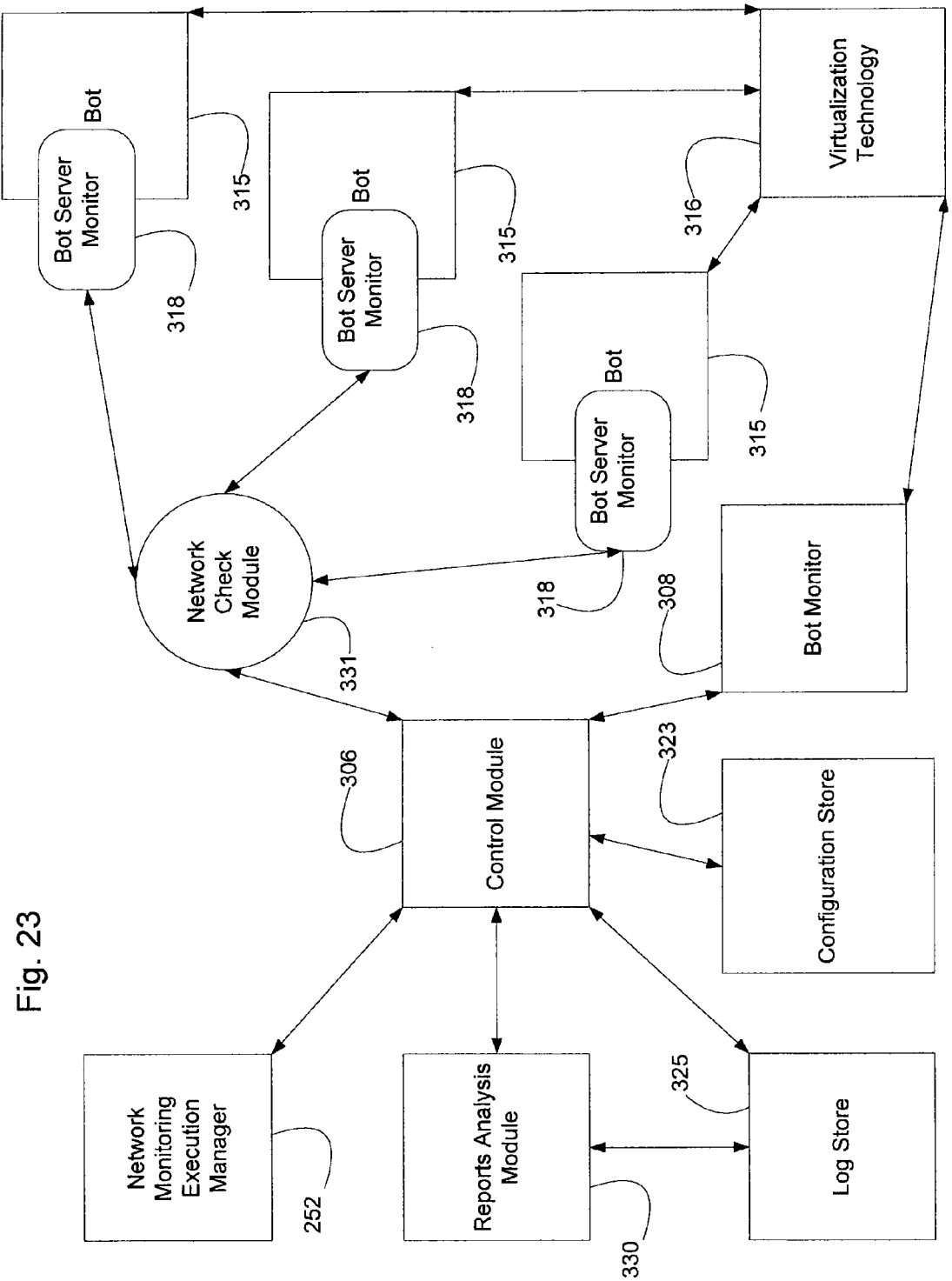
FIG. 23 is a block diagram of a Network Monitoring Execution Manager process flow according to one embodiment of a Network Monitoring and Analysis module.

Referring now to FIG. 23, a network monitoring profile can be executed via a continual monitoring of the network as described by the included checks and metadata. The Network Monitoring Execution Manager 252 can send the appropriate directives via the Node Communication Protocol to the CM 306 which in turns executes the traffic to perform the network operation checks listed in the network monitoring profile. These checks are performed based on: a time based frequency starting from the moment of profile execution, a sequence order as defined within the profile, and a combination of the above, being that a sequence of check could be performed sequentially, every 300 seconds, where the elapsed time is measured in intervals between executions.

The network monitoring profile execution can be monitored via a status report as a whole relating to the following: as a relative percentage of failures/success, as a detailed informational view, as a graphical view of the check grouping through a logical topology, with respect to a specific check grouping, referring back to an individual check grouping status report, and with respect to an individual network operation check, referring back to an individual network operation check's status report.

Updates can be sent to the Network Monitoring Execution Manager 252 via the Node Communication Protocol by the CM 306, The CM 306 receives updates from the NCM 331, which in turn receives specific information from the BSMs 318a through 318f pertaining to starting bots 315a through 315f, respectively.

The output of the network monitoring profile status report can be saved. The output which flows from the BSM 318 to the NCM 331 to the CM 306 is written by the CM 306 into the log store 325. Metadata is also stored to help define this output as unique and correlate it with the appropriate simulator mapping.

Figure 30:
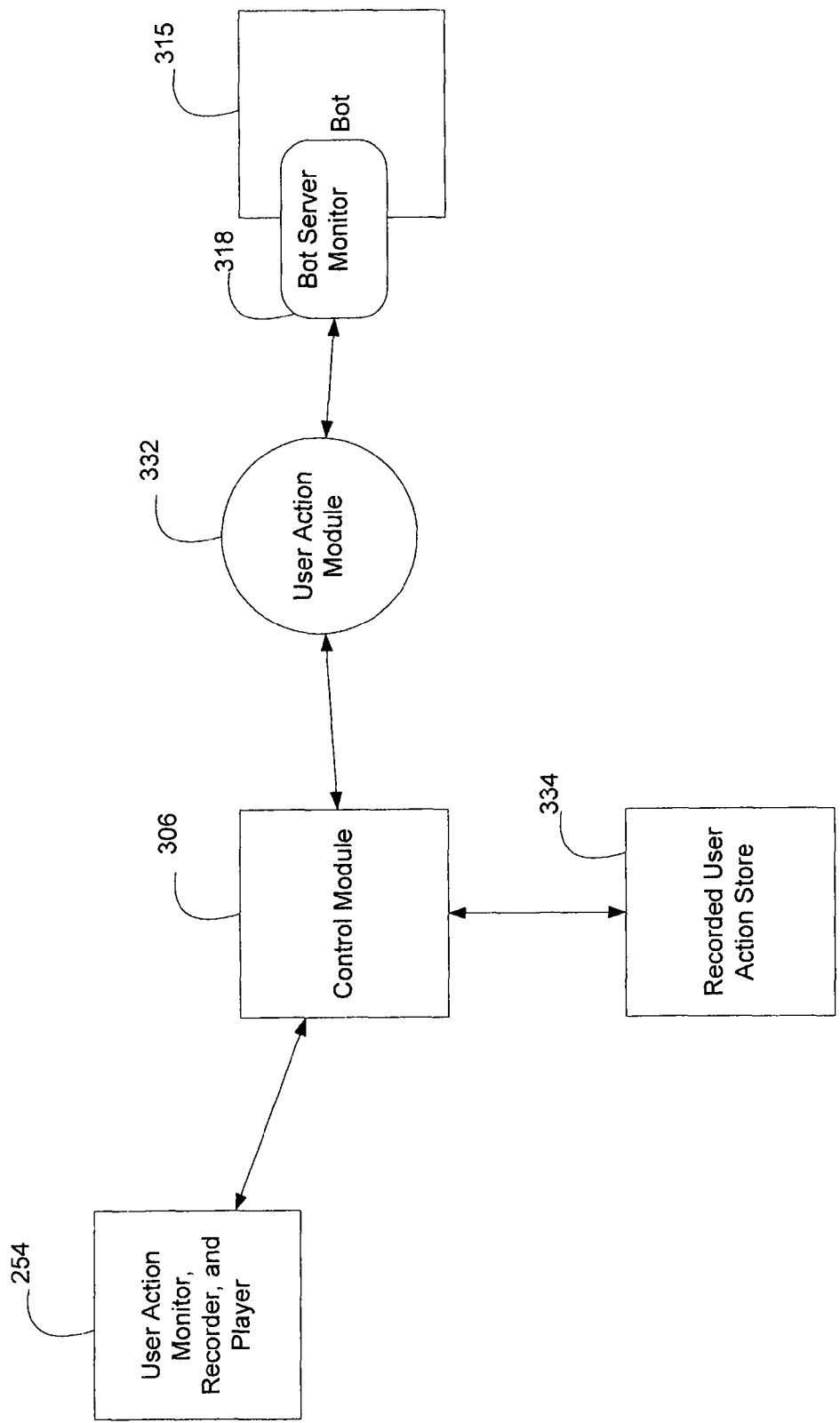
FIG. 30 is a block diagram of a User Action Monitor, Recorder and Player process flow for monitoring or recording user actions according to one embodiment of a Network Monitoring and Analysis module.

The system can also provide for logging module output to an external system via a specified protocol and/or format. A configuration can be defined within the Monitoring Execution Manager 252 to direct the RAM 330 via the CM 306 to produce output which is compatible with standard communication protocols (such as syslog) so that logging information can easily be sent from the node to other network devices User initiated actions on a network environment can be monitored as well. By allowing only specific physical access to a network environment, all user actions can be monitored by creating an in-line capture of all data between the user's access device and the rest of the network. For example, the user can be given a generic laptop to access the network environment, but in order to do so the laptop is configured to only access a specific interface on an access switch. The access switch is configured to copy all data (through standard port mirroring techniques) and then send that data directly to the UAM 332. The UAM 332 then parses the data and forwards it to the CM 306, which in turn communicates with the User Action Monitor, Recorder, and Player 254 via the Node Communication Protocol. The UAM 332 only sends the data for the specific device and only when requested by the CM 306, which receives its requests from the User Action Monitor, Recorder, and Player 254, as shown in FIG. 30.

Figure 24:
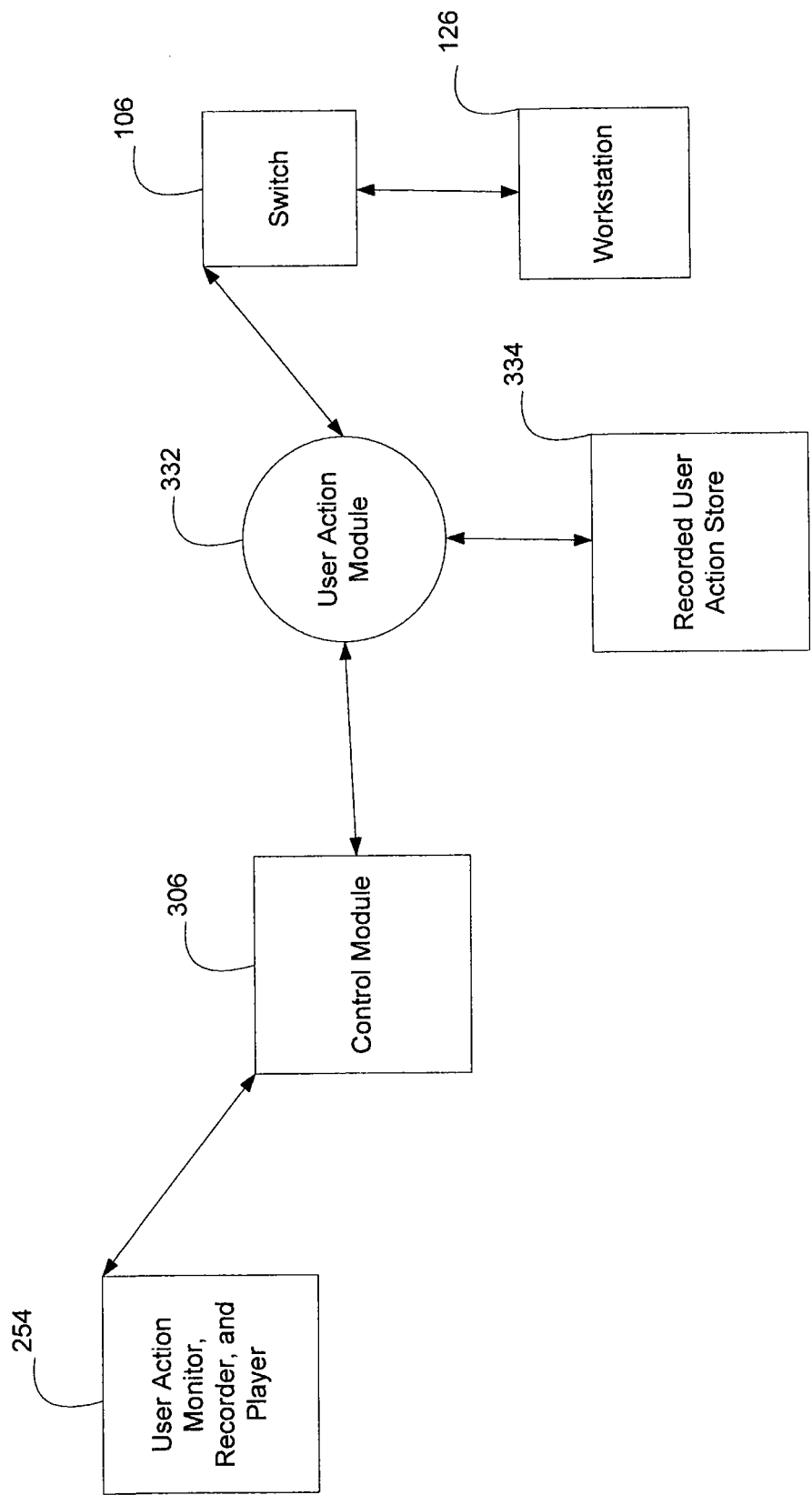
FIG. 24 is a block diagram of a User Action Monitor, Recorder and Player process flow for monitoring or recording user actions according to one embodiment of a Network Monitoring and Analysis module.

As shown in FIG. 24, the user initiated actions are recorded on a network environment, such that the actions can be executed along an equivalent operational timeline. As a continuation with the preceding example, when the User Action Monitor, Recorder, and Player 254 sends the appropriate directive via the Node Communication Protocol to the CM 306, the CM 306 then signals the UAM 332 to begin writing the appropriate data to the Recorded User Actions Store 334.

The system can also provide for the automated creation/ suggestion of images or image sets to be restored based upon what the network monitoring module detects as non-compliant with the baseline operational network.

When the Network Check Module (NCM) 331 determines the precise level of failure for a basic traffic pattern, it can determine which device is non-compliant with a baseline operational state. The NCM 331 then signals the CM 306 to generate an image set using the same directives as the Image Set Editor 280 would.

Recorded user actions can be executed simultaneously with the execution of a corresponding attack scenario. The automation of attack events can be logically extended to encompass user actions, as the timing and execution of processes for attacks can be replaced by user actions with standard user programs.

The user initiated actions can be analyzed to determine whether they are in compliance with expected user actions, as defined within the attack event metadata.

Figure 31:
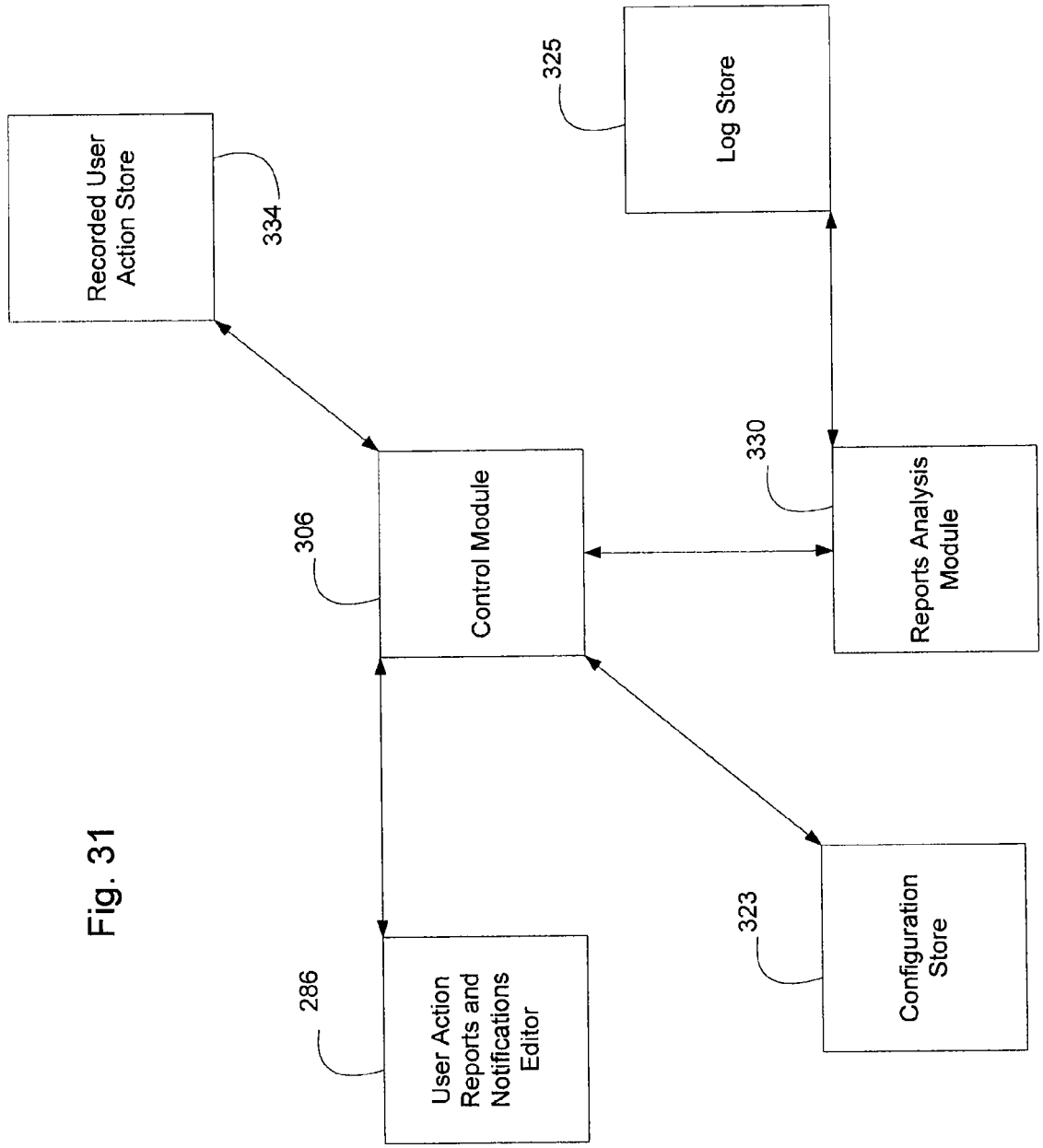
FIG. 31 is a block diagram of a User Action Reports and Notification Editor process flow according to one embodiment of a Network Monitoring and Analysis module.

Referring to FIG. 31, a User Action Reports and Notification Editor 286 sends the appropriate directives via the Node Communication Protocol to the CM 306, which retrieves all of the parsed user information related to the requested report from the Recorded User Actions Store 334. The CM 306 also retrieves the mitigation set information from the appropriate attack event from the Configuration Store 323. It then forwards all of this information to the RAM 330, which performs analysis and writes the report to the Log Store 325. The report can then be retrieved by the User Action Reports and Notification Manager 288 via the Node Communication Protocol from the CM 306, which in turn retrieves the information from the Log Store 325.

Figure 32:
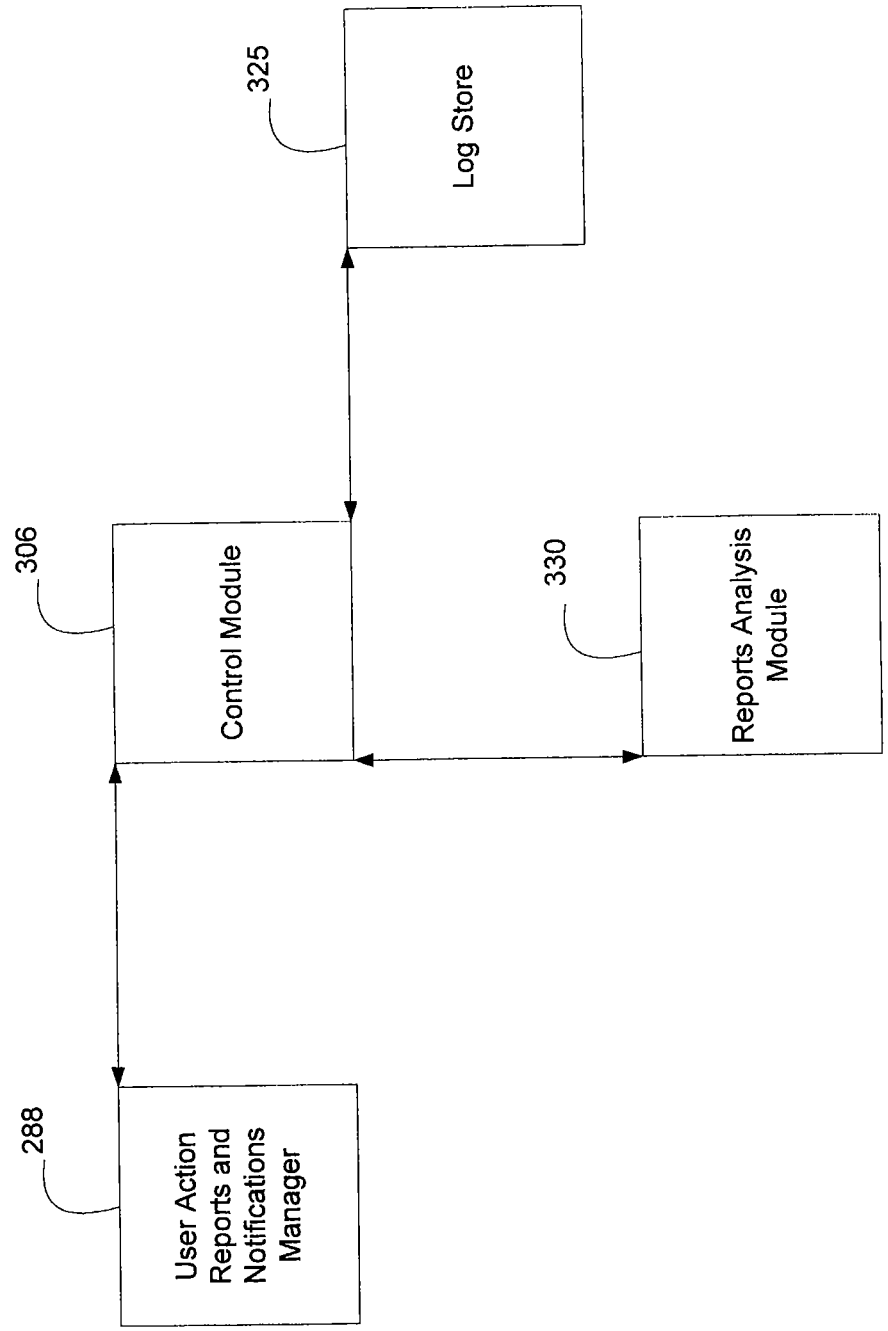
FIG. 32 is a block diagram of a User Action Reports and Notification Manager process flow according to one embodiment of a Network Monitoring and Analysis module.

A report can be created that depicts as a scorecard the ratio of successes and/or failures with respect to user initiated actions and the expected user actions, as shown in FIG. 32. A User Action Reports and Notification Manager 288 can send the appropriate directives via the Node Communication Protocol to the CM 306. The CM 306 queries the Log Store 325 for the appropriate report and then passes this and the selected scorecard configuration to the RAM 330. The RAM 330 then performs analysis of the report data, formats the data according to the configuration, and then returns the data to the User Action Reports and Notification Manager 288 via the CM 306 using the Node Communication Protocol.

Network Reconstitution Module

In another embodiment, a module referred to as Network Reconstitution module 238 can provide for the reconstitution capability of the network simulator. Generally, during use or operation of the network simulators, the students/users often misconfigure the network equipment and the Attack Creation module's attacks create network reconfigurations or outage. As such, during use the network simulators are often misconfigured during user use and operation to be nearly inoperable. A system or module such as the Network Reconstitution module 238 can provide for the reconstitution of the network simulator by keeping "snapshots" of the equipment baseline. At any time, the operator can restore any or all of the simulated network and/or network applications to a preconfigured state. This does not have to include a full simulated network rebuild, but can be a restoration of a previously existing baseline. Multiple sets of preconfigured baselines can be kept to provide differing levels of complexity for the students/users.

Any component in a network environment can be restored to a predefined configuration, whether the component is physical, virtual, or simulated devices attached to a network. A network device image can be created that is a specific moment-in-time configuration and data of the network device including metadata defined by the user or application. An image of a network device includes metadata to describe the contents of the data and its relation to the network device from which it was derived. Operation of a network device (component) in an isolated environment devoid of other components causes small changes in its state, while interactions with other components in a larger network environment can cause much larger state changes. The difference in these states are due to the underlying changes in the data on the secondary storage device and changes to the physical or virtual composition of the device. By saving all of the data on the secondary storage device and its composition at a specific moment in time, it is possible to create a duplicate of the device and its state.

The user initiates the creation of an image via the Image Configuration Editor 278. The section entitled Reconstitution User Interface provides one exemplary embodiment of a user interface to support these capabilities. The section entitled Reconstitution Module Protocol provides one exemplary embodiment of a protocol supporting this capability.

The information that is selected/configured via the Image Configuration Editor 278 is held in memory until such time that it is processed to be saved, at which point it is transmitted back to the CM 306 via the Node Communication Protocol.

Figure 34:
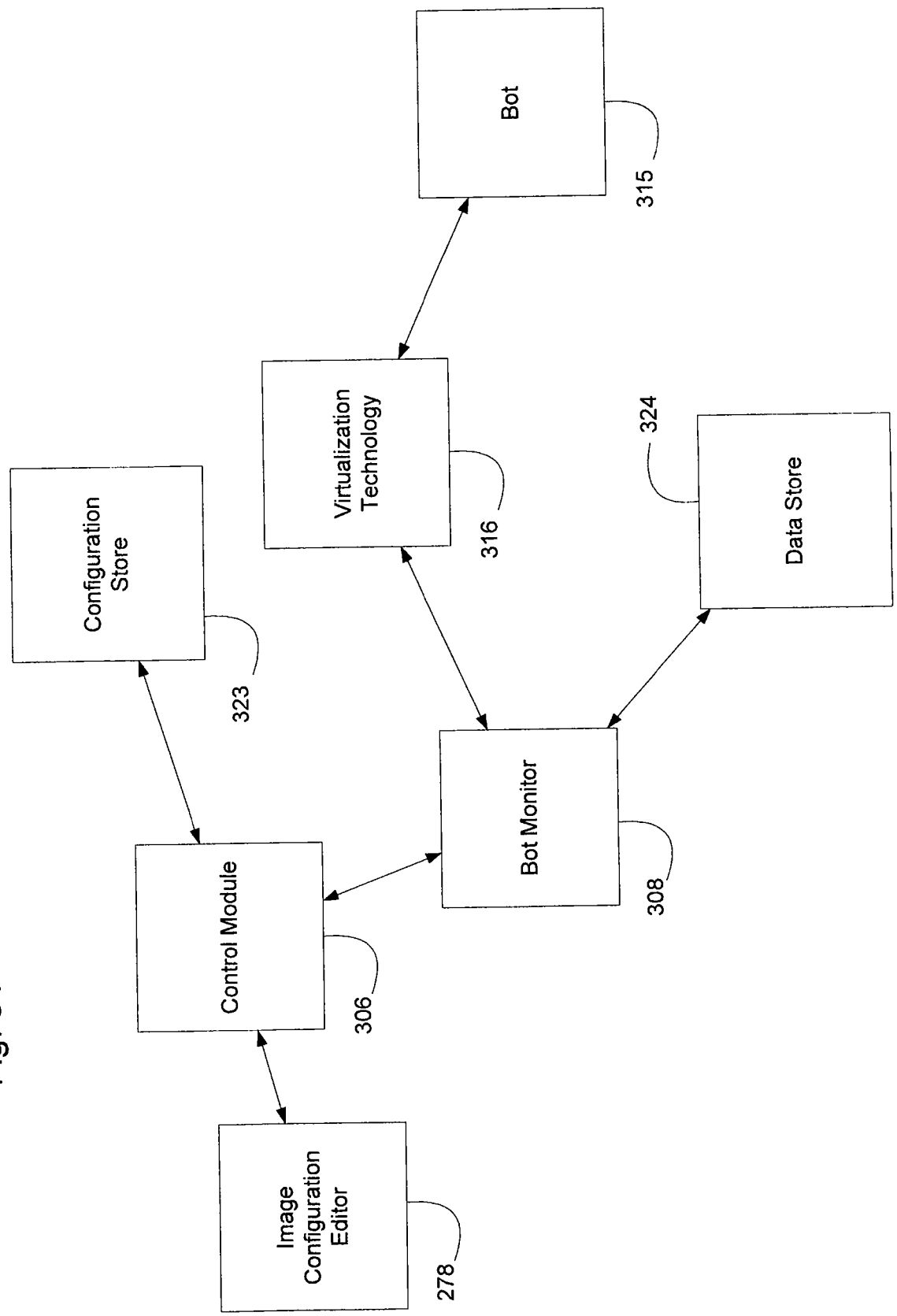
FIG. 34 is a block diagram of an Image Configuration Editor process flow according to one embodiment of a Network Reconstitution module.

Referring to FIG. 34, an image can be saved by an Image Configuration Editor 278 sending the appropriate directives via the Node Communication Protocol to the CM 306 which in turn writes the appropriate information to the Configuration Store 323 and forwards all information to the BM 308. The BM 308 then signals the Virtualization Technology 316 with the appropriate configuration data and the Virtualization Technology 316 suspends the bot 315. The BM 308 then creates an image which duplicates the existing secondary storage and composition of the network device and writes that information along with the metadata into the data store 324. The BM 308 then signals the Virtualization Technology 316 to resume the bot 315 into its previous state.

A image can be deleted by the Image Configuration Editor 278 sending the appropriate directives via the Node Communication Protocol to the CM 306 which in turn forwards all information to the BM 308. The BM 308 then queries the Virtualization Technology 316 as to whether the deletion of this image will impact the operation of a running component. If not, then the BM 308 deletes the image from the data store 324.

An image can be modified by only a modification of an image that pertains only to its metadata. The duplicated secondary storage and device composition cannot be altered. The Image Configuration Editor 278 sends the appropriate directives via the Node Communication Protocol to the CM 306 which in turn forwards all information to the BM 308. The BM 308 then writes the metadata into the image that resides in the data store 324.

A user can browse or query saved images based upon a specified criterion/criteria. Image details are transmitted to the Image Configuration Editor 278 via the Node Communication Protocol by the CM 306, which reads from the data store 324 the image file properties and metadata that are available. The Image Configuration Editor 278 is able to sort or filter the images based upon the properties of the image file and the metadata contained within.

Figure 35:
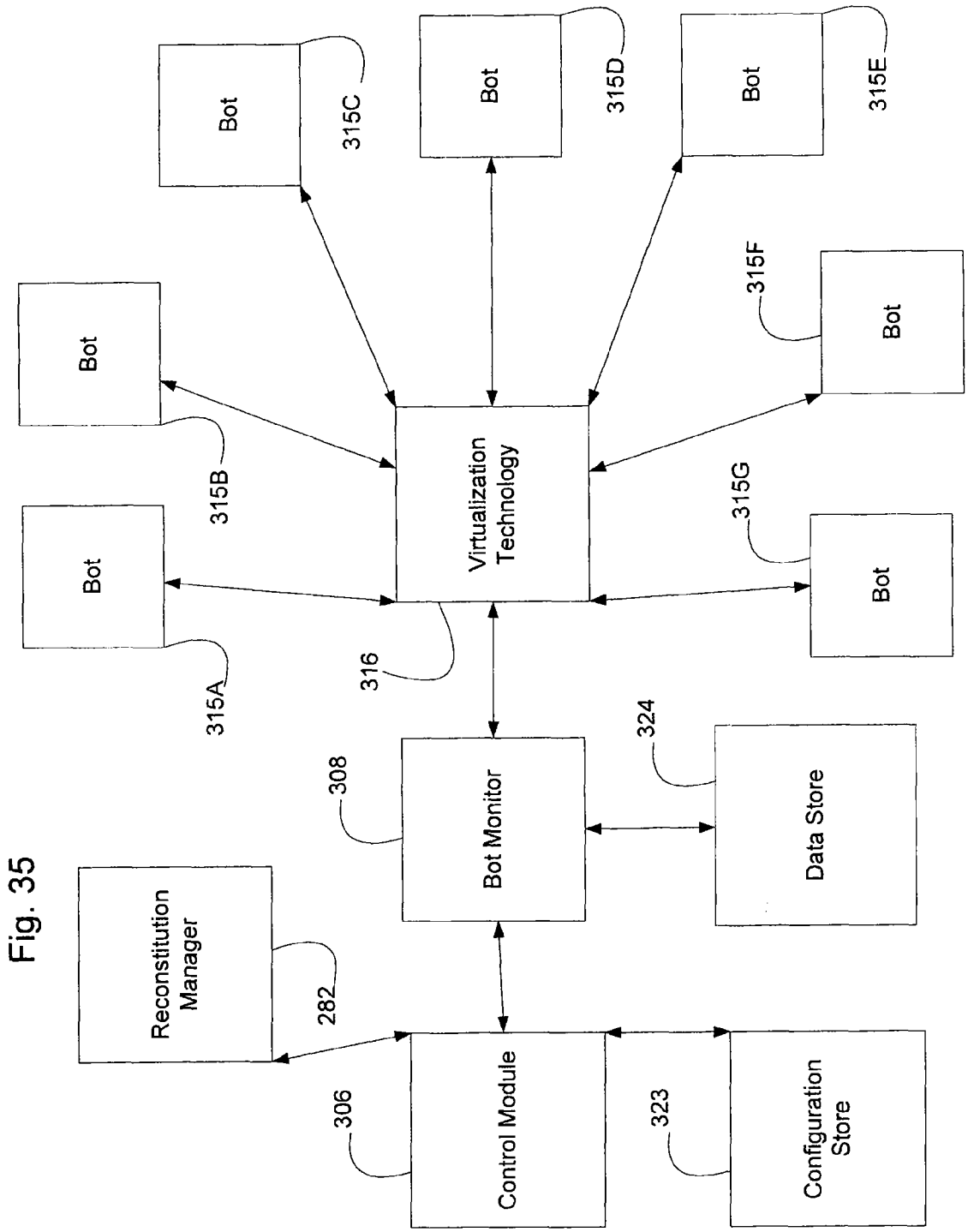
FIG. 35 is a block diagram of a Reconstitution Manger process flow according to one embodiment of a Network Reconstitution module.

Referring to FIG. 35, the start of the restore process of a given component can be initiated by a Reconstitution Manager 282 sending the appropriate directives via the Node Communication Protocol to the CM 306 which forwards all information to the BM 308. The BM 308 then signals the Virtualization Technology 316 with the appropriate configuration data and the Virtualization Technology places the bot 315g into the appropriate state. The BM 308 then replaces the information in the secondary storage device by copying it directly from the image which resides in the data store 324, as well as changing the configuration information. The BM 308 then signals the Virtualization Technology 316 to resume the bot 315 into its previous state.

The restore progress can be monitored via a status report of any or all components in the process of restoring as follows: as a relative percentage, as a function of time, and as a detailed informational view. Updates can be sent to the Reconstitution Manager 282 via the Node Communication Protocol by the CM 306. The CM 306 receives its updates from the BM 308 as to the success, state, or other information pertaining to the process.

An image set can be created to be a group of images of one or more components of the network environment; additionally, these image sets store metadata as defined by the user or application. An Image Set Editor 280 is used to group images together so that a set of devices can be restored simultaneously. The information that is selected/configured via the Image Set Editor 280 can be held in memory until such time that it is processed to be saved, at which point it is transmitted back to the CM 306 via the Node Communication Protocol.

Figure 33:
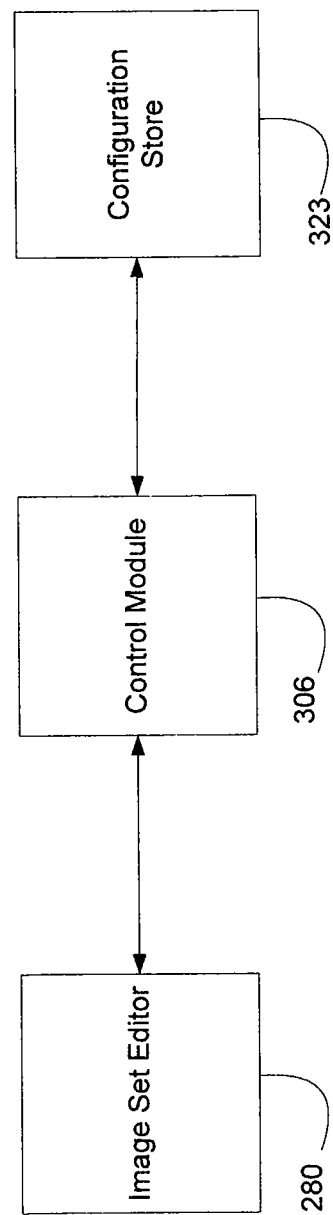
FIG. 33 is a block diagram of an Image Set Editor process flow according to one embodiment of a Network Reconstitution module.

As in FIG. 33, an image set can be saved by an Image Set Editor 280 configured to write the configuration into a standard XML formatted file and then sends the file via the Node Communication Protocol to the CM 306. System specific information is automatically generated by the CM 306 so as to maintain unique attributes of a given image set (e.g. serial numbers for image sets which are unique within the system by automatic incrementation of a global serial number listing inside the system) and these are added into the XML file which is then written to the Configuration Store 323.

A image set can be deleted by the Image Set Editor 280 sending the appropriate directive via the Node Communication Protocol to the CM 306, which then removes the image set from the Configuration Store 323.

An image set can be modified using the Image Set Editor 280 that writes the configuration into a standard XML formatted file and then sends the file via the Node Communication Protocol to the CM 306. The CM 306 validates the system specific information so as to maintain unique attributes of a given image set (e.g. serial numbers for image sets which are unique within the system by automatic incrementation of a global serial number listing inside the system) and then writes the information into the Configuration Store 323.

A user can browse or query saved image sets based upon a specified criterion/criteria. Image set details are transmitted to the Image Set Editor 280 via the Node Communication Protocol by the CM 306, which reads from the Configuration Store 323 the image sets that are available. The Image Set Editor 280 is able to sort, filter, or group the sets based upon the properties of the image files within the image set and the metadata contained within the images or the metadata and configuration data contained within the image set.

The restoration process can include all components included within an image set. A Reconstitution Manager 282 can send the appropriate directives via the Node Communication Protocol to the CM 306 which forwards all information to the BM 308. The BM 308 then signals the Virtualization Technology 316 with the appropriate configuration data and the Virtualization Technology places the bots 315a through 315g into the appropriate state. The BM 308 then replaces the information in the secondary storage devices by copying it directly from the images which reside in the data store 324, as well as changing the configuration information. The BM 308 then signals the Virtualization Technology 316 to resume the bots 315a through 315g into its previous state.

The system can also monitor the restore progress via a status report of the image set in the process of restoring as follows: as a relative percentage, as a function of time, as a detailed informational view, and with respect to an individual component, referring back to an individual component's status report.

Updates can be sent to the Reconstitution Manager 282 via the Node Protocol by the CM 306. The CM 306 receives its updates from the BM 308 as to the success, state, or other information pertaining to the process.

Reconstitution User Interface—The Reconstitution module user interface can provide the user with the ability to see an overall status and health of the virtual machines that make up the devices in the virtual network. The user interface can also enable the user to capture the state of a virtual device by taking a snapshot. A snapshot of a virtual device can be reloaded at a later time to continue execution from the exact moment the snapshot was taken.

The User Interface for a Reconstitution module can be composed of multiple views in support these features, including, but not limited to a Status View, a Snapshot View, a Group View, and a Timeline View, by way of example. The user interface can include one or more of the following actions that can be developed by one skilled in user interface design:

1. About VM Manager—Information about the application (i.e. version, copyright).

2. Create Group—Creates a group from the selected snapshots or allows for a user to start with a blank group if no snapshots have been selected.

3. Create Snapshot—Saves the state of a device to a file that can be loaded at anytime to restore the device to that saved state.

4. Delete All Snapshots—Permanently remove all the snapshot for the selected group from the application.

5. Delete Group—Permanently remove a group from the application.

6. Display Hidden Devices—Toggles the showing of all hidden devices in all applicable views.

7. Delete Snapshot—Permanently removes a snapshot and its subordinate snapshots from the application.

8. Edit Group—Edit a group's label and snapshot composition.

9. Exit—Exits the application.

10. Group Manager—A window for managing snapshot groups.

11. Help—A window for retrieving information on how to use the application.

12. Hide Device—Hides a selected device from being shown in any applicable view. The "Hide" menu option changes to "Show" if the user selects a device that can hidden.

13. Load Group—Load a group of snapshots.

14. Load Snapshot—Load a different snapshot for the currently selected device.

15. Open Console—Opens a new window that provides access to the selected device's graphical or serial interface.

16. Rename Group—Prompts the user to provide a new name for the selected group.

17. Rename Snapshot—Prompts the user to provide a new name for the selected snapshot.

18. Restart Device—Causes a selected device to go from a running or suspended state to a restarting state.

19. Revert to Baseline—Loads a read-only snapshot that has been designated as the default setup for the selected device.

20. Run Device—Causes a selected device to go from a stopped state to a running state.

21. Save as Group—Prompts the user to assign a group name to all the currently loaded snapshots.

22. Shutdown Device—Causes a selected device to go from a running or suspended state to a stopped state.

23. Simulator Status—A window for displaying the status of the simulator.

24. Snapshot Manager—A window for managing device snapshots.

25. Suspend Device—Causes a selected device to go from a running state to a suspended state.

26. VM Timeline—A window for viewing the snapshots for all devices on a timeline of when they were taken.

27. Disconnect—Disconnect from a simulator.

By way of example, the Status View of the Reconstitution module user interface can include a menu bar for easy access to all actions that can be taken by the user. Some of the reconstitution elements for user access and control include: a VM Manager, a Display Hidden Devices, a Group Manager, a Hide Device, a Simulator Status, a Snapshot Manager, and a VM Timeline The user interface components of the Status View can include: Open Console, Run Device, Suspend, Shutdown, Restart Device, Revert to Baseline, Disconnect, and Exit. One or more of these can be limited to be active based on the state of the device at the time.

The snapshot menu can provide access to any actions the user can need to take regarding snapshots in the current view. These can include Create Snapshot, Load Snapshot, Delete Snapshot, and Rename Snapshot.

The group menu can provide access to any actions the user can need to take regarding groups in the current view. The View menu for the Status View can provide access to any actions the user can need to take regarding the view. The Hide Device can provide that the device can be hidden from any view that displays devices. The "Hide" menu option changes to "Show" if the user selects a device that can hidden. The Display Hidden Devices can provide that all devices that were hidden by the user can be shown where applicable. The hidden devices can be marked so that they can be distinguished from the shown devices. The Windows menu provides access to the four views. This can also include: Simulator Status, Group Manager, Snapshot Manager, and VM Timeline.

As with most systems, a Help menu can provide access to information on how to use the application as well as information about the application's version. This menu can be accessed regardless of which view can being used.

The VM Manager can provide the ability for a user to quickly see the status of the virtual devices. This view provides the status information of the virtual devices and provides functionality to act on virtual devices. The menu items can include: Create Snapshot, Delete Snapshot, Open Console, Load Snapshot, Load Group, Rename Snapshot, Restart Device, Revert to Baseline, Run Device, Save as Group, Shutdown Device, Suspend Device, and Disconnect.

The Main Display can show the status of the simulator in real time. As the state of each device changes, the view changes automatically. A Device Name column can display the names of the devices that are a part of the simulator, a Snapshot Name column can display the name of the snapshot that can currently loaded onto the device, a Group column can display the group or groups of which the currently loaded snapshot can a member, a State column can display the current state of the device. There can be one or more values that can be displayed in a column, such as Running, Suspended, Stopped, Transitions, Starting, Restarting, Resuming, Stopping, and Taking Snapshot The File menu for the Status View provides access to the actions that the user can be using for devices as well as exiting the application. The commands to change the state of a device are enabled based on the current state of the selected device. For example, if a device can be stopped, the only command that may be able to enable it may be "Run Device".

As one skilled in the art will understand from this example of the Status View, the Snapshot View, the Group View, and the Timeline View, can be developed in a similar manner using the same actions.

As an overview, the Snapshot menu for the Status View can provide access to any actions the user can need to take regarding snapshots. If the currently loaded snapshot for a selected device is in the baseline, only the "Create Snapshot" and "Load Snapshot" options are available; otherwise, all menu options are available for a selected device. Some options include: Create Snapshot, Load Snapshot, Delete Snapshot, Rename Snapshot, and Group Menu. The Group menu for the Status View can provide access to any actions the user can need to take regarding groups. The "Load Group" menu option prompts the user to select a Snapshot Group to load. The "Save as Group" option prompts the user to assign a group name to all the currently loaded snapshots. The Snapshot View enables a user to see all the devices and their associated snapshots in a view similar to the Microsoft Windows™ folder view. The Snapshot menu for the Snapshot View provides access to any actions the user can need to take regarding snapshots, including Create Snapshot, Load Snapshot, Delete Snapshot, and Rename Snapshot.

The Group View can enable a user to see all the groups and their associated snapshots in a view similar to Windows' folder view. The default view for this display expands the groups that are responsible for the currently loaded snapshots.

The Timeline View of the user interface can enable a user to view snapshots for each device chronologically on a Gantt chart. One view can allow for the selection of a timeframe to be displayed on the chart. Selecting a group can highlight that group on the display. This display can load with the current time in the middle of the chart. Clicking the Reset button can reload this display with its default settings.

A Time button on the toolbar can be clicked to select this display if it isn't already the selected display. This view allows for the selection of a timeframe to be displayed on the chart.

A user interface toolbar can provide for quick access to the commonly used functions: Create Snapshot, Delete Snapshot, Load Snapshot, Rename Snapshot, Create Group, Load Group, Rename Group, Edit Group, and Delete Group.

The user interface can provide a user the ability to create one or more snapshots at any given time while the simulator is running. The user can first prompt to confirm their request and then asked to provide names for the snapshots. When a user wants to take a snapshot of one or more devices, a confirmation dialog can first displayed requiring the user to confirm the action. The user may choose to give a meaningful name to each of the snapshots that can be taken. A default name can be provided if the user chooses to not provide a name. Once the user has selected, the application can begin to stop all the devices for which a snapshot needs to be taken. As the devices stop, the application can then start the process to take a snapshot. After each snapshot can finished, the display can be updated with the new snapshot information and the device can remain stopped.

The user interface can provide for a user to choose to hide a device from being show in the application. The user can also choose to show all devices that have been hidden. Devices can be hidden and shown anywhere in the application where they are displayed. Selecting the menu option to display all hidden devices can show hidden devices where appropriate. The hidden devices can be flagged (i.e. grayed out or colored text) to allow for distinction between what has been hidden and what hasn't. Choosing to unhide a device can be done by right-clicking on the device or choosing the appropriate menu option.

The user interface can provide for the selection to create or edit a snapshot group. Each group must have one snapshot from every device monitored by the application. Creating a group can the same as editing except the group name field can contain a default name and the snapshot fields can be unpopulated. The group name can be changed but not left blank. The group name must also be a unique name so that it can be distinguished from the other groups. Each device can have a corresponding drop down box of all snapshots associated with that device. The user can choose to change the snapshot for the group using the dropdown boxes.

Reconstitution Module Protocol—Every instruction must contain the following arguments delimited by a semi-colon. The PARAMETER argument can be optional and can appear 0 or more times depending on the specific instruction. Each additional PARAMETER can be delimited by a semi-colon.

CHANNEL_ID A unique value used to discriminate messages with a common purpose/business processes. Effectively multiplexes the communication channel between the appliance and the user interface. Channel numbers can be reserved, such as for Channel ID requests, ASYNC messages, and the like.

PARAMETER Information that may be necessary to facilitate handling the instruction, specific to the particular INSTRUCTION being sent.

TERMINATOR A 2-character identifier signaling the end of the instruction. Every instruction must be terminated.

Response Message Format—Response messages are separated into two sections; a HEADER and PAYLOAD. The two sections are separated by a semi-colon delimiter. The PAYLOAD can be optional.

HEADER Information that describes the message being transmitted.

PAYLOAD Information specific to the message that can be optional depending on if the specific message requires additional information for it to be processed correctly.

TERMINATOR A 2-character identifier signaling the end of the instruction. Every instruction must be terminated.

The header contains information about the type of the message being transmitted. The header arguments are delimited by spaces (SP) and end with a semi-colon.

CHANNEL_ID A unique value used to discriminate messages with a common purpose/business processes. Effectively multiplexes the communication channel between the appliance and the user interface.

IDENTIFIER An identifier of either the instruction to which this message is a response or of the type of asynchronous message.

STATUS_CODE (optional) This can be a 3 digit code representing various return values.

Status Codes—Each response message sent from the system will contain a status code. The following listing describes an exemplary set of status codes that can be sent and their definitions. In some cases, a general message can be sent that can be designated as such.

Example listing of Status Codes (Code/Description):

200 Indicates an instruction was successfully received and executed

300 Indicates an instruction was successfully received and is in the process of being executed 400 Indicates an instruction was received but there was a temporary error in executing the instruction which may be recoverable 401 The maximum number of Channel IDs has already been allocated by this GUI 104. Please close a Channel before requesting another Channel ID.

402 There are previously requested instructions currently being executed which will abort if this Channel is closed.

403 There is no open Channel with that ID.

404 That Channel ID is reserved and cannot be closed.

405 The requested property does not exist for that type

406 The requested property is read-only and cannot be set

407 The requested group does not exist.

408 The requested group is read-only and could not be deleted.

409 The requested snapshot is read-only and could not be deleted.

410 The requested snapshot does not exist.

500 Indicates an instruction was received but there was an unrecoverable error in executing the instruction The message PAYLOAD may contain any data relevant to the message. The PAYLOAD begins after the semi-colon at the end of the header and ends with a TERMINATOR to indicate the end of the message. Since the PAYLOAD is optional it's possible that a message will end in only a semi-colon and TERMINATOR. There are no limitations on the data in message payload except a standard format is desirable, such as that each separate piece of data is separated by a semi-colon, by way of example.

Instructions—The following is an exemplary list of instructions.

SET PROP—Request to set a property for a specified system type. A new property will be created if it doesn't already exist, otherwise it will be changed to the new value(s).

GET PROP—Request a specific property(s) for a specified system type the list of instructions. Instructions are identified by the string that must appear in the instruction set.

Description—A summary of the command's usage as well as any limitations or restrictions.

Instruction Format—The format of the instruction exactly as it would be sent over the wire.

Instruction Arguments—Any variable arguments in the Instruction Format should be described (usually anything between angle brackets).

Response Format—The format of the response exactly as it would be sent over the wire.

Response Payload—Any variable argument in the Response Format should be described (usually anything between angle brackets).

Asynchronous Messages—List any ASYNC messages that will potentially be triggered by the instruction.

Status Codes—List any Status Codes that may be triggered from the instruction. For each of these codes, each will have a unique Instruction Format that can include Instruction Arguments, Response Format, Response Payload, Set of Asynchronous Messages, and Relevant Error Codes.

The Channel, Snapshot, Device, and Group Instructions can include:

CHAN OPEN—Requests a new Channel ID from the SLAM-R appliance.

CHAN CLOS—Relinquishes (closes) a previously opened Channel ID.

SNAP LIST—Requests a list of available snapshots for a given managed device.

SNAP CREA—Create a snapshot for the requested device.

SNAP LOAD—Load a specified snapshot on the specified device.

SNAP DELE—Delete a specified snapshot on the specified device.

DEVI LIST—Request the list of managed devices on the SLAM-R appliance.

GROU SAVE—Saves the snapshot group to the appliance.

GROU LOAD—Loads the specified snapshot group.

GROU DELE—Deletes the snapshot group to the appliance.

GROU LIST—List all snapshot groups that are available on the connected appliance.

GROU SNAP—List all snapshots associated with the specified group.

Two examples of the instruction format include:

---
CHAN OPEN - Requests a new Channel ID from the SLAM-R appliance. This Channel ID is unique during the lifetime of the Channel ID (i.e. no duplicates).
  Instruction Format    0; CHAN OPEN ;<TERMINATOR>
  Instruction Arguments    N/A
  Response Format    0 CHAN_OPEN <STATUS_CODE>;<CHANNEL_ID><TERMINATOR> Response Payload
    <CHANNEL_ID> - A newly allocated channel ID, or empty if no channel could be allocated
  Asynchronous Messages    N/A
  Status Codes 401
---

SNAP LIST—Requests a list of available snapshots for a given managed device.

---
  Instruction Format    <CHANNEL_ID>;SNAP LIST; DEVICE><TERMINATOR>
  Instruction Arguments       <CHANNEL_ID> - A channel ID greater or equal 50
    <DEVICE> - The Managed Device for which a list of snapshots is requested.
  Response Format    <CHANNEL_ID> SNAP_LIST <STATUS_CODE>;[<SNAPSHOTS>]<TERMINATOR>
  Response Payload      <SNAPSHOTS> - The semi-colon delimited list of 0 or more snapshot filenames.
  Asynchronous Messages    N/A
---

Generic Property Commands—In addition to the specific instruction, generic property commands are commands that can be used for any supported type in the system. They can allow the different system types currently defined (devices, snapshot, groups) to have any number of associated properties. This can provide for flexibility and extensibility in the property mechanism so that you do not have to add new protocol commands each time a change is made or a new property is added to a system type.

The following are definitions for exemplary types and their associated supported properties to be used in the SET PROP and GET PROP protocol instructions.

SET PROP—Request to set a property for a specified system type. A new property will be created if it doesn't already exist, otherwise it will be changed to the new value(s).

GET PROP—Request a specific property(s) for a specified system type. These are applicable for the following types and supported properties, by way of example:

---
DEVICE CURRENT_STATE
       TIME
       DATE
       DISPLAY_NAME
       LOADED_SNAPSHOT
       IS_HIDDEN
---

---
SNAPSHOT DISPLAY_NAME
         CREATED_DATE
         CREATED_TIME
         PARENT_SNAPSHOT
         PARENT_DEVICE
         IS_READ_ONLY
         GROUP DISPLAY_NAME
         CREATED_DATE
         LAST_MODIFIED_DATE
         LAST_MODIFIED_TIME
         IS_READ_ONLY
---

Asynchronous Messages—The system can initiate asynchronous messages to connected GUI's at any time. Asynchronous messages are indentified by the message constant that must appear in the message. An asynchronous message can be transmitted with a unique channel ID such as a 1.

SNAP_CREA—A notification to all connected clients (GUIs) that a device snapshot has been created.

SNAP_DELE—A notification to all connected clients (GUIs) that a snapshot has been deleted.

GROU_MODI—A notification to all connected clients (GUIs) that a snapshot group has been modified.

GROU_DELE—A notification to all connected clients (GUIs) that a snapshot group has been deleted.

SET_PROP—A notification to all connected clients (GUIs) that a property has changed.

Device States and Transitions—States and transitions are differentiated such that a transition can be the movement between two states. Messages can contain a state or transition component will be indentified with a STATE placeholder. The Message Constant as shown can appear in the messages sent that contain the STATE placeholder.

Device States can include (State/Message Content/Description):

Stopped STOPPED The device is powered off. There is no activity.

Running RUNNING The device is in a normal operating state.

Suspended SUSPENDED The execution of the processes and the state of the system has been momentarily halted. When resumed, execution will continue as if the device was never suspended.

The device state transitions can include (Transition/Message Constant/Description):

Stopping STOPPING The device is in the process of moving to the STOPPED state.

Starting STARTING The device is in the process of moving to the RUNNING state from the STOPPED state.

Suspending SUSPENDING The device is in the process of moving to the SUSPENDED state from the RUNNING state.

Resuming RESUMING The device is in the process of moving to the RUNNING state from the SUSPENDED state.

Saving SAVING The snapshot is in the process of being created for the device.

The operator can use the Node Tool suite/tool suite to control one or more system modules (for example, Simulated Network Traffic Generator 232 or the Attack Creation module 236) that can be loaded on the Node 102. The Node can be the primary server for controlling the simulator environment. The students or crew log onto workstations in the simulator to monitor the simulated network architecture and defend against events launched from modules such as the Node 102.

Exemplary Applications of the Simulated Network System Node and Modules

Systems and methods as described herein provide for the generation and management of network traffic and network attacks in a simulated controlled computer environment for the purpose of training, testing, and evaluation of personnel and/or equipment. Some of the reasons for providing such a simulated network traffic and attack generation in a controlled environment include:

a. Performing the training, testing, or evaluation in a real or "live" environment could be harmful to either the environment or the personnel/equipment b. Costs for creating the "live" networked computer environment would exceed a reasonable ROI (Return On Investment), either due to sheer cost of equipment or the level of effort required in coordinating specific criteria for the testing, training, or evaluation c. Consistently reproducing the testing, training, or evaluation criteria is difficult and requires a high degree of precision Such systems can:

1. Provide the ability to create a controlled networked computer environment at a very granular level.

2. Provide the ability to craft testing criteria with a high level of precision.

3. Automate testing/execution of testing criteria so that complex tests can be executed without needing an expert level tester to be present.

4. Measure and record equipment/personnel actions during testing for analysis and export to other systems.

5. Evaluate equipment/personnel performance based upon test criteria and generates requisite reports.

In addition, in such systems:

6. The created environment can be modified by the user instantly while in operation.

7. The created environment can be restored to a previously defined state, either in part or totally, within a minimal time frame (1-3 minutes).

8. A single integrated interface may include all of the above items 1-7.

By way of example, an not intending to be limiting, a company may wish to simulate a "hacker" attack against their web server (e.g. their e-commerce site is defaced and made inoperable) so that they can evaluate the following:

How long does it take them to discover that the web site is down?

How long does it take them to recover the web site so that it is fully restored and operational?

What can they do to validate that the web server is clean once restored and not still compromised?

How can they prevent this from happening in the future with a high level of confidence?

Obviously the company does not want to try this against their live system, as every minute the web site is unavailable constitutes a possible loss of revenue. Additionally, not having their own security experts, the company either needs to hire a "hacker" to perform the attacks and evaluation (and trust him) or acquire some form of testing tool that will provide the capability to test and evaluate the performance of the company's IT experts and equipment. With either choice, a realistic testing environment is needed to provide an accurate assessment of the performance of both the IT personnel and the equipment and its configuration.

One or more systems and methods can provide some or all of these by the following:

a. simulating the e-commerce site and its configuration;

b. initiating the hacker attack;

c. providing the appropriate network traffic and background noise during the attack;

d. recording and analyzing the actions of the system administrators undergoing the training/attack; or e. providing metrics with an evaluation of how well the system administrators performed.

In some embodiments, networks and methods as described herein include the ability to load or populate the simulated network with traffic that simulates real world traffic on the network. This includes any type of user traffic such as web surfing, e-mail, and file server access. Likewise, since few network architectures operate independent of the Internet, the networks and methods are configured to simulate or replicate traffic coming into the network from the outside world, e.g., via interfaces to external networks that are of the control of the user and the user environment. Some embodiments provide this capability by one or more software and hardware enabled systems or one or more modules, for example by one embodiment herein referred to as a Sentinel, Legion, Auto-Build, Myrmidon and Reconstitution (SLAM-R) system. The Node can perform one or more network simulator functions and can include one or more of loading traffic environments, loading attack scenarios, generating attacks and network traffic, and storing network preferences, by way of examples.

One exemplary embodiment of a real world network traffic simulator/generator, the Node 102 can provide realism or realistic traffic on the simulated network. Such systems can be provided as an integrated system or as multiple modules that work together and or independently to provide a unified interface for the simulator operator to use. Additionally, such Node software or systems can refer to programs that run the node or system as well as the rest of the simulated network system in some embodiments. The Node can be composed of one or more components, and in one exemplary embodiment includes three components: the node, the Node Tool Suite, and the requisite modules. There may be more exchange email traffic than webmail, certain websites that get visited, or large amounts of bit-torrent traffic. The file is setup to describe what kinds of traffic are generated by what kind of users.

As described in this exemplary embodiment, the Node 102 can be a server that runs the Node 102 software. It can be physically connected to the network simulator or network in multiple areas or interface points so as to have full access to the simulated network environment, physically and/or logically. This can provide the backend for the user emulation, crew monitoring and testing, and simulator control. Although this can be a server that can be accessed via its own console or user interface, the primary mechanism for interacting with the Node 102 can be through the Node Tool Suite. The node is a physical server which sits in the simulator rack. For instance the node may refer to a standard Dell PowerEdge 1950 server.

While the rest of the network hardware in various embodiments of the network simulator can be deployed otherwise, the traffic and attack operations originate at the Node 102. Most of the servers existing on the simulated network can be emulated by either the Node 102 or an actual virtual machine sitting on another server in the simulator, but all users and attackers can be configured to originate from the Node 102. The operating system for the Node 102 can be any suitable such OS, and in some embodiments can have a suitable kernel for acting as a Xen Host.

In one embodiment of the Node 102 a UMID—User/Machine Id can provide a unique identifier for the pairing of a User and Machine. This can represent a functionally simulated user on the network. It can also represent the machine that an internet server is running on like google.com, or it could refer to an internal user such as a secretary and her desktop machine. Additionally, a Xen virtualization software similar to VMware or QEMU can be used on the node to virtualize lightweight Linux machines called Bots 315. Any UMIDs on the simulated network can be running on a Xen bot. Generally these are very lightweight only using 32 mb of memory and hard drive space, but they may get much bigger as processing power increases. The Node 102 can also include Bots 315 that are the virtualized machines that run on Xen on the Node 102. These can be very tiny Linux machines that can emulate hundreds or thousands of simulated users. They can have the BSM 318 running on them and get their commands via the Relay Modules. An Attack Scenario is an all-inclusive xml-based file that describes completely an attack scenario. They can describe UMIDS that take part in the attacks, specific processes used in the attack along with a timeline and dependency list for running a pre-planned scenario so that events occur at specific times. A traffic environment can be another xml-based file that has information regarding the UMIDS and traffic patterns for a certain environment. For example, in one user environment this can be 20,000 users ranging executives to secretaries, or in another user environment can be a small business with 50 staff users.

The operator can use the Node Tool suite/tool suite to control one or more system modules, for example, Simulated Network Traffic Generator 232 or Attack Creation module 236 that can be loaded on the Node 102. The Node can be the primary server for controlling the simulator environment. The students or crew log onto workstations in the simulator to monitor the simulated network architecture and defend against events launched from modules such as the Node 102.

As described above, the disclosed traffic generator simulates typical real life computer network users and traffic. The Node Attack Manager can use various tabs, toolbars, and a scenario player control to execute attacks. The Node Attack Manager screen can provide several functionalities, including an Execution Manager, a Scenario Builder, an Event Builder, and an Event Library. The Attack Manager's interface (GUI) components can include a standard top toolbar, a side selection tab toolbar, a selection content viewer, an information viewer, a scenario player controls, a message log viewer, a network manager view, and a current status bar.

The standard top toolbar can include file, view, tools, and help drop-down menu options. The file menu further can contain commands such as connect to node, disconnect from node, open scenario, close scenario, import scenario, export scenario, and exit. The view menu further can contain viewable options of the execution manager, the scenario builder, the event builder, and the event library. The items on the view menu can be disabled if not connected to a node. The tools menu controls access to user configurable aspects of the GUI 104 and the help menu can provide access to information on using the Simulated Network System 100 GUI 104 application.

The side selection tab toolbar for the Node Attack Manager can include an execution manager, a scenario builder, an event builder, and an event Library. The selection content viewer can show content of each of the selections in the side toolbar, while the information viewer displays information about the selections in the side toolbar. The scenario player can control the user interface to control the scenario execution. The controls can closely mimic standard media player controls such as Play/Pause, Stop, Previous and Next.

To initiate an attack, the operator or user can instigate by any suitable input means, such as by the operator by clicking a computer input device, for example a mouse, on the execution manager tab located in the left side selection tabs in the Attack Manager screen. The existing scenarios can be displayed in the selection content viewer. The operator or user can then select the desired attack scenario. After the attack scenario is started, the Defender workstation can begin to receive indications of possible problems. For example, if an e-mail type attack has been chosen, the Defender workstation can start receiving complaints that e-mail can be not be sent or received. The Defender workstation can then begin to take steps to recognize and elevate the possible problems caused by the Aggressor workstation.

Exemplary Embodiment System Operation

In one exemplary embodiment:
1. The CM 306 is the only module that communicates with the GUI 104.
2. All communications with the GUI 104 take place over a single physical connection.
3. The BM 308 is the module responsible for the virtualization environment.
4. The CM 306 is always running.
5. The BM 308 is always running.
6. The SMD 314 is always running.

The workflow could include:
1. User defines a simulator environment.
  a. All settings for how the simulated environment is configured (or will be configured) are made through the network preferences interface. The interface sends all data to the CM 306.
  b. The CM 306 sends all of the data to the SMD 314.
  c. The SMD 314 stores all information for this particular simulator configuration and provides all information about the simulated environment topology to all other processes/modules as needed.
    i. This specific simulator configuration is uniquely identified within the SMD 314 so that it may be accessed in the future.
2. User builds a simulator environment or initiates the Automated Network Build module 234.
  a. The user builds all components manually and then connects the Node 102 to the simulated network where appropriate ORM 312.
  b. The user starts the Automated Network Build process.
    i. The CM 306 is notified that the Automated Network Build will begin.
    ii. The CM 306 notifies the BM 308 with the information on how to create the environment.
    iii. The BM 308 starts up the appropriate bot types in preparation for installation. These Bots 315 are flagged as BLUE.
    iv. The Bots 315 build as instructed by the BM 308, reporting back successes and failures to the BM 308.
    v. The BM 308 reports all activity to the CM 306, which in turn reports all activity to the GUI 104.
3. User builds a traffic pattern.
  a. The user selects a specific traffic protocol to create and makes the appropriate selections in the GUI 104.
  b. The GUI 104 sends all data to the CM 306.
  c. The CM 306 stores the data for future use.
    i. This traffic pattern is uniquely identified within the CM 306.
    ii. The CM 306 queries the SMD 314 for the unique simulator configuration. This is then associated with the traffic pattern.
4. User builds a traffic profile.
  a. The user selects one or more traffic patterns and assigns them to the traffic profile via the GUI 104.
  b. The GUI 104 sends all data to the CM 306.
  c. The CM 306 stores the data for future use.
    i. This traffic profile is uniquely identified within the CM 306.

ii. The CM 306 queries the SMD 314 for the unique simulator configuration. This is then associated with the traffic profile.
5. User builds a traffic scenario.
  a. The user selects one or more traffic patterns or traffic profiles and assigns them to the traffic scenario via the GUI 104.
  b. The GUI 104 sends all data to the CM 306.
  c. The CM 306 stores the data for future use.
    i. This traffic scenario is uniquely identified within the CM 306.
    ii. The CM queries the SMD for the unique simulator configuration.
This is then associated with the traffic scenario.
6. User builds an attack event.
  a. The user selects one or more exploits, vulnerabilities, or support processes and makes the appropriate selections in the GUI 104.
  b. The GUI 104 sends all data to the CM 306.
  c. The CM 306 stores the data for future use.
    i. This attack event is uniquely identified within the CM 306.
    ii. The CM 306 queries the SMD 314 for the unique simulator configuration. This is then associated with the attack event.
7. User builds an attack scenario.
  a. The user selects one or more attack events and assigns them to the traffic scenario via the GUI 104.
  b. The GUI 104 sends all data to the CM 306.
  c. The CM stores the data for future use.
    i. This attack scenario is uniquely identified within the CM 306.
    ii. The CM 306 queries the SMD 314 for the unique simulator configuration. This is then associated with the attack scenario.
8. User builds a report/scorecard.
  a. The user defines the determining criteria and its states via the GUI 104.
    i. The user must select an attack scenario before proceeding.
  b. The GUI 104 sends all the data to the CM 306.
  c. The CM 306 stores the data for future use.
    i. The CM 306 associates the report with the unique identifier for the attack scenario.
9. User loads traffic scenario.
  a. The user selects the appropriate traffic scenario from the GUI 104.
  b. The GUI 104 sends the selection to the CM 306.
  c. The CM 306 prepares the Node 102 to run the traffic protocols.
    i. The CM 306 queries the SMD 314 to determine if the traffic scenario is compatible with the current simulated environment. If it is not, it reports an error back to the GUI 104 and aborts the load; otherwise, it continues with the load.
    ii. The CM 306 determines if it has the appropriate physical resources to create the traffic scenario. If not, it reports an error back to the GUI 104 and aborts the load; otherwise, it continues with the load.
    iii. The CM 306 communicates the details of the bots needed to the BM 308.
      1. The BM 308 then starts the required number of bots 315. These bots are flagged as GRAY.
      2. The BM 308 monitors the virtualized environment for errors.
        a. Only errors are reported back to the CM 306. If any errors occur, the following happens:
          i. The BM 308 reports the specific error back to the CM 308.
          ii. The CM 306 reports the error back to the GUI 104.
          iii. The CM 306 instructs the BM 308 to abort.
            1. The BM 308 destroys all of the GRAY bots.
    iv. The CM 306 starts the appropriate TGEN modules 326 based upon the required network protocols and communicates the details of the needed traffic.
      1. The TGEN modules 326 start.
      2. The TGEN modules 326 connect to the CM 306.
      3. The TGEN modules 326 query the SMD 314 for specific simulator environment information.
      4. The TGEN modules 326 query the SMD 314 for protocol specific information.
        a. The SMD pulls from the Traffic Store as necessary to answer these requests.
      5. Once the TGENs 326 have received all of the appropriate information, they report back to the CM 306 that they are ready.
        a. If any of the TGENs 326 fail to report back to the CM 306 as ready (or before a CM 306 specific timeout) the following occurs:
          i. The CM 306 returns an error to the GUI 104.
          ii. The CM 306 destroys all TGENS 326.
          iii. The CM 306 instructs the BM 308 to abort.
            1. The BM 308 destroys all of the GRAY bots.
    v. The CM 306 starts an ORM 312 for each protocol. All of the ORMs 312 are identical, each being an instantiation of the main ORM 312.
      1. The ORMs 312 start.
      2. The ORMs 312 connect to the CM 306.
      3. The ORMs 312 report back to the CM 306 that they are ready.
        a. If any of the ORMs 312 fail to report back to the CM 306 as ready (or before a CM 306 specific timeout) the following occurs:
          i. The CM 306 returns an error to the GUI 104.
          ii. The CM 306 destroys all ORMs 312.
          iii. The CM 306 destroys all TGENS 326.
          iv. The CM 306 instructs the BM 308 to abort.
            1. The BM 308 destroys all of the GRAY bots.
10. User loads an attack scenario.
  a. The user selects the appropriate attack scenario from the GUI 104.
  b. The GUI 104 sends the selection to the CM 306.
  c. The CM 306 prepares the node to run the attack.
    i. The CM 306 queries the SMD 314 to determine if the attack scenario is compatible with the current simulated environment. If it is not, it reports an error back to the GUI 104 and aborts the load; otherwise, it continues with the load.
    ii. The CM 306 determines if it has the appropriate physical resources to create the attack scenario. If not, it reports an error back to the GUI 104 and aborts the load; otherwise, it continues with the load.
    iii. The CM 306 communicates the details of the bots needed to the BM 308.
      1. The BM 308 then starts the required number of bots. These bots are flagged as RED.
      2. The BM 308 monitors the virtualized environment for errors.
        a. Only errors are reported back to the CM 306. If any errors occur, the following happens:

i. The BM 308 reports the specific error back to the CM 306.
ii. The CM 306 reports the error back to the GUI 104.
iii. The CM 306 instructs the BM 308 to abort.
  1. The BM 308 destroys all of the RED bots.
iv. The CM 306 starts the Attack Relay Module (ARM).
  1. Like the CM 306, there is only one instance of the ARM ever running.
  2. The ARM starts.
  3. The ARM connects back to the CM 306.
  4. The ARM reports back to the CM 306 that it is ready.
    a. If the ARM fails to report back to the CM 306 as ready (or before a CM 306 specific timeout) the following occurs:
      i. The CM 306 returns an error to the GUI 104.
      ii. The CM 306 destroys the ARM (if it exists).
      iii. The CM 306 instructs the BM 308 to abort.
        1. The BM 308 destroys all of the RED bots.
  5. The CM 306 sends all information for the attack scenario to the ARM.
11. User starts traffic scenario.
  a. The GUI 104 notifies the CM 306 that the traffic scenario is to be started.
  b. The CM 306 signals to the TGENs 326 (through the existing connection) to start generation of the traffic.
  c. The TGENs 326 generate traffic and send it to the CM 306 via the existing connection.
  d. The CM 306 receives the traffic and sends it to the appropriate ORM 312.
  e. The ORM 312 examines the traffic and sends it to the appropriate bot.
    i. The ORM 312 determines which bot the traffic is destined for.
    ii. The ORM 312 makes a connection to the appropriate bot by connecting to the BSM 318 which is running on the bot.
    iii. The ORM 312 sends the traffic to the BSM.
    iv. The BSM 318 executes the traffic on the bot.
    v. The BSM 318 ends all traffic responses back to the ORM 312.
    vi. Once the requested traffic execution has finished, the BSM 318 closes the connection to the ORM 312.
    vii. If the execution takes longer than allowed, the BSM 318 closes the connection to the ORM 312.
    viii. The ORM 312 monitors the traffic responses.
      1. Only errors (including premature disconnection) are reported back to the CM 306.
      2. The CM 306 sends all errors to the NCM 331.
      3. The NCM 331 examines the errors in the context of the simulated environment by querying the SMD 314.
      4. The NCM 331 sends all validated errors to the RAM 330 and to the CM 306.
        a. The CM 306 displays all errors back to the GUI 104.
        b. The RAM 330 collects all errors and validates them against the report criteria.
12. User starts attack scenario.
  a. The GUI 104 notifies the CM 306 that the attack scenario is to be started.
  b. The CM 306 signals to the ARM (through the existing connection) to start the scenario.
  c. The ARM notifies the CM 306 that the scenario has started.
  d. The CM 306 notifies the GUI 104 that the scenario has started.
  e. The attack scenario timer starts.
    i. The purpose of the attack scenario timer is to keep the CM 306 and the ARM 310 synchronized.
  f. At the appropriate time, the ARM 310 launches an attack event.
    i. The ARM 310 connects to the BSM 318 on the appropriate bot
    ii. The ARM 310 gives a warning to the CM 306 that it is about to launch an attack.
    iii. The CM 306 notifies the GUI 104 of the impending attack.
    iv. The ARM 310 determines which bot the attack is destined for.
    v. The ARM 310 makes a connection to the appropriate bot by connecting to the BSM 318 which is running on the bot 315.
    vi. The ARM 310 sends the attack event to the BSM 318.
    vii. The BSM 318 executes the attack on the bot 315.
    viii. The BSM 318 sends all responses back to the ARM 310.
    ix. Once the attack event execution has finished, the BSM 318 closes the connection to the ARM 310.
    x. The ARM 310 sends all responses back to the CM 306.
    xi. The CM 306 sends all responses to the RAM 330.
    xii. The RAM 310 analyzes all data and collates it against the report criteria.
    xiii. The CM 306 displays all data back to the GUI 104.
13. User stops traffic scenario.
14. User stops attack scenario.
15. User unloads traffic scenario.
16. User unloads attack scenario.

Simulated Network System 100 Application: Cyberoperations Enhanced Network and Training Simulator (CENTS™)

Simulated Network System 100 revolves around the concept of providing a realistic network environment which is separated from the normal operational environment, yet mimics the normal operational environment. To achieve this, infrastructure devices and servers are configured to recreate the user's operational environment. The primary devices of the network architecture are duplicated or emulated and then configured to duplicate the specified network architecture. This then enables the administrators to effectively test or train as if in their normal environment without causing damage to real world resources. This duplication of the network architecture via hardware and software is referenced as the simulator.

But the physical hardware of the Node 102 alone is insufficient for accomplishing all of the necessary tasks. For realism, the simulator needs to be populated with traffic from standard user operations, such as web surfing, email, and file server access. Likewise, since few network architectures operate independent of the Internet, user actions external to the network architecture that is to be simulated to replicate traffic coming into the network from the outside world. This can be accomplished by The Node.

As described above, the Node 102 is the appliance that can provide the needed level of realism to complete the simulator. As described above, the Node 102 is actually the platform and the various modules that can either operate independently or together to provide a unified interface to act as a simulated network for the simulator operator to use. The different sections of the Node 102 are detailed in the remainder of this document.

As described herein, the Node 102 can be configured in an application for replicating a network environment in its entirety or in scale. This can include the replication of each primary component via a physical, virtual, or emulated system, operating as a duplicate of the original system. This can also include the replication of all or nearly all other components and their normal operations via simulation (e.g., as with a traffic generator or automated program) such that the secondary components behave and react in a manner identical to the originals.

A Node is all of the physical devices and the software that is used to duplicate the network architecture. It typically consists of multiple switches, routers, servers, firewalls, etc. To reduce the footprint and cost of a simulator virtualization is used to load multiple servers onto the same physical device. Examples of physical devices are Cisco 2950 switches, Sidewinder G2 firewalls, and Bluecoat proxy servers. An examples of virtualized servers would be a single Dell 1950 with 8 CPUs and 16 GB of memory. This server would then use virtualization technology to virtualize many standard operational servers, such as exchange servers, domain controllers, or DNS servers. In addition to servers and infrastructure, the simulator also provides a limited number of workstations for the students to use to interact with the simulated environment. All or a portion of the functionalities and/or separate physical devices can be simulated.

The Node can also be configured for defining a network environment, such that all functional components are capable of being reproduced in whole. The user can configure the Node 102 configuration via the Network Configuration Editor 242. A typical network configuration can be represented by its components and the connections between the components. A mapping of the components and their connections is usually sufficient to duplicate a network at a high level, while certain properties such as operating system and computer architecture are necessary for a more detailed representation.

Figure 26:
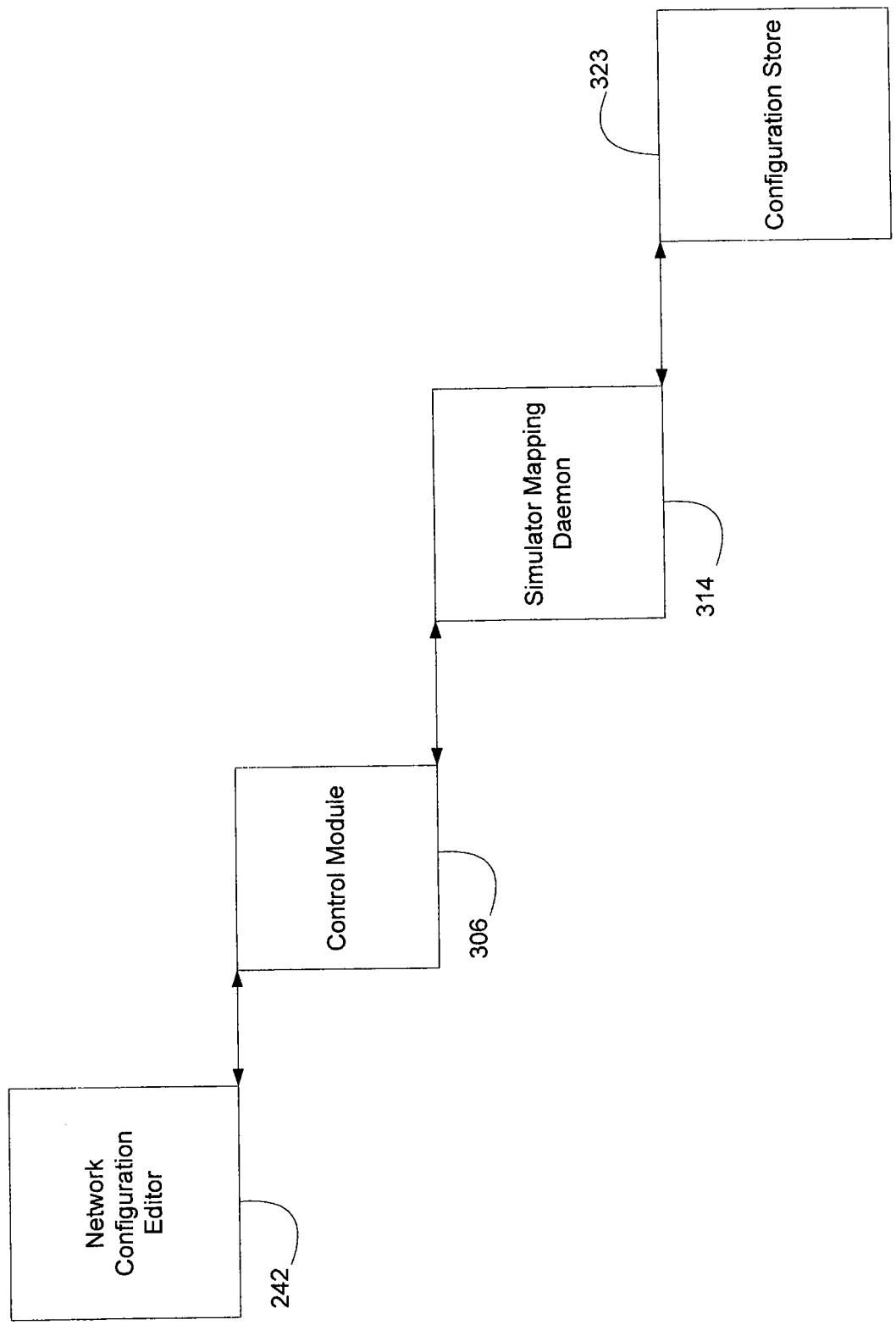
FIG. 26 is a block diagram of a Network Configuration Editor process flow according to one embodiment of a Network Monitoring and Analysis module.

As shown in FIG. 26, the information presented is transmitted by the SMD 314 to the Network Configuration Editor 242 via the node protocol (2) by the CM 306, which queries the SMD 314 for the configurations that are available. The SMD 314 retrieves this information from the Configuration Store 323.

The information that is selected/configured via the Network Configuration Editor 242 can be held in memory until such time that it is processed to be saved, at which point it is transmitted back to the SMD 314 via the node protocol (2) by the CM 306.

In another embodiment, the Node 102 can be configured as an application for training wherein the personnel being trained operate on a replica of their network environment while being exposed to network security incidents.

The instructor is the individual who controls the simulator and its representative environment. Typically, the role of the instructor will be to start the simulator, launch scenarios and then evaluate the response of the students. The instructor accomplishes this by using the Node Toolsuite. The student is the network administrator, security analyst, or computer operator that is to be trained or tested. A crew is a group of students who typically man a NOC (Network Operations Center) and work together as a team. When being taught or tested as a crew each student typically has a well-defined role, in contrast to when students are being trained as individuals. In that case, each student is expected to be able to perform all of the network administration functions, such as user maintenance, network configuration, email administration, etc. A crew typically consists of approximately 5-10 students, each specializing in a given field of expertise.

The instructor can use the system to control the modules (such as the Simulated Network Traffic Generator module or the Attack Creation module) which are loaded on the node. The node is the primary server for controlling the simulator environment. The students log onto workstations in the simulator to monitor the simulated network architecture and defend against events launched from the Node 102.

Example Training Application: CREW TRAINING

The students log into the simulator and begin monitoring the simulated environment. The instructor declares that the scenario is about to begin. Once he has determined that the crew is ready, he launches the scenario from the Node Toolsuite.

The scenario starts and all is quiet for 45 minutes as the students monitor the system. They see thousands of simulated users logging onto the network, requesting addresses, as well as using the email and web systems to access the internet. The instructor walks about the classroom, so as not alert the crew to any impending events. He answers questions and resolves any technical issues.

After 45 minutes, an internet-based DOS (Denial of Service) event is launched automatically from the node. Emulated external users start hitting the firewall that the crew is administrating. The "crew member" responsible for monitoring the firewall should notice the increase in traffic and take steps to prevent the DOS event from affecting the internal network. His actions should include his other crew members, as this form of training is intended to not only improve his skills as a firewall administrator, but to also improve and take advantage of operating as a team. Depending on whether the team succeeds, fails, or misses the event completely, the instructor can evaluate their response and, if needed, the instructor can replay or skip an event to maximize the training opportunity.

Once finished with the scenario, the instructor has an open review with the crew. This gives an opportunity for feedback as well as the opportunity to replay and practice any specific events.

Example Node Application: INDIVIDUAL TESTING

A single student logs into the simulator and prepares himself for the equivalent of a "hands-on" test. This time, the instructor simply informs the student that the test is about to begin. The student is given a list of network services that are not allowed to fail and the constraints for operating within the simulator. Once the student is ready, the test begins.

The instructor launches the scenario from the Node Toolsuite and uses the Network Monitoring and Analysis module to monitor the student's performance. The Attack Creation module begins sending events. Issues as trivial as user lockouts to more serious items such as web server defacement begin to happen. The instructor is able to use the Node Toolsuite and the appropriate modules to monitor and manage the entire scenario.

In yet another exemplary embodiment of an application of the Node 102, the Node 102 can be configured for testing of hardware and/or software in a replicated environment to evaluate the impact upon normal operations. While the overview above represents user testing, it is possible to utilize many of the same tests to evaluate the impact of new hardware or software on a given network environment, much in the same way an attack event can be used to evaluate the impact upon a network environment in the absence of administrators.

In one example, a traffic scenario can be run against a network environment (simulator) and no actions are taken by any administrators/crew. A network monitoring profile is also executed simultaneously, allowing for the collection of pertinent statistics and metrics. After running for a period of four hours, the traffic scenario and monitoring profile are stopped. Then a new piece of equipment is inserted into the network environment—in this case a web proxy server. Once it is configured properly and the simulator mapping is altered to reflect the change, the traffic scenario and the network monitoring profile are again executed simultaneously for another period of four hours. Once complete, the administrators/crew can review both reports and analyze the impact the new equipment had on traffic throughout their network and be reasonably assured of the veracity of the reports, given that all network components (save the web proxy) are functioning as controls in an experiment.

Thus, by attaching a new piece of equipment and executing a traffic scenario, the Network Monitoring and Analysis module can help to determine what impact the addition of this equipment has on the network.

As stated described, the Node 102 is a complex appliance/application composed of three main (from the user perspective) components: the Node 102, the Node Toolsuite, and the requisite modules.

The Node is one or more high-powered servers (based upon the level of simulation required) that runs the Node software. It is physically connected to the simulator in multiple areas, so as to have full access to the simulated environment. It provides the backend for the user emulation, crew monitoring and testing, and simulator control. Although this machine is a server and can be accessed via its own proprietary console, the primary mechanism for interacting with the node is through the Node Toolsuite.

The Node Toolsuite is the interface to the node and its components. It is a Java client program installed onto a computer with the latest JRE (Java Runtime Environment). It connects to the node via a standard TCP/IP client-server relationship. The node reports status and enables control of the different modules which are loaded on the node. Not all modules may be present, as each module is capable of running independently or in unison with other modules. The greatest benefit of the Node Toolsuite is the centralization and integration of all the necessary tools into an intuitive and easy to use interface.

Simulated Network Traffic Generator module is a traffic generator designed to emulate user's actions. Past performance has shown that both individuals and teams are able to easily identify traffic produced by previous traffic generators, and thus the realism of the simulator suffers. The students are unable to be trained to their full potential or, in the case of evaluations, are able to detect the test conditions and are able to "cheat the system". The Simulated Network Traffic Generator module alleviates this problem by providing emulation on a level never before achieved. Traffic can be configured to run without instructor intervention for long periods of time, and yet is able to be modified "on the fly" without stopping the traffic that is already in progress. Traffic can also be "paused"—that is, stopped at a specific moment in time and restarted from that exact moment. Entire segments of traffic can be modified via user profiles, traffic protocols, or expected actions.

The Attack Creation module is the tool for attacking the network architecture (or "hacking", to use the common term). It can be thought of as three separate parts: an event builder, a scenario builder, and an execution manager. Attacks are instantiated as events. Events are a list of steps/actions that a hostile entity would take to attack a network—in this case the network architecture of the simulator. These events are in turn organized onto a timeline for automated playback. This grouping of events along a timeline is referred to as a scenario. Once an instructor has loaded a scenario he can simply press the play button and all events are executed according to their scheduled time. The instructor is not required to interact with The Attack Creation module.

But for the instructors who don't know how a given event works, there should be someone to design and configure the scenario. The Attack Creation module enables this by providing many levels of user interaction and configuration, from the simplistic user who doesn't even know how an event works, to the expert user who wants to create completely new events using the raw exploit data. The expert user can create new events or use existing ones (that have been saved into a database on the node) by using the event builder. He can then schedule those events into a timeline to create a scenario by using the scenario builder. This scenario can then be saved so that either the advanced user or a simple user can execute the scenario without altering its performance. This is done by using the execution manager.

The execution manager can be thought of as a CD player and the scenarios can be thought of as the CDs. A scenario is loaded into the execution manager. Once loaded, the play button may be pressed at any time. Once pressed, the timer starts and the instructor is able to maintain a controlled timetable for the events. Typically, events do not occur immediately or even one after another, but rather are scheduled at random intervals accordingly to cause the most surprise and be unpredictable for the students. But just like a CD player, the execution manager can be "skipped" to the next track—in this case, the next event. He can even skip to the previous event and start it again if necessary, or pause an entire scenario (for those unforeseen emergencies). This enables the instructor to maintain full control of the simulated environment.

And because we all know that everyone thinks they are smarter than the person who created the scenario, The Attack Creation module enables the modification of events on the fly. And for those really difficult types, FULL MANUAL CONTROL of an attack machine can be given when requested.

The Network Monitoring and Analysis module is the monitoring agent that reports the actions and responses of the students. Often during simulations and testing, the students overreact to a real or perceived threat and inadvertently disable some part of the simulator in an attempt to defend their network. This in turn causes numerous headaches for the instructor, who immediately jumps to the conclusion that the attack software or some piece of hardware has malfunctioned. Network Monitoring and Analysis module provides not only a log of what the students have done in the past, but can also be configured to provide real time alerts so that the instructor can be notified immediately when something has broken. This provides the instructor with the capability to maintain control and direct the students towards the solution, even when the instructor himself may not know the answer!

But sometimes the instructor may not want to notify the students of any misconfigurations. Instead, he lets the students continue to complicate their problems by trying to "stop" the hacker who just disabled the mail server. In this case, the instructor will need to rebuild the simulator back to the appropriate baseline once the scenario is over. That is where the next module comes in handy.

The Network Reconstitution or Reconstitution module (Reconstitution) enables the Node 102 for a quick rebuild capability. These rebuilds may be required due to student misconfiguration of the equipment or the effects of the Attack Creation module's attacks, by ways of example. The Node can be positioned to be close to inoperable at the end of a scenario. The Network Reconstitution or Reconstitution module enables the easy rebuild of the simulator by keeping "snapshots" of the equipment and machine baselines. At any time, the instructor can restore any module or network element or grouping thereof or all of the simulator to a preconfigured state. This can be a full re-install but can also be a less than full re-install and configuration build, so as to only provide restoration of a previously existing baseline. Multiple sets of preconfigured baselines can be kept to provide differing levels of complexity for the students.

The Automated Network Build module provides one initial mechanism for the simulator to be built from "bare metal" into all of the appropriate servers and devices in an automated manner. This module connects to the appropriate servers or devices and builds them from standard configuration files. This automated build not only provides a consistent baseline by removing the element of human error, but it also enables the simulator to be built faster, as all installation entries and licensing is automated. The instructor can then perform other tasks while letting the simulator effectively build itself.

These are only two examples of applications suitable for use with the Node 102 and the various modules as described herein. Those skilled in the art will understand that other application are also possible and within the scope of the present disclosure.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the attached drawings can be interpreted as illustrative and not in a limiting sense.

It can be further to be understood that the processes or steps described herein are not to be construed as necessarily requiring their performance in the particular order discussed or illustrated. It can be also to be understood that additional or alternative processes or steps may be employed.

What can be claimed is:

1. A system, comprising:
    a simulated network environment comprising hardware, software, and virtualized devices that duplicate a network architecture of a user's operational environment and user network, such that the simulated network environment operationally mimics the user's operational environment and the user network;
    a computer platform having hardware and software configured as a standalone configuration;
    a module configured for executing an attack scenario against the hardware, software, and virtualized devices, within the simulated network environment while the simulated network environment is operationally mimicking the user's operating environment and user network via the hardware, software, and virtual devices, the attack scenario comprising attack events that are one or more actions to be executed by the module, wherein the module is further configured to perform the actions on the hardware, software, and virtual devices thereby causing a failure of the hardware, software, or virtual devices within the simulated network environment; and
    an interface configured for receiving additional attack event metadata regarding at least one attack event and adding the received attack event metadata to the corresponding attack event.

2. The system of claim 1 wherein the interface is a graphical user interface configured to receive the attack event metadata from a user, wherein the attack event metadata includes an attack event editor enabling a user to select and configure the attack events.

3. The system of claim 1 wherein the interface is a logical interface configured to receive the attack event metadata from a software application.

4. The system of claim 1 wherein the attack events comprise email threats, network attacks, or network failures.

5. The system of claim 1, further comprising a graphical user interface (GUI) communicatively connected to the interface of the computer platform, the GUI being configured as an operating network administrator for controlling and monitoring the execution of the attack events.

6. The system of claim 5 wherein the GUI includes an attack event editor configured for writing the attack events into a standard XML file, and wherein the module is further configured for automatically generating unique attributes within each of the one or more created attack events, the attributes including serial numbers that are unique and that are created by automatic incrementation of a global serial number listing, wherein the serial numbers are added to the XML file and stored within the memory, and wherein the attack event editor includes the capability for deleting, removing, modifying and querying the attack events stored in the memory.

7. The system of claim 1, further comprising an attack scenario execution manager configured for initiating the creation and the execution of the attack events.

8. The system of claim 7 wherein the module is configured to generate a bot server module within a bot of the simulated network environment utilizing at least one of the attack events.

9. The system of claim 7 wherein the module is configured for monitoring the execution and transmission of the attack events including the success of the attack events within the simulated network environment and attributes of the attack events.

10. The system of claim 1 wherein the module is configured for creating a listing of network devices within the simulated network environment to be restored based upon a successful execution of the attack events.

11. The system of claim 10 wherein the module is configured for creating an image set of the network devices prior to execution of the attack events.

12. The system of claim 1 wherein the module is configured to create the attack scenario utilizing at least one of the attack events, the attack scenario being a group of the attack events along with corresponding attack event metadata including predefined time of execution.

13. The system of claim 12, further comprising an attack scenario editor configured for grouping attack events together and assigning them a predefined time of execution.

14. The system of claim 13 wherein the attack scenario editor is configured for creating data indicative of an attack scenario in XML format, and wherein the module is configured to generate unique attack scenario attributes and a unique serial number for the attack scenario, and wherein the module is further configured to include the data indicative of the attack scenario attributes and the unique serial number within an XML file, and wherein the attack scenario editor includes the capability for deleting, removing, modifying and querying the attack scenario.

15. The system of claim 14, further comprising an attack scenario execution manager configured for initiating the attack scenario against the simulated network environment.

16. The system of claim 15 wherein the module is configured to generate a bot server module within a bot of the simulated network environment utilizing the attack scenario.

17. The system of claim 12 wherein the module is configured for monitoring the attack scenario as a function of at least one of the following factors: percentage of successes and failures, time, attribute, and attack event.

18. The system of claim 12 wherein the module is configured to execute the attack events responsive to an input from a user or as an execution of the attack scenario along an operational timeline.

19. The system of claim 1, further comprising a graphical user interface including an attack event mitigation editor for defining a mitigation set responsive to the one or more attack events.

20. The system of claim 1 wherein the module is configured for creating a listing of network devices within the simulated network environment that need to be restored based upon a successful execution of an attack scenario.

21. The system of claim 20 wherein the module is configured for creating an image set of the network devices prior to execution of the attack scenario.

22. The system of claim 1, wherein the module is further configured for defining a set of expected user actions within attack event metadata that would mitigate damage or prevent success of attack events when executed and determine, based upon user actions in response to the attack events, whether the user actions are in compliance with the expected user actions.

23. A system, comprising:
  a simulated network environment comprising hardware, software, and virtualized devices that duplicate a network architecture of a user's operational environment and user network, such that the simulated network environment mimics the user's operational environment and the user network;
  a module configured for executing an attack event against the hardware, software, and virtualized devices within the simulated network environment thereby causing failures of the hardware, software, or virtualized devices within the simulated network environment, the module further configured for executing the attack event on the simulated network environment along a predefined operational timeline; and
  an interface configured for receiving metadata regarding the attack event and adding the received attack event metadata to the associated attack event.

24. The system of claim 23 wherein the module is configured for monitoring the attack event as a function of at least one of the following factors: percentage of successes and failures, time, attribute, and the attack event.

25. A system, comprising:
  a simulated network environment comprising hardware, software, and virtualized devices that duplicate a network architecture of a user's operational environment and user network, such that the simulated network environment mimics the user's operational environment and the user network;
  a module configured for executing one or more attack events against the hardware, software, and virtualized devices within the simulated network environment, the attack events, when executed, causing failures of the hardware, software, or virtualized devices within the simulated network environment, the module further configured for defining a set of expected user actions within attack event metadata corresponding to the attack events and based upon the failures, that would mitigate the attack events or prevent the attack events from being successful; and
  an interface configured for receiving metadata regarding the one or more attack events and adding the received attack event metadata to each associated attack event.

* * * * *